United States Patent
Sherwood et al.

(10) Patent No.: US 6,542,584 B1
(45) Date of Patent: Apr. 1, 2003

(54) DIGITAL TELEPHONE SYSTEM WITH AUTOMATIC VOICE MAIL REDIRECTION

(75) Inventors: Charles Gregory Sherwood, Olathe, KS (US); Charles Arnold Lasswell, Olathe, KS (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/144,186

(22) Filed: Aug. 31, 1998

(51) Int. Cl.⁷ .............................................. H04M 1/64
(52) U.S. Cl. ................ 379/88.18; 379/67.1; 379/88.15; 379/88.22; 379/211.01
(58) Field of Search .............................. 379/67.1, 88.11, 379/88.12, 88.13, 88.14, 88.15, 88.16, 88.18, 88.22, 88.25, 88.26, 210.01, 211.01, 211.02, 212.01, 214.01, 217.01, 221.01

(56) References Cited

U.S. PATENT DOCUMENTS

| | | | | |
|---|---|---|---|---|
| 4,602,129 A | * | 7/1986 | Matthews et al. | 379/88.12 |
| 5,172,404 A | * | 12/1992 | Hashimoto | 379/88.18 |
| 5,400,393 A | | 3/1995 | Knuth et al. | 379/88.27 |
| 5,402,466 A | | 3/1995 | Delahanty | 379/44 |
| 5,432,845 A | * | 7/1995 | Burd et al. | 379/211.01 |
| 5,440,623 A | | 8/1995 | Moore et al. | 379/88.26 |
| 5,548,636 A | | 8/1996 | Bannister et al. | 379/390.01 |
| 5,561,703 A | * | 10/1996 | Arledge et al. | 340/7.29 |
| 5,581,604 A | * | 12/1996 | Robinson et al. | 379/88.22 |
| 5,909,483 A | * | 6/1999 | Weare et al. | 379/220.01 |
| 5,963,617 A | * | 10/1999 | Kim | 379/67.1 |
| 5,963,618 A | * | 10/1999 | Porter | 379/88.18 |
| 6,032,039 A | * | 2/2000 | Kaplan | 455/413 |
| 6,215,859 B1 | * | 4/2001 | Hanson | 379/88.12 |
| 6,324,263 B1 | * | 11/2001 | Sherwood et al. | 379/67.1 |
| 6,347,134 B1 | * | 2/2002 | Sherwood et al. | 379/386 |

\* cited by examiner

Primary Examiner—Fan Tsang
Assistant Examiner—Ovidio Escalante
(74) Attorney, Agent, or Firm—Pillsbury Winthrop LLP

(57) ABSTRACT

A telephone system including a process for redirection of voice mail messages to another voice mail box after a predetermined time or after a predetermined number of attempts at notification by radio pager of the owner of voice mail box in which a new voice mail message has been left have failed to cause the voice mail message to be picked up. The process comprises the steps of: recording the voice mail message, looking up a pager number for the user of the voice mail box in a table, finding an unused outside line, dialing the pager number and looking up a numeric message to be left on the pager in a table which stores a message to be sent for each extension's voice mail box, and monitoring the voice mail box to determine if the message was picked within a predetermined time, if not, redialing the pager and sending the numeric message again (some embodiments send voice messages to the pager) and incrementing a counter, and, after a predetermined number of attempts at notification have failed to cause the message to be picked up, moving the voice mail message to another voice mail box and beginning the process of radio pager notification again.

21 Claims, 29 Drawing Sheets

BOARD C (ONE PORT) IN CSU

DIGITAL TELEPHONE SYSTEM WITH AUTOMATIC VOICE MAIL REDIRECTION

BACKGROUND OF THE INVENTION

The invention pertains to improvements in the field of touch tone telephone systems having voice mail capability and some mechanism to notify a user when a voice mail message has arrived.

In most telephone systems with voice mail capability, when a voice mail message is left, the phone system attempts to notify the user. This is frequently done by lighting a light on the user's phone, by sounding a tone when the user picks up the phone or by sending a notification by a radio pager. In the case of radio paging, if the message is not retrieved, then the message is sent by radio pager again. This will happen a fixed number of times such as 5 times. If the message is not retrieved, no other action is taken, and the caller does not receive a response to their message. In some lesser phone voice mail systems, such as the voice mail offered by GTE, radio paging of the arrival of voice mail messages is available in business service for an extra fee, but there is no notification by a light on the phone or by a tone on the phone when the phone is picked up. Either in the GTE type system or other systems where a tone or light is used, if the person called does not have their pager with them or is sick or on vacation, they never receive a notification that a message has arrived, and do not respond to it. This can be annoying to callers and can result in lost business.

Therefore, a need has arisen for a telephone system that has the capability to re-route voice mail messages to the voice mail boxes of other people when the voice mail message left for a first person is not retrieved within a specified time or within a specified number of attempts at notification.

The prior art includes computer systems which provide various voice mail and routing facilities, but no re-routing of voice mail messages after an unsuccessful notification attempt. One example is U.S. Pat. No. 5,581,604 to Robinson et al, filed Feb. 26, 1996 and assigned to Active Voice Corporation. This patent teaches an automated attendant telephone system which provides the extension telephone user more real time options for handling incoming calls. For example, the auto attendant may be instructed to play one of a number of predetermined greetings to a caller including a custom message that is recorded at the time the call is received to be played to a caller before transferring the call to another extension or to voice mail or hanging up or giving the caller the option of adding another extension. The patent also teaches a method comprising the steps of receiving a call, notifying the called party of the call and allowing the called party to select a response to the call from three or more responses, including: 1) rejecting the call and transmitting a first greeting to the caller; 2) rejecting the call and transmitting a second greeting to the caller, and 3) accepting the call.

U.S. Pat. No. 5,440,623 to Moore et al., filed Jul. 26, 1993 discloses a telephone message system for use in a multiline hunt group with message queuing that provides a caller with the option of leaving a message or going into a holding queue. The hunt group directory number has queuing, call forward busy to the voice mail system and call forward no answer to the voice mail system. Each individual phone line in the hunt group has a telephone number associated with it, and has the call forward busy to voice mail and call forward no answer to voice mail but no queue. An incoming call on any one of the hunt group lines starts the normal hunting activity. If all the incoming telephone lines are busy, the central office switch forwards the incoming call to a voice message mailbox that is associated with the hunt group. Then the caller is given an option of going into the queue or leaving a voice mail message. If the caller wishes to be placed in the queue, the voice messaging system does a supervised transfer to the main directory number of the hunt group such that if all the lines of the hunt group are busy and there is an available slot in the queue, the caller will be placed in the available slot. If any of the hunt group lines are not answered or all the hunt group lines are busy or there are no available slots in the queue, the call is re-routed to the voice mail message box to record a voice mail message.

U.S. Pat. No. 5,548,636 to Bannister et al., filed Jun. 6, 1995 teaches a system for screening incoming calls based upon role in the new telephony services that give a subscriber a single number that a caller calls and which then route the call to the home, automobile or country club of the called party depending upon the user's profile and the date and time of the call. Calls are screened by routing calls directed to the user's home a private role, and calls directed to the subscriber's business number a business role and calls directed to the subscriber's country club a golf role. The calls are then routed to the subscriber at a number where the called party is likely to be according to his profile and the date and time of the call and the caller ID data is sent along with the role information. The subscriber can then accept the call or let it go to voice mail with the information about identity of the caller and role to supply context information. With regard to voice mail, the system provides for real time call screening wherein a caller who has been diverted to voice mail can have the recording monitored and, if the called party recognizes the voice or from the content of the message, decides he or she wants to talk to the caller, a key combination can be pressed on the phone to connect the called party to the calling party.

U.S. Pat. No. 5,400,393 to Knuth et al., filed May 6, 1994 teaches a digital telephone answering device that allows messages to be forwarded to certain internal mailboxes. Messages can be sorted to various mailboxes and retrieved by pressing a button associated with each mailbox. Messages can also be moved or re-assigned from a common mailbox to a certain mailbox.

U.S. Pat. No. 5,402,466 to Delahanty filed Oct. 20, 1992 teaches a paging system for notifying a paging service subscriber of an event at a remote location such as a message left on a standard home type answering machine and/or standard alarm system. The system detects when an alarm has been tripped or a valid message has been left, and then dials a number that the user programs into the system. When the paging system answers, the notification system dials a specific code corresponding to the event which has been detected. If a caller has entered a number into an answering machine, that number will be forwarded to the pager.

None of this prior art addresses the specific problem which the system of the invention solves. Specifically, none of the prior art re-routes a voice mail message to another mailbox after a number of failed attempts to notify the person associated with the number first called.

SUMMARY OF THE INVENTION

The invention defines a genus of species all of which are capable of automatically re-routing a voice mail message originally left in a first voice mail box after a predetermined number of attempts at notification of the owner of that voice mail box or after a predetermined time to another voice mail box if the owner of the original voice mail box does not pick up the message. The particular hardware or software used to perform this function is not critical and any circuitry and/or software which can perform this function will suffice to practice the invention.

The telephone system described herein is intended to be only one example of the many systems in which the invention can be usefully employed. Any system which performs the functions of re-routing a voice mail message to another voice mail box after a predetermine time of the message originally left in a first voice mail box not being picked up will suffice to practice the invention.

In a typical species within this genus, a company telephone system will have many extensions and one central switching unit comprised of a personal computer expanded with one or more expansion cards containing switching and host adapter interface circuitry. The central switching circuit is coupled via its host adapter interface circuitry and a digital bus to a port expansion unit having an interface card connected to one or more incoming telephone lines from the telephone company central office. The port expansion unit will also be coupled to the various extensions by interface circuit including digital-to-analog converters and analog-to-digital converters and separate drop lines to each extension.

The central switching unit is programmed to implement the voice mail re-routing function. That function is implemented by determining the extension incoming calls or extension to extension calls are dialing and sending a power ring to that extension and determining when the extension is either answered or timeout occurs. If the called extension is answered, a data path for the voice conversation is set up. If the called extension does not answer, the central switching unit sets up a path between a voice expansion interface card containing a digital signal processor and opens a voice mail greeting file. The greeting file contains digital data encoding a voice mail greeting. That digital data is retrieved and transmitted to a digital-to-analog converter coupled to the source of the call. Conversion of the data back to analog form causes the caller to hear a voice mail greeting. Then the central switching unit programs a path to send digital data encoding a beep tone to the digital-to-analog converter coupled to the source of the call so that the caller hears a beep indicating that his or her voice is being recorded as a voice mail message. Incoming analog signals from the caller constituting the caller's message are converted to digital data and stored on a hard disk by the digital signal processor after the digital signal processor opens up a file corresponding to the voice mail box of the extension which was called.

After the voice mail message has been recorded, its file is closed, and the central switching unit looks for an available incoming telephone line from the central office. When it finds one, it sends commands to an interface circuit coupled to that central office line causing it to go off-hook. The central switching unit then verifies that a dial tone is present, and makes connections between selected time slots containing DTMF touchtone dialing tones generated by a DTMF tone generator on one of its interface cards and the central office line. The selected timeslots contain DTMF tones which dial the phone number of the radio pager of the user that was originally called. The central switching unit then monitors call progress tones for the call to the radio pager so as to determine when to send a numeric message to the pager. When the time arrives, the central switching unit sends whatever numeric message the user that was originally called has stored in a table entry associated with his voice mail box. In some embodiments, the numeric message may be fixed, and in other embodiments, the message is a voice greeting message. In some embodiments, the outgoing message to the pager is either a programmable or fixed numeric message for pager subscribers that do not have voice mail and is, programmably, either a numeric message or a voice message if the pager subscriber has voice mail capability on his pager subscription.

After sending the numeric message, the central switching unit monitors the voice mail box to determine if the message has been retrieved within a certain time limit, which in some embodiments, is programmable.

If the voice mail message is not retrieved within the specified time, the radio pager is called again and another message is left and a counter that keeps track of the number of attempts to notify the user is incremented. When the counter reaches a terminal count, which, in some embodiments is fixed and in other embodiments is programmable, the central switching unit moves the voice mail message to another voice mail box. The particular voice mail box to which the message is moved is programmable in some embodiments and is fixed in other embodiments. For example, in fixed embodiments, when a voice mail message directed to a particular salesman is not retrieved, it is routed to the voice mail box of the vice president of sales who then can take appropriate action to get another salesman to return the call.

The genus of the invention provides a telephone system which provides a higher degree of certainty that messages left by incoming caller will be returned by somebody within a predetermined time to avoid frustration of callers. This a good thing for both businesses and personal relationships.

DETAILED DESCRIPTION OF THE PREFERRED EMBODIMENT

Figure 1:
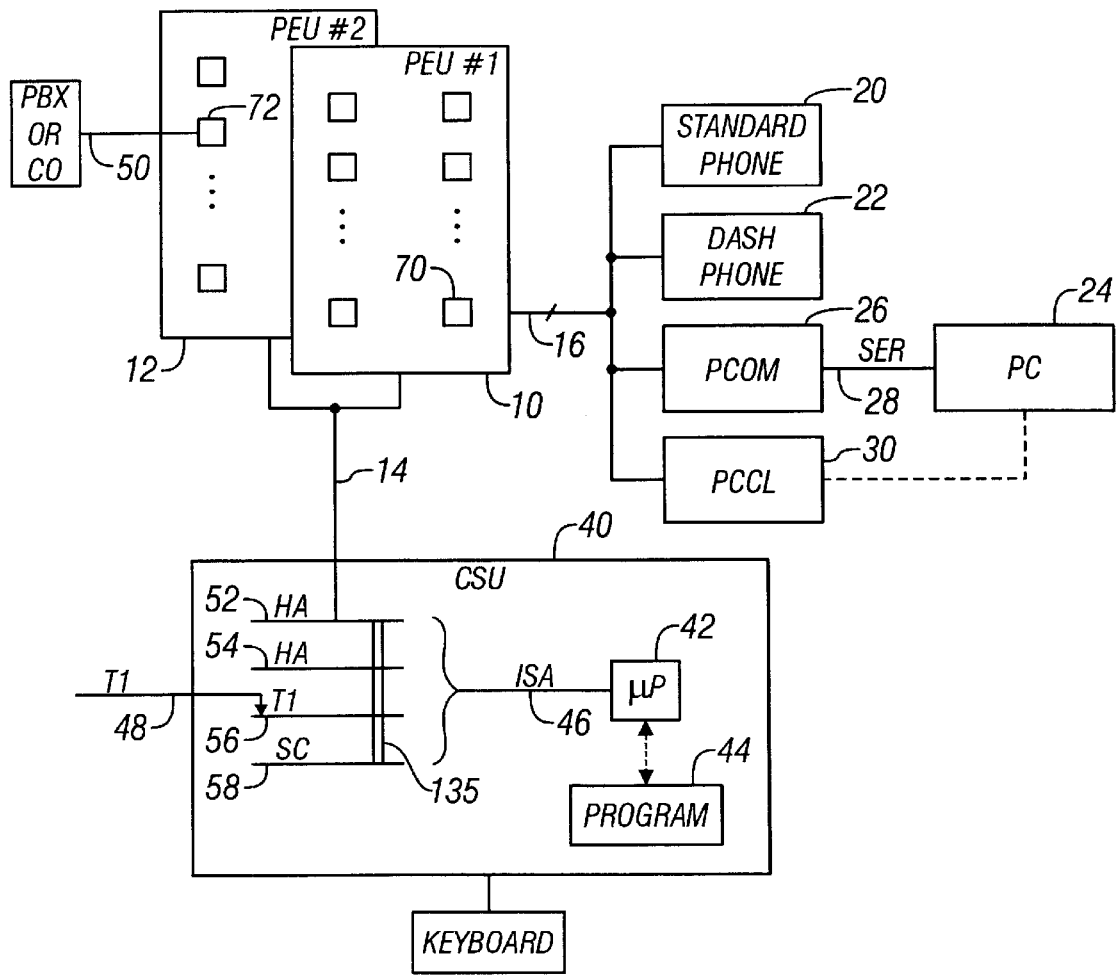
FIG. 1 is a block diagram of one type telephone system in which the system of the invention can be usefully employed.

Referring to FIG. 1, there is shown a block diagram of a digital telephone system with voice mail capability at the user site in which the system of the invention may be employed. The invention is not limited to the particular telephone system shown in FIG. 1 and can be employed in telephone systems having different configurations than that shown in FIG. 1 so long as the defining characteristics of the genus defined in the summary of the invention are present in each species.

The system is comprised of first and second port expansion units (PEU) 10 and 12 coupled together by digital bus 14. The PEUs 10 and 12 each have a plurality of modular connectors to which individual drop lines such as drop line 16 are connected. Each drop line is a bus with analog tip and ring lines to carry analog voice signals back and forth to the extension phones and digital T1 and R1 lines carrying certain signals and power and ground lines. The PEU converts all analog voice signals coming in from the extension phones to digital data for transmission on bus 14 to the Central Switching Unit (CSU) 40, and all digital data coming from the CSU destined for any extension phone is converted in the PEU back to analog signals for transmission to the particular extension phone for which it is bound. Conversion to the digital domain is used because the CSU switching functions to connect various extension phones to each other, or to the central office are all done using digital switching circuitry and various digital signal processors are used in the CSU to monitor call progress and do gain control etc. Typically, the CSU is a personal computer such as any 486 microprocessor type platform with special software coupled by a data path to several expansion cards to be described below and referred to in FIG. 1 by their abbreviations HA, T1 and SC.

Each drop line couples a port of the PEU to any or all of a number of different type of telephone equipment peripherals. These peripherals include a standard telephone 20, and a specially designed Dash phone 22 of a type which has been in public use for more than a year and which is commercially available from Picazo Communications of Lenexa, Kans. Each drop line may also couple a port of the PEU to a personal computer 24 through a PCOM circuit 26 and a serial bus 28 and/or a PCCL circuit 30 which is an expansion card in the PC 24. The PCOM and PCCL circuits 26 and 30 are well known having been in public use for more than a year. These circuits are also commercially available from Picazo Communications of Lenexa, Kans. and from other sources. The PCOM and PCCL circuits are hardware interfaces with software conforming to the TAPI telephone application programmatic interface and controlled by software run on the PC 24 which allow well known computer-telephone interface services to be implemented such as automatic dialers, call timers, handle multiple calls etc.

Up to eight port expansion units may be added to the system along with the required host adapters to add or delete phones. Each PEU has 16 ports eight of which are selectable between connection to a telephone line from the central office (CO) or an extension phone/CTI equipment, and the other eight of which may be coupled to extensions only. On the ports coupled to telephone lines from the central office, caller ID can be detected.

The multiple PEUs are coupled by digital bus 14 to a central switching unit CSU 40. The CSU 40 is a DOS based machine which includes a microprocessor 42 under control of program 44 and coupled via an ISA bus 46 to multiple circuit cards. Although some of the claims refer to an ISA bus, this term should be understood to mean whatever data, address and control bus and protocol is used by the microprocessor or other computer executing the PBX switching and control process. The control program 44 controls the microprocessor 42 to carry out a PBX switching and control process which is referenced in later drawings as PBX process 211. The multiple circuit cards include one or more host adapter cards each of which couples one, two, three or four PEUs to the CSU. Circuit cards 52 and 54 are typical of the host adapter cards. The CSU may also contain a T1 interface circuit 56 which interfaces the CSU to a T1 line 48 from any telephone company provider of T1 high capacity services. Each T1 line can carry 24 voice time-division-multiplexed channels on two pairs of wires. If a T1 line is coupled to the CSU, the PEUs are not needed other than for coupling the CSU to extension phones so all optional ports can be programmed to connect to phones.

The CSU also contains one switch card 58 which serves to switch digital traffic between various extension phones or between extension phones and the CO. The switch card will be described in greater detail later. The circuitry of the switch card 58, the T1 card 56 and the host adapter cards 52 and 54 are well known and in the prior art and are commercially available from Picazo Communications of Lenexa, Kans.

Caller ID information can be received either by the CSU over the T1 line 48 or via the regular telephone line 50 from the central office (CO). The ring signal on the CO line is carried on the single pair of the telephone line 50. The ring signal is a high voltage AC signal from 40–120 VAC with a frequency from 15–63 Hertz, typically 20 Hz.

Figure 2:
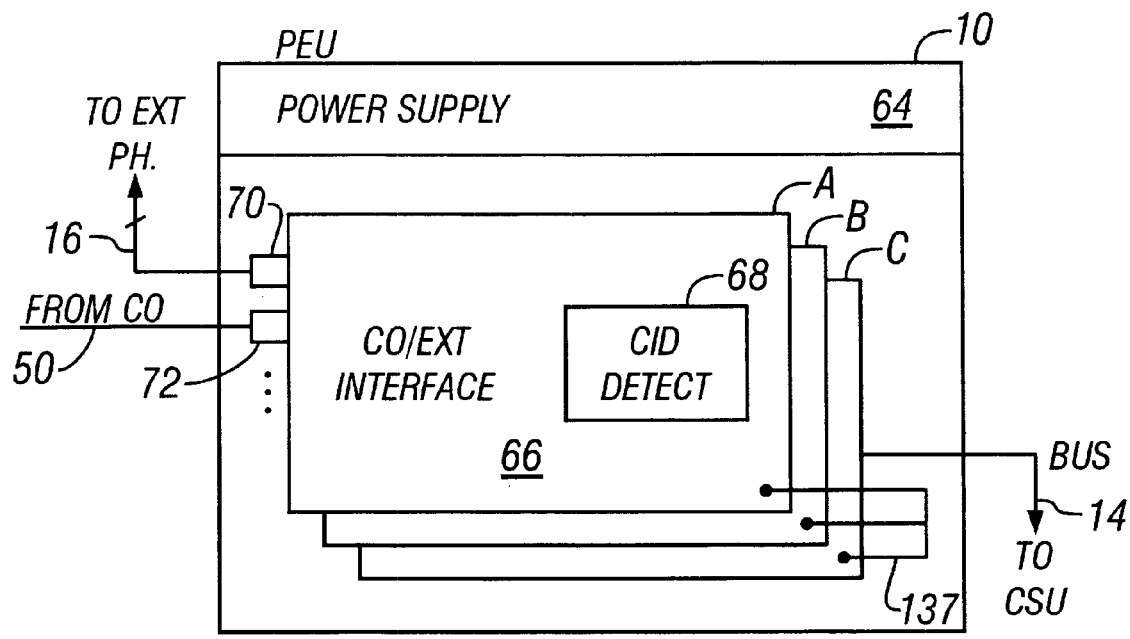
FIG. 2 is a layout diagram of the physical configuration of the PEU.

FIG. 2 is a layout diagram of the structure of a typical PEU. It is comprised of a power supply 64, a CO/extension phone interface circuit 66 and a caller ID detect circuit board 68 which is plugged into the interface circuit board 66 as an option. The CO/extension phone interface circuit 66 has a plurality of modular plugs such as port 70 to which an extension phone is coupled via drop line 16 and port 72 to which a telephone line 50 from the CO is coupled. The circuitry of the CO/extension phone interface circuit 66 and the circuitry and software of the caller ID detect circuit 68 that does caller ID detection (but not automatic routing based upon caller ID) is well known and has been in public use for more than one year. It is new however to have the caller ID detect circuit as an option card which plugs into the CO/extension phone interface circuit 66 inside the PEU. In prior art DASH phone systems, the caller ID detect circuit 68 was an external module that plugged into the CO ports such that the CO line would plug into the module and the module would plug into the port. Incoming telephone calls then passed through the module and caller ID information was detected as the call passed through.

The caller ID detect circuit 68 is commercially available from Picazo Communications of Lenexa, Kans., but any caller ID detection circuit that can function as described herein to transfer caller ID information to the process which carries out caller ID based automatic routing will suffice to practice the invention.

The CO/extension phone interface circuit 66 will be called board A hereafter and its circuitry is well known in the art as having been in public use for more than one year. The PEU is also comprised of two other boards labelled board B and board C in FIG. 2. Boards B and C are also known in the art having been in public use for more than a year. They are commercially available from Picazo Communications of Lenexa, Kans., but any other circuit that can function as described herein will suffice. Board B functions to interface eight ports connected to extension phones such as port 70 in FIG. 1. Board C functions to perform analog-to-digital and digital-to-analog conversions and has a DTMF tone detector thereon. Boards A, B and C are coupled together by an internal bus 137 and are coupled to bus 14. Bus 14 carries voice in digital data form and is coupled to board C.

Figure 3:
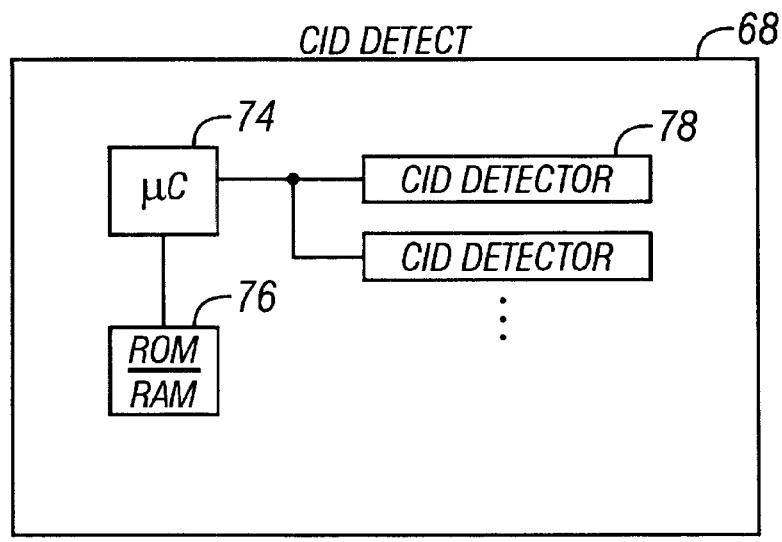
FIG. 3 is a block diagram of parts of the CID detect circuit pertinent to caller ID detection.

The structure of the caller ID detector circuit 68 is shown in FIG. 3. It is comprised of a microcontroller 74, ROM/RAM program and working memory 76, and a plurality of caller ID integrated circuits of which chip 78 is typical. The caller ID circuits are commercially available from Mitel under the designation MT8841A. Because the CO/extension phone interface circuit 66 has 8 ports which may be programmed for coupling to a telephone line from the CO, the caller ID detector circuit 68 includes 8 caller ID detection chips like chip 78. When a call rings which has caller ID information, the caller ID chip for the associated port detects the caller ID information and passes it to the microcontroller 74 which stores it in RAM 76 for later access by a host adapter 52 in the CSU 40. The CSU microprocessor 42 can then use the caller ID information for various purposes such as routing the call.

Figure 4:
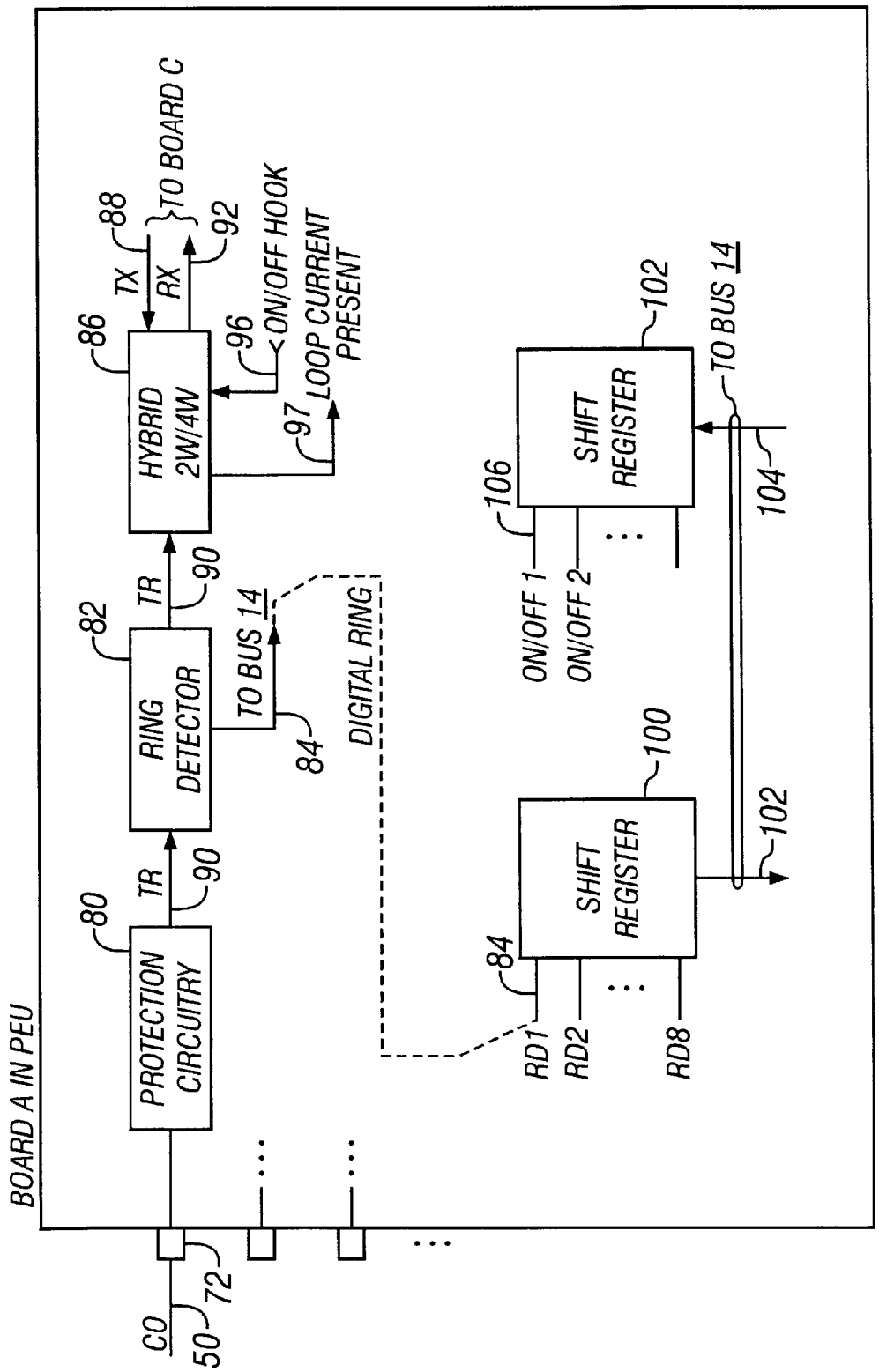
FIG. 4 shows a block diagram of the A board interface circuit which connects the PEU 10 in FIG. 1 to one or more central office telephone lines.

FIG. 4 shows a block diagram of the A board which connects the PEU 10 in FIG. 1 to one or more central office telephone lines. The structure of the A board has been in public use for more than a year. The CO telephone line 50 couples to a protection circuit 80 on this board which serves to protect the circuitry on the board from surges or spikes of voltage on the telephone line. A ring detector 82 is coupled to the protection circuitry to detect ring signals on the CO line and convert the ring signal to a digital logic level on line 84. Line 84 is coupled to the CSU 40 in FIG. 1 via bus 14.

A hybrid circuit 86 is coupled to the CO telephone line 50 through the ring detector 82 and the protection circuit 80. There are 8 circuits like that shown on FIG. 4 on the A board, one for each of the 8 CO ports. Hybrid circuits are well known in the art and function to perform a 2-wire to 4-wire conversion to multiplex transmit analog signals on pair 88 onto pair 90 and take received analog signal on pair 90 and put them onto pair 92. Pairs 88 and 92 are coupled to the C board for D/A and A/D conversion. There are jumpers on the A board which can turn it into an interface to connect to extension phones. When so converted, the ring detector 82 becomes an off-hook detector, and a digital control circuit inside hybrid 86 tells the hybrid to produce a power ring in accordance with a logic signal on line 96. When the hybrid is in an on-hook configuration, there is no DC coupling between the tip and ring lines of the pair 90 (high DC resistance between tip and ring). When the hybrid is commanded to be off-hook, the DC resistance between the tip and ring lines of pair 90 is controlled by hybrid 86 to be low. This is how the phone company central office equipment tells whether the hybrid has gone off-hook and gives a dial tone. The on/off hook signal controls a relay in the hybrid circuit 86 to set an on-hook or off-hook condition so that the CO may think an extension phone is off or on its hookswitch even though that is not actually the case. This allows an incoming phone call to be "answered" by the PEU by receipt of an off-hook command for the appropriate port via bus 14 from CSU 40. The incoming voice signals are then digitized on the C board and transmitted to the CSU for further processing such as routing to the appropriate extension phone by virtue of the caller ID information between ring signals, playing of a standard greeting message, routing to the appropriate extension phone by virtue of DTMF extension digits dialed by the calling party etc. All this processing can happen before any extension phone is even picked up.

Another status signal generated by hybrid 86 is a Loop Current Present signal on line 97. When this signal indicates loop current is not present, the caller has hung up.

There is a digital portion of board A that functions to communicate digital data back and forth between the CSU and PEU A board. Several shift registers are used to communicate data. The 8 data outputs on lines 84 of the 8 ring detectors are coupled to 8 parallel inputs as the RD1 through RD8 input signals to shift register 100. The shift register 100 is a parallel-in, serial-out shift register, with its serial output line 102 forming part of bus 14. Eight individual on/off hook logic signals like the on/off hook signal on line 96 are provided to the A board from the CSU via a serial-in, parallel-out shift register 102. Eight bits of input serial data to shift register 102 are provided via bus 14 and line 104. After these 8 bits are shifted in, they may be provided on 8 individual output lines such as line 106 as signals on/off 1 through on/off 8.

When a ring signal comes in on telephone line 50, the ring detector 82 generates a digital signal on line 84 indicating that a ring has occurred. This digital ring signal is transferred to the CSU via shift register 100 and bus 14. Any caller ID information is sent from the CO to the PEU via line 50 between the first and second rings. When the CSU detects the first ring, it signals the caller ID detect circuit 68 in FIG. 2 to arm and start looking for caller ID information.

Figure 5:
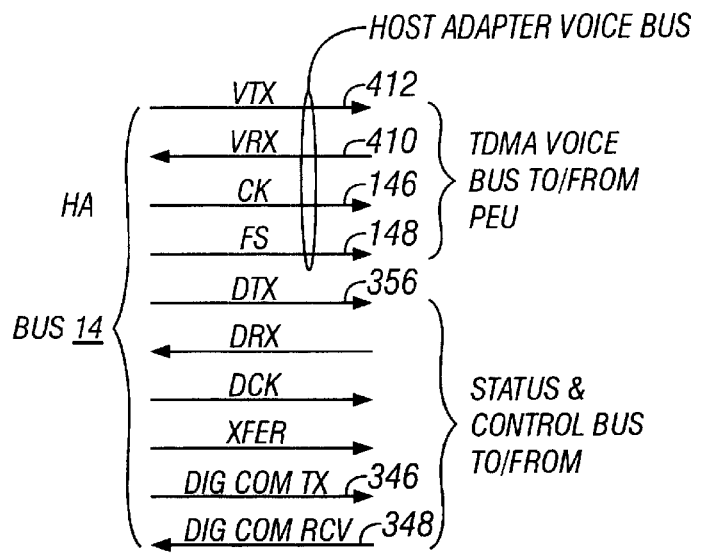
FIG. 5 a diagram of the conductors on bus 14 in FIG. 1 which connects PEU 10 to CSU 40.

Referring to FIG. 5, there is shown a diagram of the conductors on bus 14 in FIG. 1 which connects PEU 10 to CSU 40. Four conductors carrying signals VTX, VRX, CK (bit clock 146) and FS (frame sync 148) comprise a host adapter voice bus carrying voice data in digital form in timeslots using time division multiple access on the VTX and VRX lines. The VTX and VRX conductors carry time division multiplexed digital data in serial format for the transmit and receive portions of up to 32 separate conversations, one conversation per timeslot. The CK signal is a 2.048 MHz bit clock to keep the VTX and VRX signals synchronized and the FS signal is a frame synchronization signal to allow the receivers to reassemble the data packets in the individual timeslots correctly.

A status and control bus is comprised of six more conductors carrying DTX, DRX, DCK and XFER signals, and two digital communication lines. The digital communication lines carry data from the phones to the host adapter which indicate which keys were pressed and carry digital data to the phones such as call preview data and signals to light lights or do other user interface functions. The XFER signal is a hardware handshake signal that tells the shift registers that transport status and control data on the status and control bus to shift data in or shift data out their outputs as required. DTX and DRX carry the send and receive digital data and the DCK is a data clock signal which clocks data in and out of the shift registers.

Figure 6:
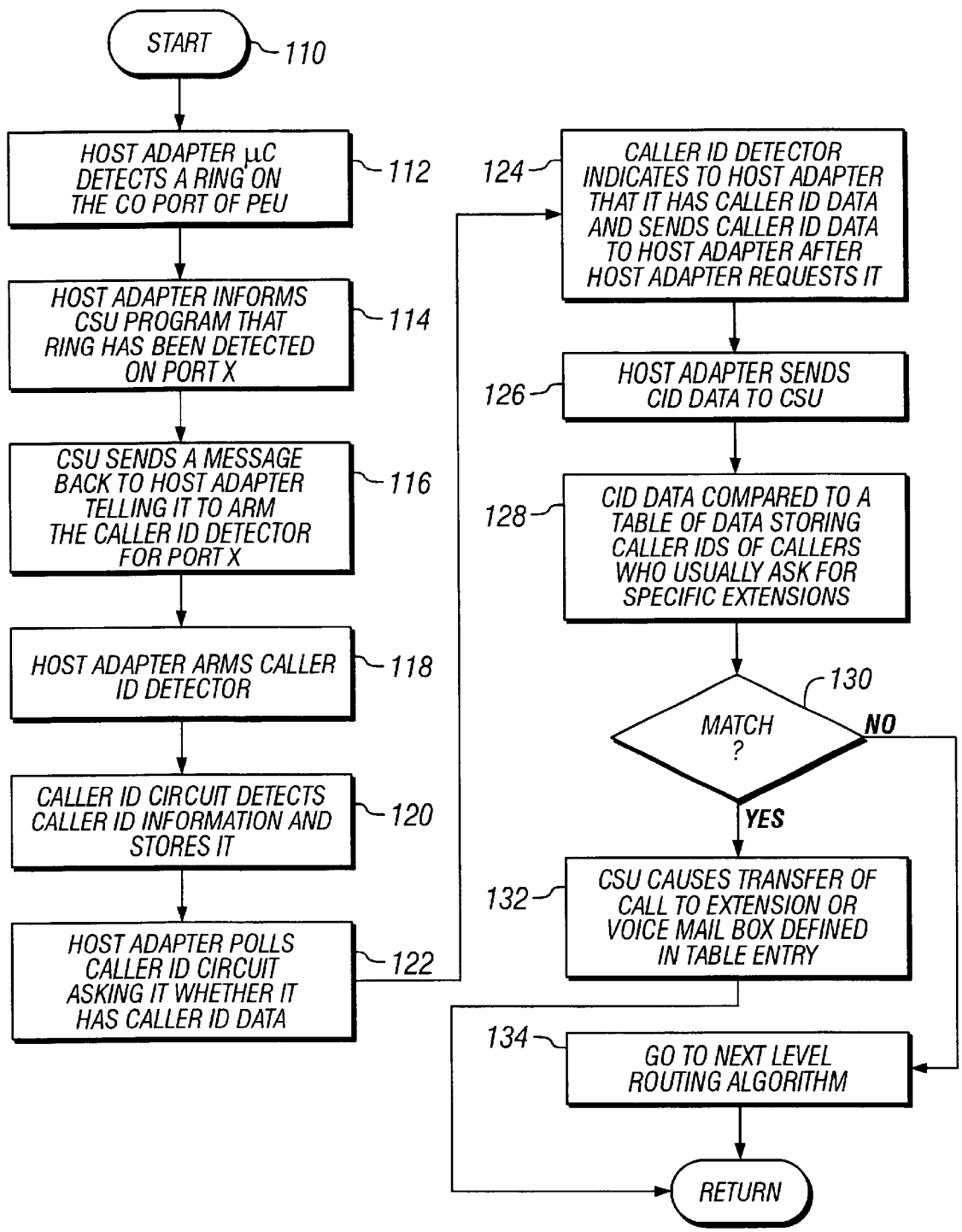
FIG. 6 is a flow diagram of the process of caller ID routing to the appropriate extension phone based upon caller ID information of the incoming call.

The process of caller ID routing is shown in the flow chart of FIG. 6. The process starts at 110 and, in step 112, the host adapter microcontroller detects the fact that a ring signal is coming in from the CO on some port of the PEU. This process is usually carried out by scanning the data on bus 14 arriving from shift register 100.

The host adapter then informs the CSU program in step 114 that a ring has been detected on Port X where Port X is the particular PEU port which received the ring signal. In some embodiments, this is done by generating an interrupt, and, in others, it is done by polling. In the preferred embodiment it is done by sending an ISA bus packet comprised of a command byte and a data byte. Interrupts are preferably used in both directions. Typically, communication from the host adapter to the CSU is done by writing a command byte and a data byte to the interface registers on the CSU motherboard and then activating an interrupt signal.

The CSU interrupt service routine then reads the command and data bytes from the registers and sends a packet and interrupt back to the host adapter acknowledging that it has read the information. Communication from the host adapter to the CSU typically takes the form of the host adapter writing a command byte and data byte indicating for example, "I have detected a ring on Port X". An interrupt is then activated and the CSU reads the command and data bytes to learn of the ring on Port X and sends back an interrupt to the host adapter acknowledging the receipt of this information.

The CSU then executes code which sends a message back to the host adapter telling it to arm the caller ID detector circuit 68 for Port X, as symbolized by step 116, and the host adapter acknowledges the command.

In step 118, the host adapter sends a signal to the caller ID detector assigned to Port X to arm it. The caller ID circuit then looks for the caller ID information between the first and second ring and, upon detection thereof, stores it in step 120. In step 122, the host adapter polls all the caller ID circuits to determine which of them, if any, have caller ID information stored. The caller ID detection circuit assigned to monitor Port X replies to the host adapter in response to the polling request that it has caller ID information stored in step 124, and responds to a command from the host adapter to send the caller ID information by sending it to the host adapter. The host adapter then sends the caller ID information to the CSU process in step 126 via the ISA bus for use in whatever function for which it is needed such as routing the call to the proper extension based upon the caller ID information. In alternative embodiments with different kinds of caller ID detector circuits, the caller ID information can be written directly to registers on the host adapter or in the PEU board A and an interrupt generated to the CSU causing it to retrieve the caller ID data instead of waiting to be polled.

We assume for the purposes of this application that the CSU algorithm uses the caller ID (CID) data to do automatic routing, but it could also be used for other purposes such as automatically launching a business or personal contacts database or organizer, retrieving the file of the person associated with that caller ID using that caller ID as a search key in the database and displaying that person's record.

In step 128, the caller ID data stored in the CSU memory is compared to records in a routing table listing the caller IDs for all callers that typically call certain extensions. If there is a complete match (or partial match in some alternative embodiments) found in step 130, the CSU causes the CO line having the incoming call to go off-hook and sends commands to the switching circuit to cause the digital data generated from the incoming call by the A/D converter on board C coupled to that line to be routed to the extension or voice mail box of the extension listed in the routing table located in step 132. The details of the call transfer process symbolized by FIGS. 8A and 8B can be used to accomplish this automatic caller ID call transfer in the preferred embodiment so that if the called party is not there, the message will go into his or her voice mail box. After step 132 is accomplished, the caller ID routing algorithm is completed.

If there is no match, the CSU moves on to processing in a next level down routing algorithm in step 134. The next level down of routing has been in public use for more than one year, but basically, this routing algorithm may route the CO port to a fixed extension port such as the attendant or provide the caller with options to dial an extension number, opt for voice mail etc.

The circuitry that accomplishes the call transfer is centered on the switch card in the CSU. Assuming that the incoming call is an analog signal on CO line 50 in FIG. 1, the analog signals on the tip and ring lines is converted to digital data after transfer inside PEU 10 from card A to card C where the analog-to-digital converters reside. On card C, the incoming voice signals are converted to digital data and sent via the VTX lines of bus 14 to the host adapter card 52 in FIG. 1. The host adapter transfers the data to the switch card via bus 135 in FIG. 1. Bus 137 couples the A, B and C cards of the PEU together in FIG. 2.

Figure 19A:
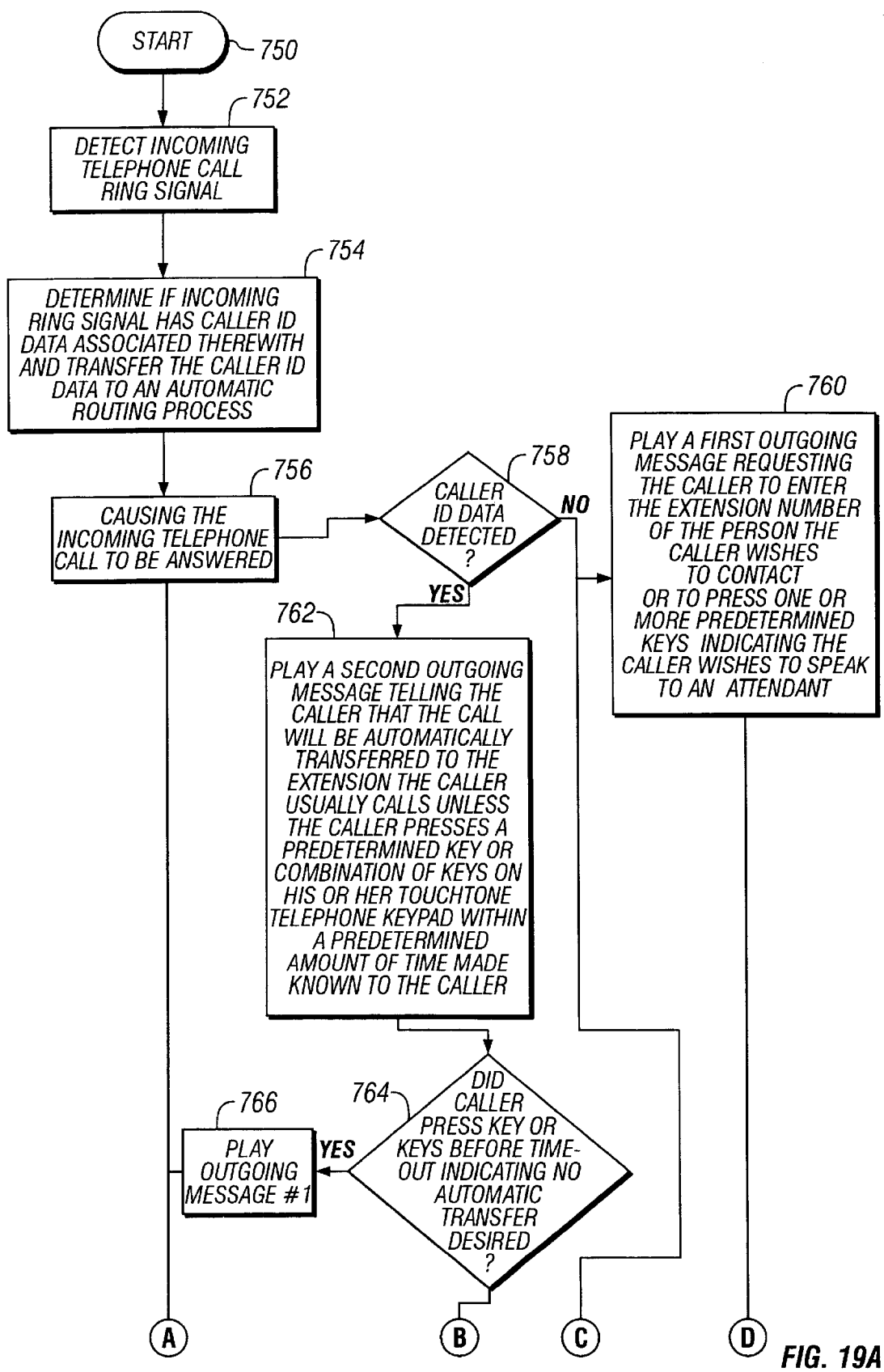
FIGS. 19A and 19B are a flowchart of an alternative automatic call routing process based upon caller ID data of the incoming call wherein the user can request transfer to a user entered extension in lieu of automatic transfer to the extension listed for that caller ID in a routing table.
Figure 19B:
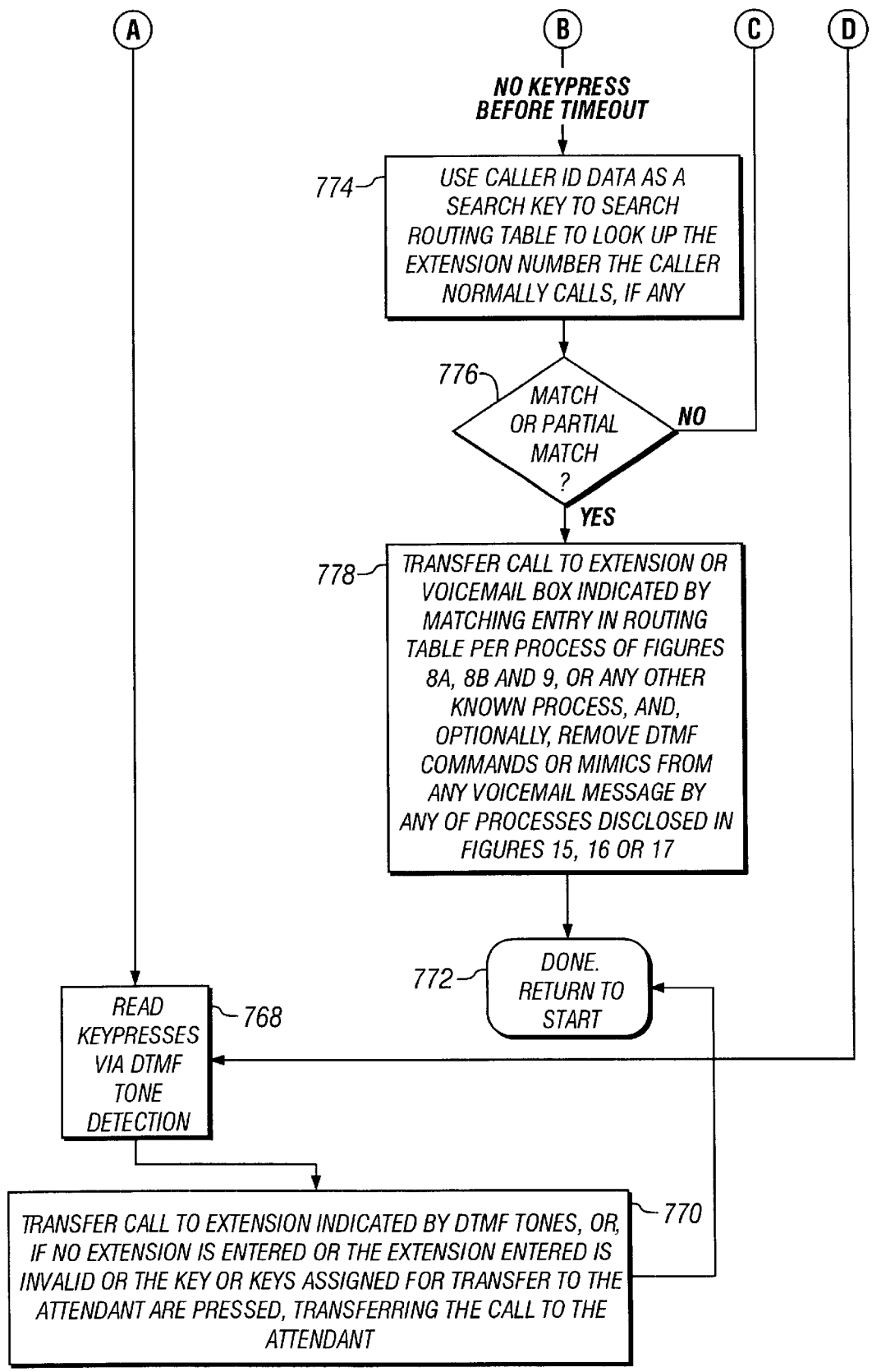

But what happens if the caller does not want to be automatically routed? If the caller does not want to talk to the person to whom her call is automatically routed, she has several options the preferred one of which is shown in the flowchart of FIGS. 19A and 19B. Another alternative is she can ask the person to whom she has been automatically transferred to transfer her to whoever she does want to talk to if the person picks up the phone.

Figure 20:
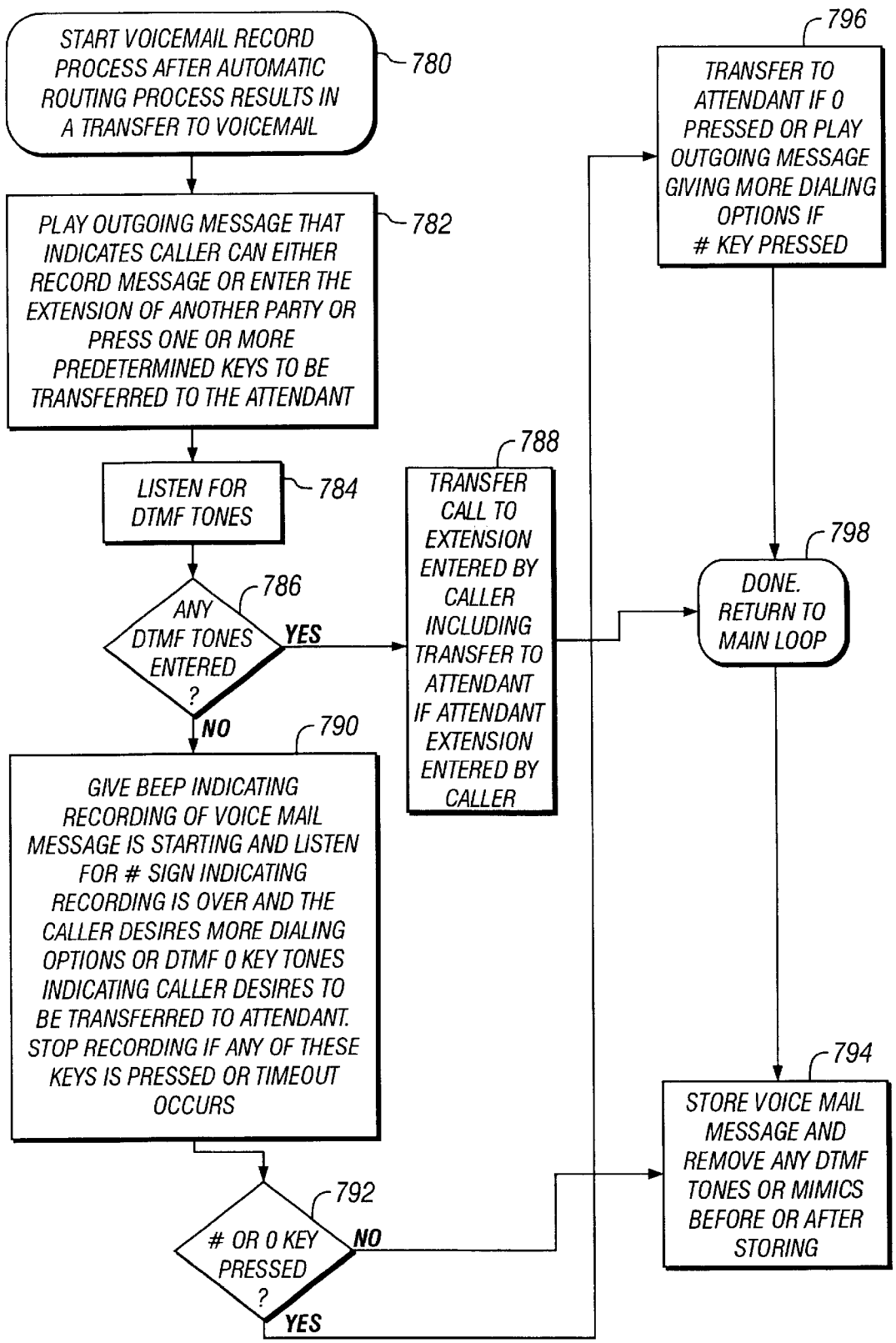
FIG. 20 is a flowchart of an alternative voice mail recording process wherein the user can abort the voice mail recording process and enter an extension to which the user desires transfer either before recording starts or by entering special DTMF commands during the recording to cause transfer to the operator or playing of an outgoing message giving the user more dialing options.

Another option, symbolized by the flowchart of FIG. 20, allows the caller to transfer to another extension if the result of the automatic transfer based upon caller ID is transfer into the called party's voice mail box. The process of FIG. 20 can be combined with the process of FIGS. 6 or 19A and 19B and FIGS. 8A and 8B as an alternative to the recording of a voice mail message process of FIG. 9 to generate several different alternative embodiments.

In the process of FIG. 20, the caller can interrupt the normal voice mail recording process by entering DTMF tones to force a transfer to another extension. If when a caller calls in and, she get the called party's voice mail, she can dial the extension number of the person she does want to talk to during the prefatory announcement of the voice mail. The process starts with block 780 representing a transfer into the voice mail recording process after the automatic routing process transferred the call to the called party's extension and there was no answer or the called party was on the phone and refused the second call. Block 782 represents the process of playing an outgoing message that informs the caller that she can either leave a message or enter the extension of another party or press one or more keys designated as a request to transfer to the operator or attendant. Step 784 represents the process of listening for any DTMF tones entered by the caller indicating transfer to the attendant or another extension is desired instead of leaving a voice mail message. Step 786 represents the process of determining if any DTMF tones have been entered. If DTMF tones identifying another party's extension or the extension of the operator have been entered, the process of block 788 is performed to transfer the call to the requested extension or to the attendant if that is what the caller requested. This can be done in the preferred embodiment by vectoring processing to step 200 on FIG. 8A, but, in other embodiments, it can be done in any other known way. Processing for this branch is then done, and processing returns to the main loop, as symbolized by block 798.

Figure 13:
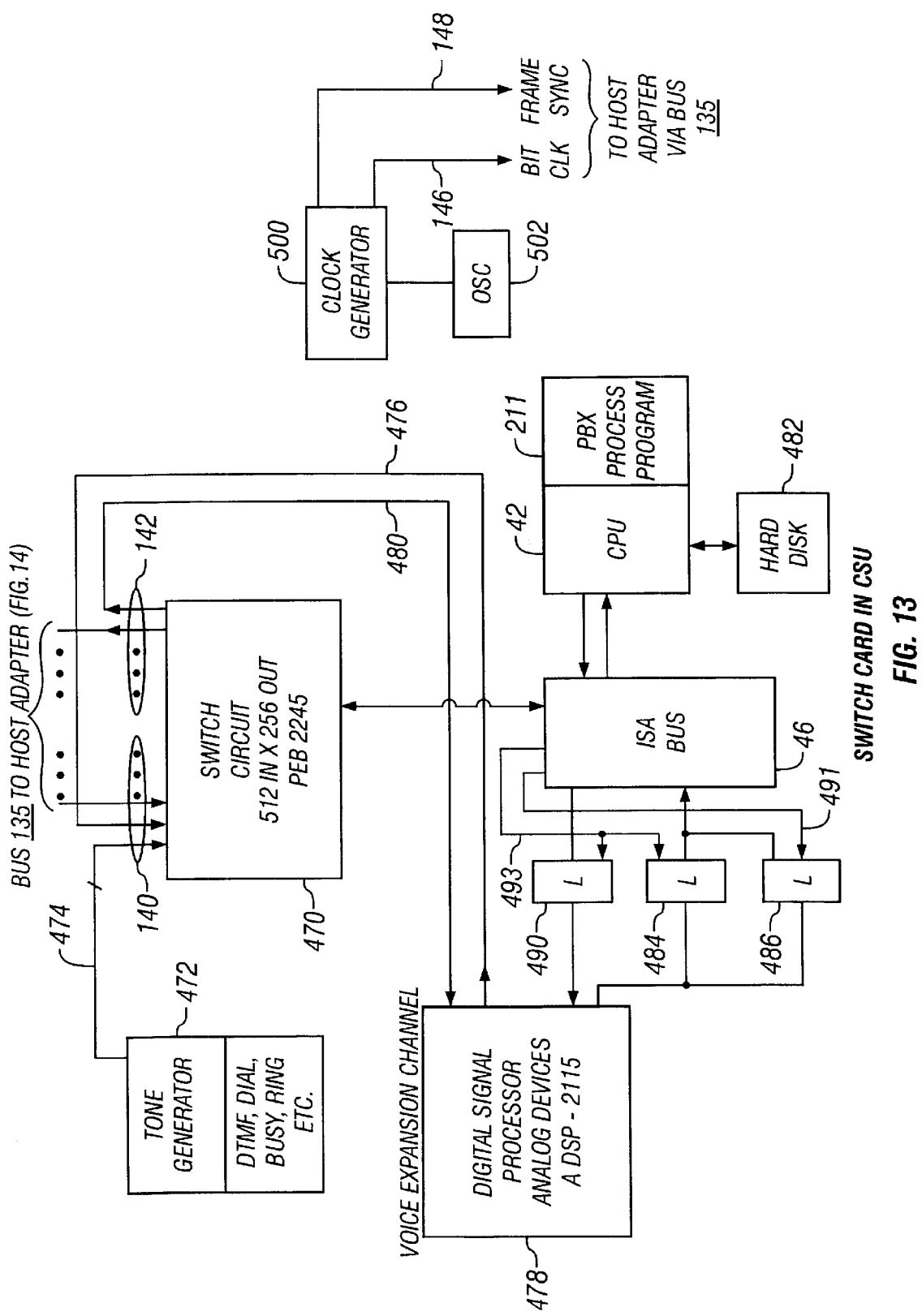
FIG. 13 is a block diagram for the switch card circuit 58 in FIGS. 1 and 7.

If test 786 determines that no DTMF tones were entered, step 790 is performed to order the switching circuit 470 on FIG. 13 to connect the timeslot dedicated to the voice mail recording beep tone to the CO line that has the incoming call. This indicates to the caller that voice mail recording is occurring. The caller can then record a voice mail message. If the caller inadvertently has waited until after the beep and finds herself in record mode and decides that she wants to be transferred to another party, she can press the # key to stop the recording and get more dialing options or she can press the 0 key and get transferred to the attendant. Block 790 represents the process of listening for the # key or 0 key DTMF tones during the voice mail recording interval. Voice mail recording is stopped if either the # key or 0 key is pressed or if a timeout occurs or the caller hangs up. In DTMF mimic recognition embodiments where the DTMF tones and mimics thereof are recognized during the recording process and eliminated before the voice mail message is stored on the CSU hard drive, the # or 0 DTMF commands will be recognized and erased, but they will still cause more dialing options to be presented or transfer to the operator, respectively.

Test 792 determines if the # or 0 key has been pressed. If not, the process of block 794 is performed to store the voice mail message on the CSU hard drive, and, if DTMF commands or mimics have not already been removed, optionally to remove them. Voice mail processing is then done for this branch and processing returns to the main loop.

If test 792 determines that the # or 0 key has been pressed, the process represented by block 796 is performed to transfer the call to the attendant if the 0 key was pressed or to play an outgoing message giving the caller more options if the # key was pressed. Processing is then done and returns to the main loop, as symbolized by block 798.

Figure 7:
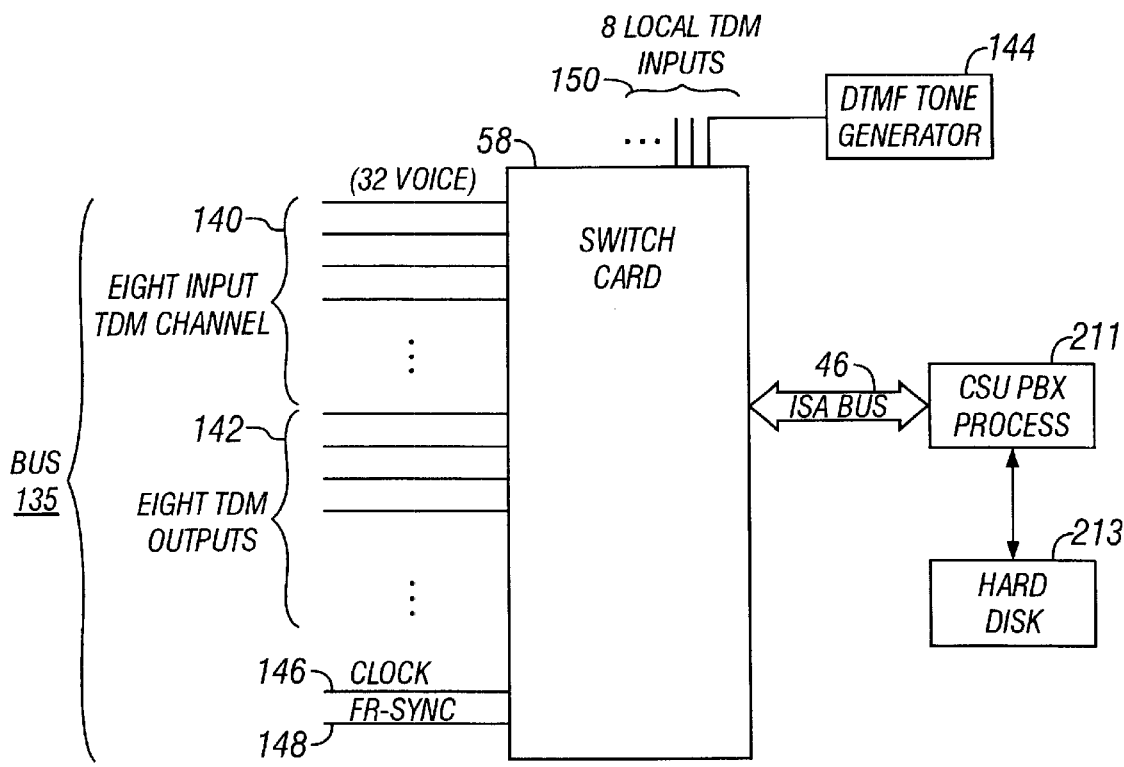
FIG. 7 shows a diagram of the inputs and outputs to the switch card.

Referring to FIG. 7, there is shown a diagram of the inputs and outputs to the switch card C in FIG. 2. The bus 135 is coupled to the switch card by eight time division multiplexed inputs 140 and eight time division multiplexed outputs and clock and frame sync inputs. A DTMF tone generator 144 of known structure is also coupled to the switch card to generate DTMF tones for dialing, ring signals, busy signals etc. used for user feedback on call progress or so-called ring back signals. Bus 135 also includes a 2.048 MHz bit clock signal on line 146 and a frame synchronization signal on line 148 which synchronizes all frames. The bit clock synchronizes each channel also. Each of the 8 TDM inputs and outputs can carry up to 32 channels of voice conversation simultaneously such that even if two PEUs are ganged together and all 8 CO ports are in simultaneous use, the total of 16 CO ports times two sides of every conversation makes 32 channels, all the data of which can be carried on the 32 timeslots of one of the 8 TDM inputs or outputs or both thereby still leaving a large capacity for internal conversations from extension to extension. The switch card also has 16 more input lines 150 each of which has 32 timeslots which are used for local communications and are not part of bus 135.

The switch card has a switch chip which can couple any timeslot on any input line to any timeslot on any of the output lines. The switch card is controlled by the CSU process to make the appropriate connection when appropriate in the transfer process.

Figure 8A:
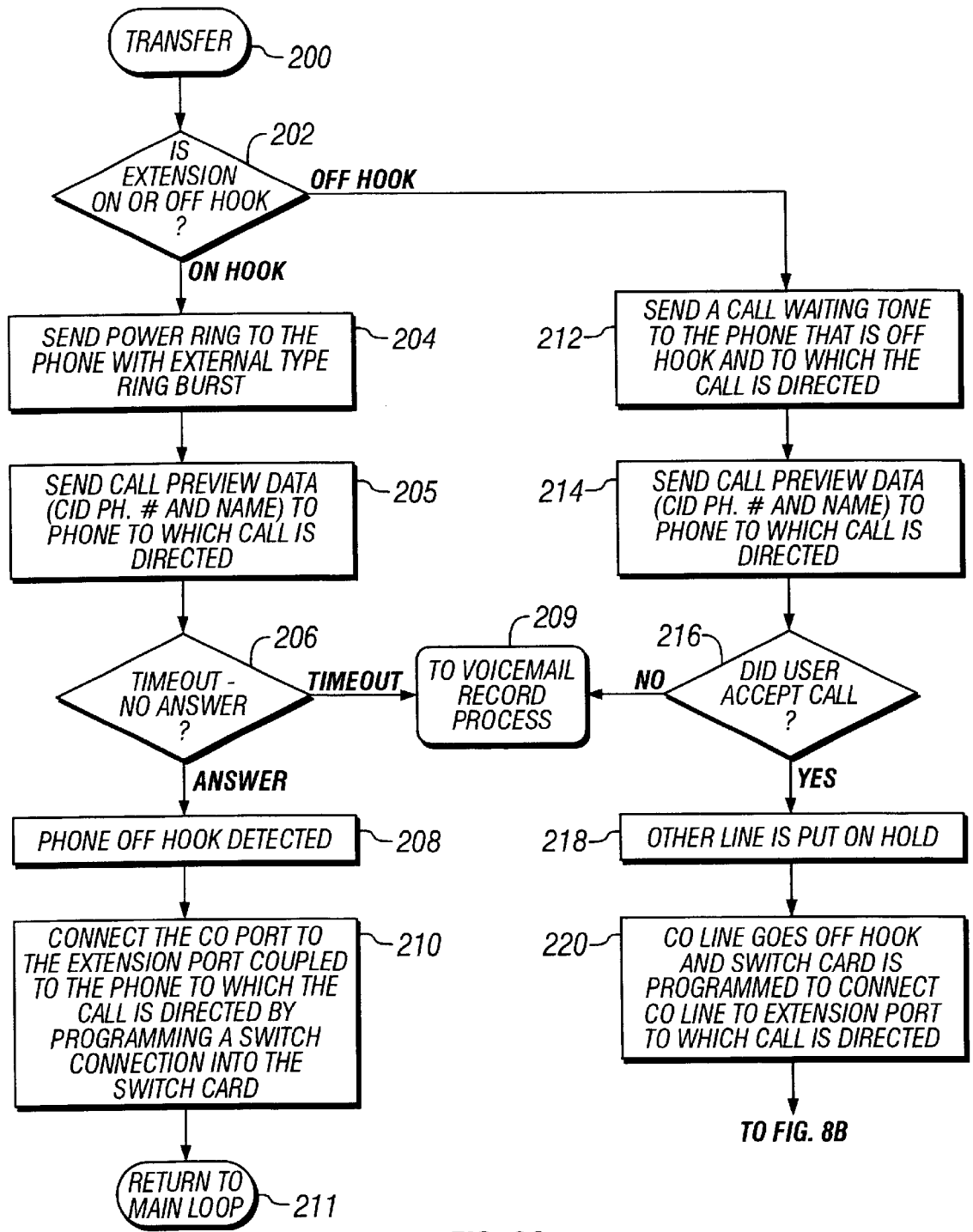
FIGS. 8A and 8B, taken together, comprise a flow chart of the process of transferring a call to the appropriate extension represented by block 132 in FIG. 6.
Figure 8B:
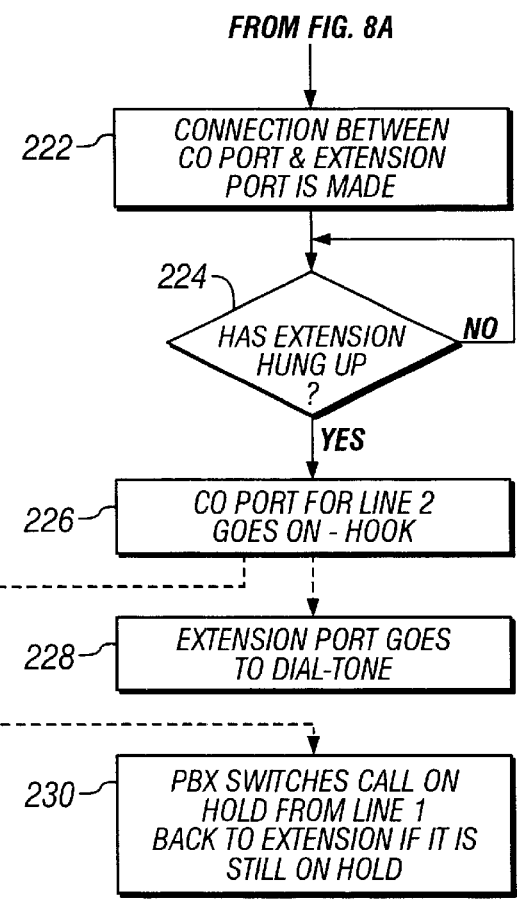

FIGS. 8A and 8B, taken together, comprise a flow chart of the transfer process represented by block 132 in FIG. 6. The process starts at block 200. Block 202 is a test to determine whether the extension is on or off hook. The extension-only ports are all on board B of the PEU. This board will be described in more detail later, but suffice it to say that it has a hybrid circuit for each port which senses the on or off hook status of the extension phone for that port. This status is converted to a digital logic level and transferred to the host adapter via bus 14. Typically, the CSU keeps a table in memory with the on-hook or off-hook status of each extension stored in it. Whenever a change occurs, the table is updated. The on-hook or off-hook status of each extension is included in one or more data bits of a serial stream of bits transmitted by a parallel-in, serial-out shift register on board B coupled to the hybrids assigned to all the ports to which that particular board B connects. Test 202 samples this status information from the table.

If the extension phone to which the call is directed is on-hook, the CSU sends a command to the host adapter 52 in FIG. 4 to generate a power ring tone command and send it to the extension phone to which the call is directed. The PEU receives the power ring tone command and generates a power ring tone and sends it out to the extension phone. This process is symbolized by block 204 in FIG. 8A.

Next, step 205 is performed to send call preview data in the form of the caller ID data of the caller to the phone to which the call is directed.

Step 206 in FIG. 8A is a test to determine if the external ring tone has been ringing for a time longer than the time out interval. If it has, the CSU PBX process 211 in FIG. 7 sends command packets to the switch card 58 to cause it to set up a connection between the CO port of the PEU and the voice mail box for the person assigned to the extension phone which did not answer, as symbolized by step 209. This is done by taking the data from the timeslot assigned to the CO port of the PEU upon which the call arrived on one of the eight TDM inputs 140 in FIG. 7 and placing it in whatever timeslot on one of the eight TDM outputs 142 that is assigned to that person's voice mail box. One of the TDM output lines 142 is coupled to a digital signal processor (not shown) on the switch card 58 in FIG. 7 which is programmed to record voice mail messages, remove any DTMF tones or DTMF mimics from the recording and store the data on a hard disk or other memory 213 by transferring it to the CSU process which stores it on hard disk.

Step 208 represents the process of determining that the called party answered by virtue of his or her phone going off-hook.

Block 210 represents the process of causing a connection between the PEU port coupled to the CO via the phone line on which the incoming call arrived to the PEU port to which the extension being called is connected. This process entails the steps of converting the incoming voice to digital data in the PEU, transmitting it to the host adapter and then to the switch card, ordering the switch card to take the data out of the timeslot in which the incoming data from the CO is arriving at the switch card and putting it in whatever timeslot is assigned to transmitting data to the extension phone to which the call is directed. The incoming data is then transmitted in the assigned timeslot over bus 14 to the PEU where it is converted to analog signals and coupled to the proper port to which the extension phone is connected and transmitted to that phone over bus 16. Voice signals in analog form coming from the extension phone are transmitted back to the PEU over bus 16, converted to digital data in the PEU and put in another timeslot assigned to return signals and transmitted via bus 14 to the host adapter and then to the switch card. The switch card takes this data out of the return timeslot and puts it into whatever timeslot is assigned to return data to the CO and transmits the data through the host adapter to the PEU over bus 14 where it is converted to analog signals on board C and coupled through board A to the port coupled to the CO via the telephone line on which the incoming call arrived. Processing then returns to the main program loop, as symbolized by block 211.

Returning to step 202, if the extension is off-hook, step 212 is performed to send a call waiting tone to the phone (the use of the term phone or extension or telephone here and in the claims should be understood as including TAPI compliant telephone equipment coupled to computers such as modems etc.) to which the call is directed that is off-hook. This is done by the CSU process sending a command to the switch card 50 commanding it to couple the DTMF tone generator 144 call waiting tone generated in a particular timeslot by tone generator 472 in FIG. 13 to the extension being called. This call waiting tone data is put into the timeslot dedicated to data being sent to the particular extension to which the call is directed. The data is then transmitted to the extension by the same process detailed above for sending voice data to the phone.

Step 214 is then performed to send call preview data to the extension. The call preview data is the caller ID number and name, if any, from the incoming call. If the extension is coupled to a Dash phone (Picazo Communications was formerly known as Dash) or to a PCOM card 26 or PCCL card 30, it is possible to preview a call on a display either on the Dash phone or on the display of the computer to see who is calling when a call waiting tone is heard. In step 216, the CSU process determines if the user accepted the call or not.

The process of step 216 is not done if the user has a regular phone since a regular phone cannot receive a second call when it is off-hook.

It the extension which received the call waiting tone is either a Dash phone or any other station equipment such as the PCOM or PCCL card, the process of accepting the call is different. Thus, test 216 has different processing branches which are intended to handle any situation with regard to which type of phone or station equipment is coupled to the extension. If the user is using a Dash phone, the user can preview the waiting call by pressing the line 2 button once. This brings up a display of the name and number sent in step 214. In the case of PCOM or PCCL, the user gives a preview command on his keyboard to bring up a display of the caller ID data. If the user decides to accept the call on a Dash phone, the line 2 button is pressed again. If the user decides to accept the call on station equipment such as a PC coupled to the extension line via the PCOM or PCCL cards, the user gives an accept command. These commands are stored in buffers in the Dash phone or station equipment. The CSU periodically polls all the extensions to determine which commands have been given. This is done by sending a command packet to the host adapter telling it to poll the extensions. The host adapter sends out inquiry packets to each extension via the bus 14 and the T1 and R1 digital lines of bus 16. When these inquiry packets arrive at each Dash phone or station equipment, the contents of the command buffer, if any, or a null response is sent back to the host adapter in a reply packet. The host adapter then stores the reply packet in memory and generates an interrupt to the PBX process. The interrupt service routine then reads the stored data and returns it to the PBX process. If the data shows that the user of a Dash phone has pressed line 2 twice or that the user of station equipment has given the command to receive the call, the PBX process proceeds to step 218.

Step 218 represents the process of putting the original line (hereafter line 1) on hold. This is done by connecting the port coupled to the CO by the telephone line carrying the original call to a source of a hold message such as music, promotions etc. This is done in the manner described above simply by the CSU central process sending a command packet or packets to the switch card instructing it to connect at least the outgoing timeslot for data to the CO on line 1 to a timeslot carrying the hold message data and transmitting this data to the PEU as described above for conversion back to analog signals and coupling to the CO port coupled to line 1.

Step 220 represents the process of the CSU central process (hereafter the PBX process) starting to connect the new call on line 2 to the extension that indicated it wanted the call in response to the call waiting tone. This is done by sending a command to the hybrid on board A in the PEU coupled to the port to which line 2 is connected. This command causes the hybrid to drive the CO line off-hook in step 220. Then, in step 222, the PBX process sends a command packet to the switch chip causing it to connect the timeslots of line 2 to the timeslots of the extension. These two switching events cause the following things to happen. When the CO port goes off-hook, the PEU then receives incoming voice signals and converts them to digital data and sends them to the host adapter via whatever timeslot on bus 14 which is assigned to incoming data. The PBX process may also optionally play a prerecorded message out on line 2 like, "One moment please while your call is being connected". This is done by accessing the digital data encoding the outgoing message and placing it in the timeslot assigned to outgoing data for the port coupled to line 2. The PBX process command packet to the switch chip causing it to couple line 2 to the extension causes data from the incoming and outgoing data timeslots for line 2 to be transferred from and to the outgoing and incoming timeslots, respectively, for the extension to which line 2 is to be connected, as those skilled in the art will appreciate. The other processing that occurs in the process of connecting line 2 to the extension is as described above.

The call then proceeds until it is terminated. When one conversant hangs up, the PBX process discovers that fact in step 224, and step 226 is performed wherein the PBX process sends a command to the hybrid on board A of the PEU port coupled to line 2 to cause it to set an on-hook condition for the line 2 tip and ring lines. Then, in step 228, the PBX process sends a command packet to the switch card 58 commanding it to connect the dial tone from the DTMF generator 144 to the extension phone that just hung up.

In an alternative embodiment, when the user hangs up or presses the line 1 button again or gives a "resume call 1" command on his or her station equipment, this fact is sensed by the PBX process, and line 1 is reconnected to the extension so that the call on line 1 can be completed, as symbolized by block 230.

Returning to step 216, if the user with his extension off-hook elects not to take the call, the PBX process sends a command packet to the switch chip to connect the timeslots of the incoming call on line 2 to the timeslots assigned to voice mail for that particular extension.

Figure 9:
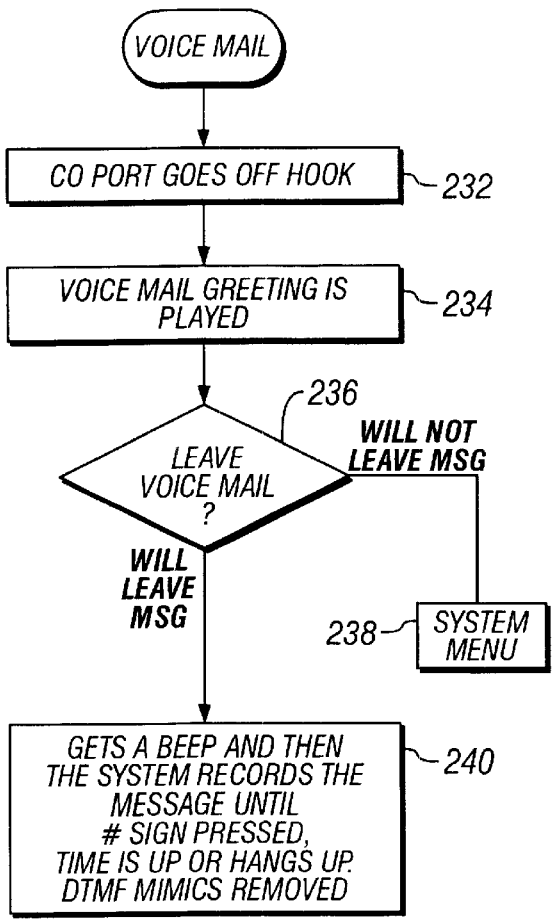
FIG. 9 is flow diagram of a process of recording a message in the voice mail box of a user with no re-routing of the voice mail message and no radio pager notification.

Referring to FIG. 9, there is shown a flow diagram of the process of recording a message in the voice mail box of a user. This is the process that is performed when step 209 in FIG. 8A is performed. The process starts with block 232 where the PBX process sends a command to the hybrid connected to the CO port of the PEU connected to the port on which the incoming call arrived to go off-hook. The PBX process then sends a command packet to the switch card ordering it to connect the incoming and outgoing timeslots dedicated to the CO telephone line to the outgoing and incoming timeslots of the particular voice mail box dedicated to the person to whom the call is directed. The PBX process determines the voice mail box to which the message, if any, is to be recorded, by examining the timeslot in which incoming data regarding this voice mail is received. In some embodiments, the PBX process sends a command packet to the digital signal processor (DSP) via the ISA bus after routing an incoming call to voice mail in steps 206 or 216 of FIG. 8A telling it the connection on which to record any message. The switching by the switch card 58 in FIG. 7 establishes the connection to the voice mail box.

The PBX process then, in step 234, retrieves the appropriate voice mail greeting for the voice mail box of the person to whom the call is directed. The PBX process transfers the data to the DSP which puts the data for this message in the outgoing timeslot that is dedicated to the CO line on which the call arrived. The digital data is transmitted from the switch card through the hardware adapter to the PEU where it is converted to analog voice signals and coupled onto the tip and ring lines of the CO line to the caller via board A.

In step 236, the PBX process determines whether the person calling will leave a voice mail message. In some embodiments, this can be done by monitoring for DTMF tones entered by the user indicating a desire to leave a message or to be routed back to the main menu for more options. The manner in which the PBX process determines whether the caller will leave a message is in the prior art and is not critical to the invention. If the user will not leave a message, step 238 is performed where the PBX process uses the DSP on the switch card to play a prerecorded message giving the caller the system menu options. If it is determined that the user will leave a voice mail message, the PBX process executes step 240. There, the PBX process sends a command packet to the DTMF tone generator coupled to the switch card commanding it to generate a beep and sends a command packet to the switch card so as to cause the beep data from the DTMF tone generator to be coupled to the timeslots of the CO line of the incoming call to tell the caller that the system is ready to record the voice mail message. Then, after the beep, the PBX process sends a command packet to the switch card ordering it to connect the timeslots of the CO line having the incoming call to the timeslots of the voice mail box of the called person. The incoming voice signals are then converted to digital data on card C of the PEU and shipped on the timeslots dedicated to the CO port having the incoming call to the host adapter where they are transferred to the switch card. The switch card puts this data in the incoming timeslot of the appropriate voice mail box. The data is received by the DSP on the switch card and processed to remove any DTMF tone or DTMF mimics and then sent over the ISA bus to the PBX process 211 in FIG. 7 for storage on the hard disk 213. The manner in which DTMF mimics are removed is discussed in detail in the parent case, Ser. No. 09/019,193, filed Feb. 5, 1998, the discussion of which is hereby incorporated by reference.

Figure 10:
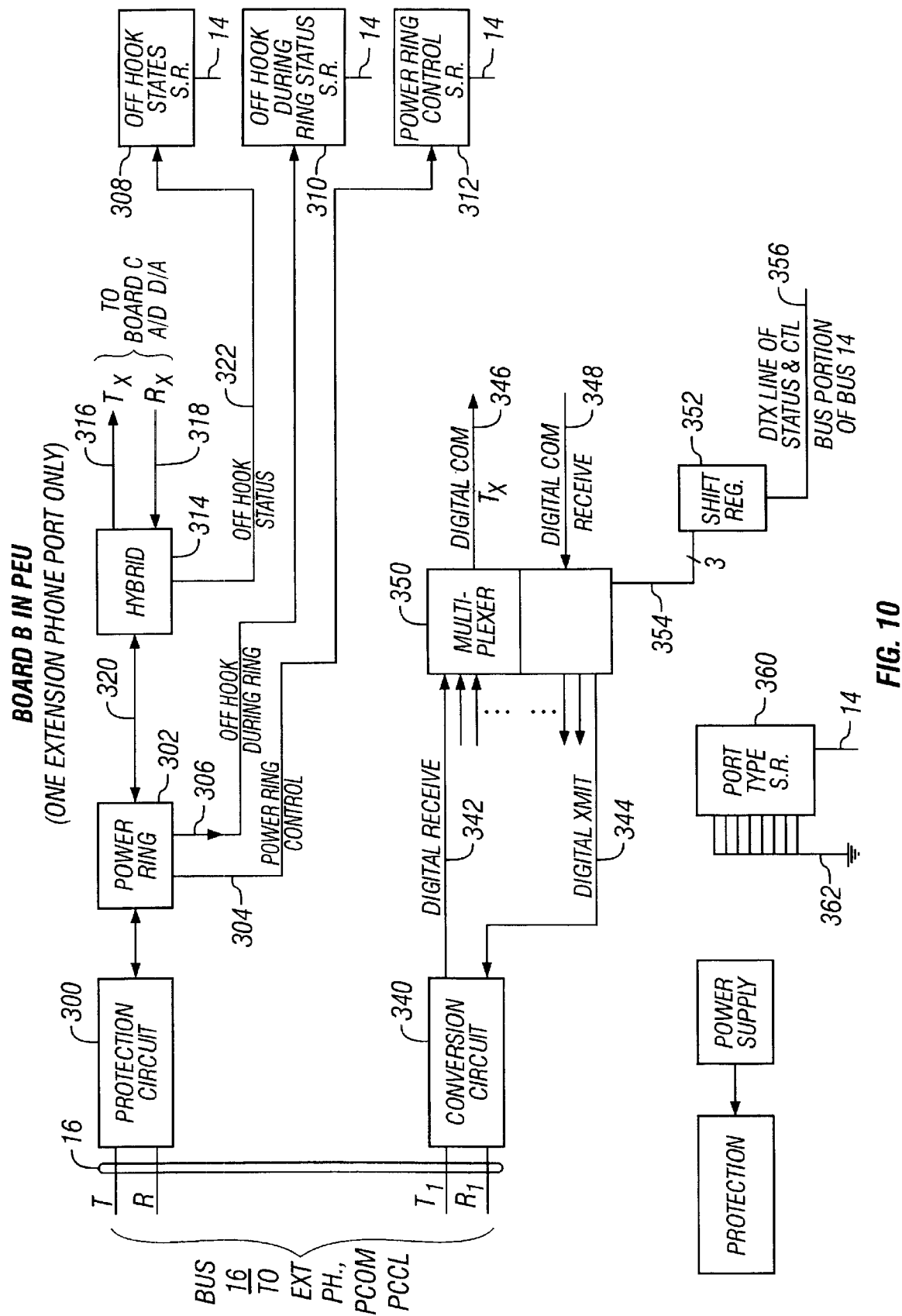
FIG. 10 shows a block diagram of the circuitry for one extension phone port on board B in the PEU 10 in FIG. 1.

Referring to FIG. 10, there is shown a block diagram of the circuitry for one extension phone port on board B in the PEU 10 in FIG. 1. The extension phone or PCOM or PCCL station equipment is connected by bus 16 to a protection circuit 300. Analog tip and ring lines T and R carry the voice signals while digital T1 and R1 lines carry digital data for use by either a Dash phone or station equipment. The protection circuit is coupled to a power ring circuit which has an input 304 and an output 306. A Control input signal on line 304 tells the power ring circuit whether or not to ring the phone. An Off Hook During Ring status output on line 306 is a digital signal which is sent to the host adapter in the CSU via shift register 310 and bus 14 to tell it that the extension phone or station equipment picked up during the power ring. The digital Control input signal on line 304 is sent to the power ring circuit 302 via the status and control portion of bus 14 and shift register 312. The Control signals for each port on board B are sent from the CSU to shift register 312 in serial form and are output in parallel form to all the power ring circuits like 302 simultaneously. Upon activation of the Power Ring Control signal on line 304, the Power Ring circuit 302 generates a high power ring signal which is sent out to the extension telephone via the analog tip and ring lines to cause the extension phone to ring.

The Off Hook During Ring signal on line 306 is sent to the CSU, as are similar signals from the other ports, via shift register 310 and bus 14.

The power ring circuit is coupled to a 2-wire-to-4-wire conversion hybrid 314. This hybrid converts the bidirectional analog signals on pair 320 to unidirectional analog signals on TX pair 316 and RX pair 318. Pairs 316 and 318 are coupled to board C for digital-to-analog conversion and an analog-to-digital conversion, as appropriate depending upon the direction of flow of data. Hybrid 314 generates a single bit Off Hook Status signal on line 322 which is sent to the CSU via shift register 308 and bus 14. The Off Hook Status signal on line 322 tells the PBX process in the CSU that somebody has just picked up the extension phone whereas the On/Off Hook status signal on line 96 in the board A block diagram of FIG. 4 tells the PBX process when the CO telephone line has gone off hook.

Two digital lines T1 and R1 on bus 16 couple the extension phone or CTI station equipment to a conversion circuit 340. This circuit functions to take Digital Receive and Digital Transmit signals from the status and control bus on line 342 and 344, respectively, and puts them on the T1 and R1 lines with a known protocol and packet type. The data on lines 342 and 344 arrives from the host adapter of the CSU 40 via the Digital Corn TX line 346 and Digital Corn Receive line 348 within bus 14 on FIG. 1. These digital communication lines 346 and 348 are used to send and receive data to/from one port at a, time using a multiplexer 350 and shift register 352. The shift register 352 has three parallel outputs 354 which are coupled to the select inputs of multiplexer 350. The shift register outputs 354 control which of the multiple Digital Receive inputs like line 342 received from the various ports is coupled to Digital Corn Tx line 346 and which of the multiple Digital Xmit lines 344 from the various ports are coupled to Digital Corn Receive line 348. The selection criteria data is sent to the shift register 352 via the DTX line 356 of bus 14 in serial form.

The DRX, DCK and XFER lines in FIG. 5 which form part of the status and control bus portion of bus 15 are used to monitor status of the following signals: Ring Detect status for CO line on line 84 in FIG. 4; On/Off Hook status for the extension phone or station equipment on line 322 in FIG. 10; Off Hook During Ring status for the extension phone on line 306 in FIG. 10; Port Type (CO or extension) on line 362 from shift register 360 in FIG. 10; tone identity and tone valid status for DTMF signals from all 16 PEU ports; Loop Current Present on line 97 in FIG. 4; Digital Ring signal on line 84 in FIG. 4 indicating when a CO line is ringing.

The DTX, DCK and XFER lines in FIG. 5 are used to control the logic level of the following signals thereby controlling certain events: CO line Off Hook on line 96 in FIG. 4; Power Ring Control on line 304 in FIG. 10 controlling power ringing of an extension or station equipment; and port selection for the Digital Corn TX and Digital Corn Receive lines 346 and 348 on FIG. 10.

The status and control portion of bus 14 is divided into bits, with one or more bits dedicated to a particular port. This allows the PBX process of the CSU to monitor digital status of each CO or extension port and to send digital control data to all CO and extension ports so as to operate the phone system.

In an alternative embodiment, the data on the digital communication lines 346 and 348 in FIG. 5 could be put in additional timeslots on the DTX and DRX lines such that the digital communication lines 346 and 348 could be eliminated while retaining the functions carried out by the data transmitted thereon.

Figure 11:
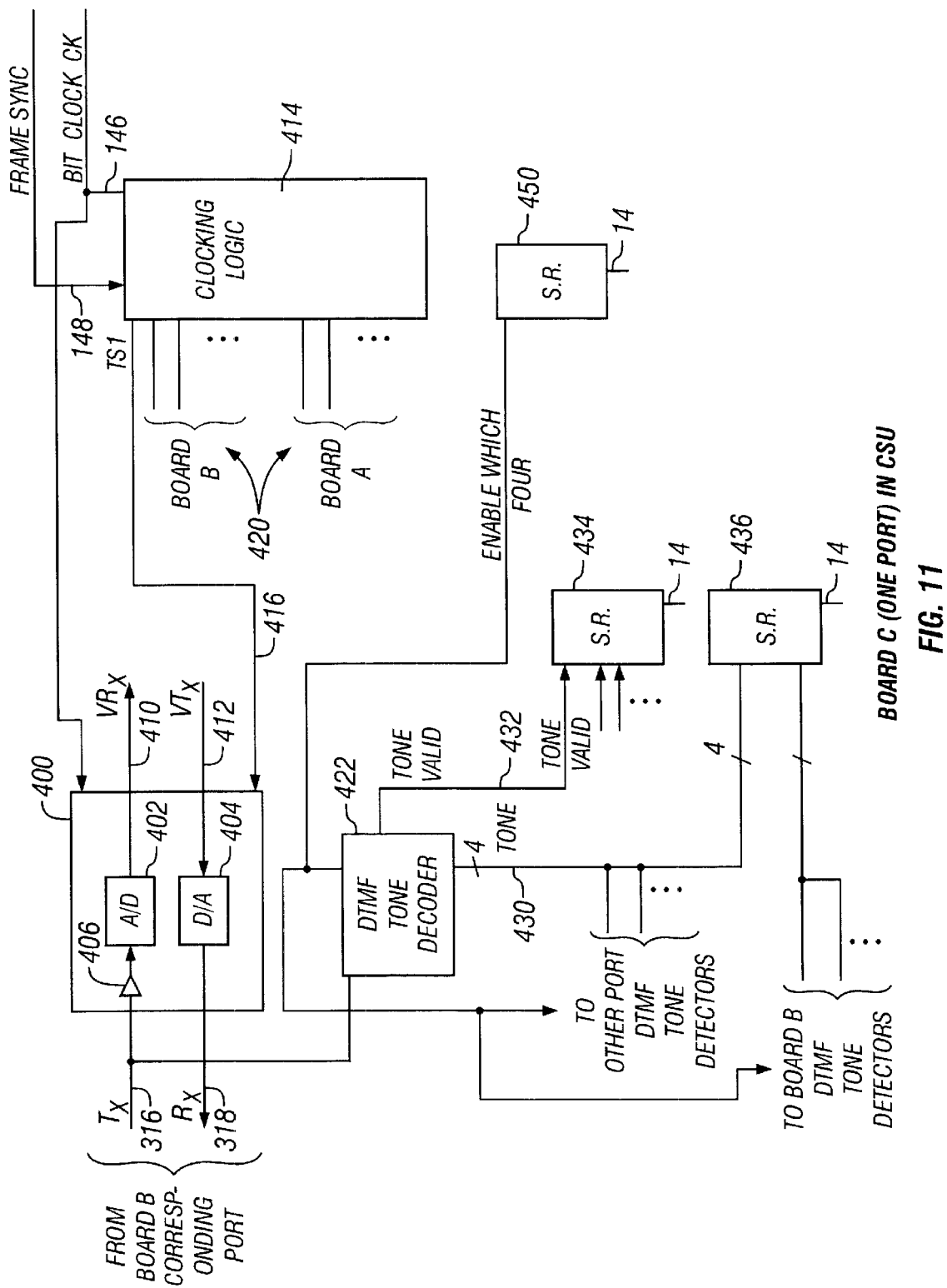
FIG. 11 is a block diagram of the circuitry on board C in the PEU for one port.
Figure 12:
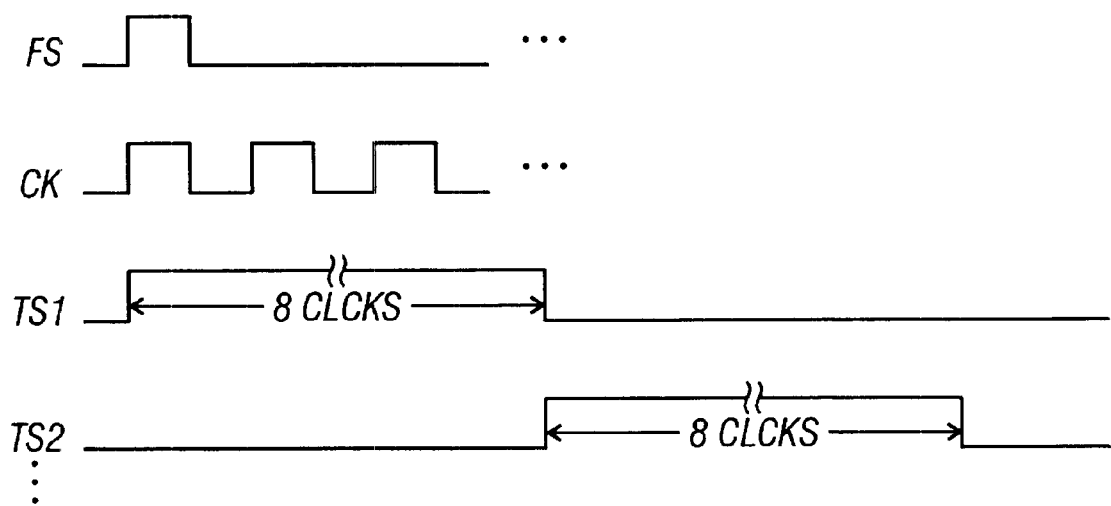
FIG. 12 is a timing diagram that shows the relationship between the frame synchronization signal FS and the bit clock signal CK and the various timeslot control signals TS1, TS2 etc.

Referring to FIG. 11, there is shown a block diagram of the circuitry on board C in the PEU for one port. Board C has a codec 400 with an analog-to-digital converter 402 and a digital-to-analog converter 404 and an amplifier 406. The codec 400 is coupled to the hybrid on board B or board A of the corresponding port by a TX line 316 and a RX line 318. The TX line is coupled to the A/D converter to convert the analog signal from amplifier 406 to digital data on a VRX line 410. The codec 400 is coupled to TDM multiplexing circuitry in the form of clocking logic 414 which is also shared by the codec circuitry for all the other ports as well. The function of the clocking logic is to use the bit clock signal on line 146 and the frame synchronization signal on line 148 to generate a control signals that tell each codec when to output its next byte of voice data on line VRX and when to input its next byte of input data on line VTX. The control signals define the timeslots dedicated to each port and tell the codec when their timeslot is happening. A TS1 signal on line 416 is the control signal that tells codec 400 when its timeslot is occurring and causes the codec to put the received data on VRX into the proper timeslot on bus 14 and to take data off bus 14 as the VTX data on line 412. The Bit Clock signal on line 146 also supplies a clock for the converters in codec 400 and for clocking logic 414. The timeslot control signals for the other ports are shown generally at 420. A timing diagram that shows the relationship between the frame synchronization signal FS and the bit clock signal CK and the various timeslot control signals TS1, TS2 etc. generated by clocking logic 414 is shown in FIG. 12.

Each port also includes a DTMF tone decoder 422 which takes the analog signals received on line 316 from the CO or extension port and decodes any DTMF tones in these signals. The identity of the DTMF tone is output as four bits on bus 430 which is shared by the other DTMF tone detectors for the other ports. Each DTMF tone detector has a tristate driver on its Tone output. A shift register 450 serves to enable the DTMF tone detectors in a polling sequence. The polling sequence data is received from the status and control portion of bus 14. The polling data loaded serially into shift register 450 is output in parallel form and enables only the DTMF tone detectors whose output data is to be read at any particular time.

The DTMF tone detector also outputs a Tone Valid signal on line 432 which is input to a shift register 434. The Tone Valid signals of all the other DTMF tone detectors for the other ports comprise the rest of the inputs for the shift register 434. This shift register has its serial data output coupled to the status and control portion of bus 14. The four bits of the Tone signal on bus 430 are loaded into a shift register 436. The Tone signals from the DTMF tone detectors of the other ports comprise the other inputs of the shift register 436, and its serial data output is coupled to the status and control portion of bus 14.

Referring to FIG. 13, there is shown a block diagram for the switch card circuit 58 in FIGS. 1 and 7. A switching integrated circuit (PEB 2245) 470 (hereafter "switch chip") performs the function of transferring data between timeslots coming in from the extensions to timeslots which are outbound for other extensions or the CO and vice versa. The switch chip 470 has 16 individual inputs that form a time division multiplexed input channel 140 and 8 outputs that form a time division multiplexed output channel 142. Each of the 16 input lines to the switch chip has 32 input timeslots, and each of the 8 output lines has 32 output timeslots. The switch chip can connect any timeslot to any other timeslot and can connect one timeslot to all timeslots for broadcasts such as paging.

A tone generator circuit 472 functions to generate DTMF tones, dial tones, busy tones, ring tones etc. These tones, in digital format, are coupled via bus 474 to one of the inputs of the TDM input channel 140 of the switch chip. The DTMF tone generator basically generates 32 different tones and puts each tone into a different timeslot on bus 474. Thus, the switch chip 470 can be controlled by microprocessor 42 running PBX process 211 via ISA bus command packets on bus 46 to select any tone needed at any particular time by taking data out of the timeslot on bus 474 dedicated to that particular tone. With regard to control of the switch chip 470 by the PBX process, ISA bus 46 is shown as a block with individual lines running out to the various circuits on the switch card. Each such individual line represents a connection to the address, data and control signals of ISA bus 46.

One of the switch chip input buses 476 is coupled to a digital signal processor 478 functioning as a voice expansion channel to add voice mail capability to the system. Likewise, one of the switch chip output buses 480 is also coupled to the DSP 478. The switch chip can therefore couple any CO line or extension port to the DSP 478 by coupling the appropriate timeslots on the input and output lines coupled to the appropriate port to the appropriate timeslots on the input and output buses 480 and 476. The DSP 478 is programmed to recognize DTMF tones or DTMF mimics during the process of recording voice mail messages and eliminate them either immediately or mark them and go back later and erase them. The voice expansion unit 478 functions to record voice data on any timeslot which is coupled onto its input bus 480 and record this data after the DTMF recognition processing on hard disk 482 via the CPU 42 and the PBX process 211. This is done by the voice expansion channel taking data out of the appropriate timeslot on its input bus 480 and processing it to remove any DTMF tones or mimics, and then formatting the data into ISA bus packets and transmitting it to CPU 42 and PBX process 211 via latch 484 in a DMA process for recording on hard disk 482. Latch 486 is a control latch. The latches 490, 484 and 486, are, in addition to being coupled to the data path of the ISA bus, are also coupled to address and control signals of the ISA bus, as represented by lines 491 and 493. The PBX process takes the raw voice data transferred in this way and attaches header information and records it in a file on the hard disk. The voice data in the timeslots on buses 480 and 476 is just raw voice data since each port has a dedicated transmit timeslot and a dedicated receive timeslot so no header information is needed when connecting the bytes in these timeslots to assigned timeslots on buses 480 and 476.

The DSP 478 also functions to play prerecorded message data from the hard disk 482 such as voice mail announcements and put them onto its output bus 476 for coupling through the switch chip 470 to the CO telephone line or some extension. The PBX process aids performance of this function by requesting access to the file on the hard disk having the prerecorded message announcement data. The data is then moved off the hard disk and put into the memory of the CPU 42 and then moved through the ISA bus interface 46 and latch 490 via DMA transfer into the memory of DSP 478 as ISA packets. DSP 478 takes the packetized data out of its memory and reassembles the data into a format suitable for transmission to the switch chip in the appropriate timeslot on bus 476 in the proper sequence. The switch chip then takes the data out of the assigned timeslot from the DSP and puts it on the timeslot assigned to the destination CO or extension port. This data then flows over bus 135 in FIG. 1 to the host adapter 52. At the host adapter, the data from the appropriate timeslot on the appropriate output line from the switch chip is multiplexed into the appropriate timeslot on bus 14 and sent to board C of the PEU 10. There, it is received on the VTX line 412 on FIG. 11 for the appropriate port and converted to analog voice data and transmitted out on the RX line 318 for the appropriate port. Assuming the appropriate port is an extension port, from the RX line 318, the voice signal travels to the hybrid 314 on FIG. 10 for the appropriate port via bus 137 in FIG. 2 and is then sent out to the extension phone or station equipment via bus 16 in FIG. 1.

The process to record a voice mail message is the reverse of the above described process except that the DSP 478 finds any DTMF tones or mimics in the incoming data and eliminates them before sending the file to the PBX process for writing to the hard disk. The DSP 478 has the capability to record multiple voice mail messages on different timeslots on buses 480 and 476 simultaneously.

The switch card also includes watchdog timers (not shown) to reset the system if the software crashes, and a master clock generator 500 driven by an oscillator 502 to generate the bit clock signal on line 146 and a Frame Sync signal on line 148.

Figure 14:
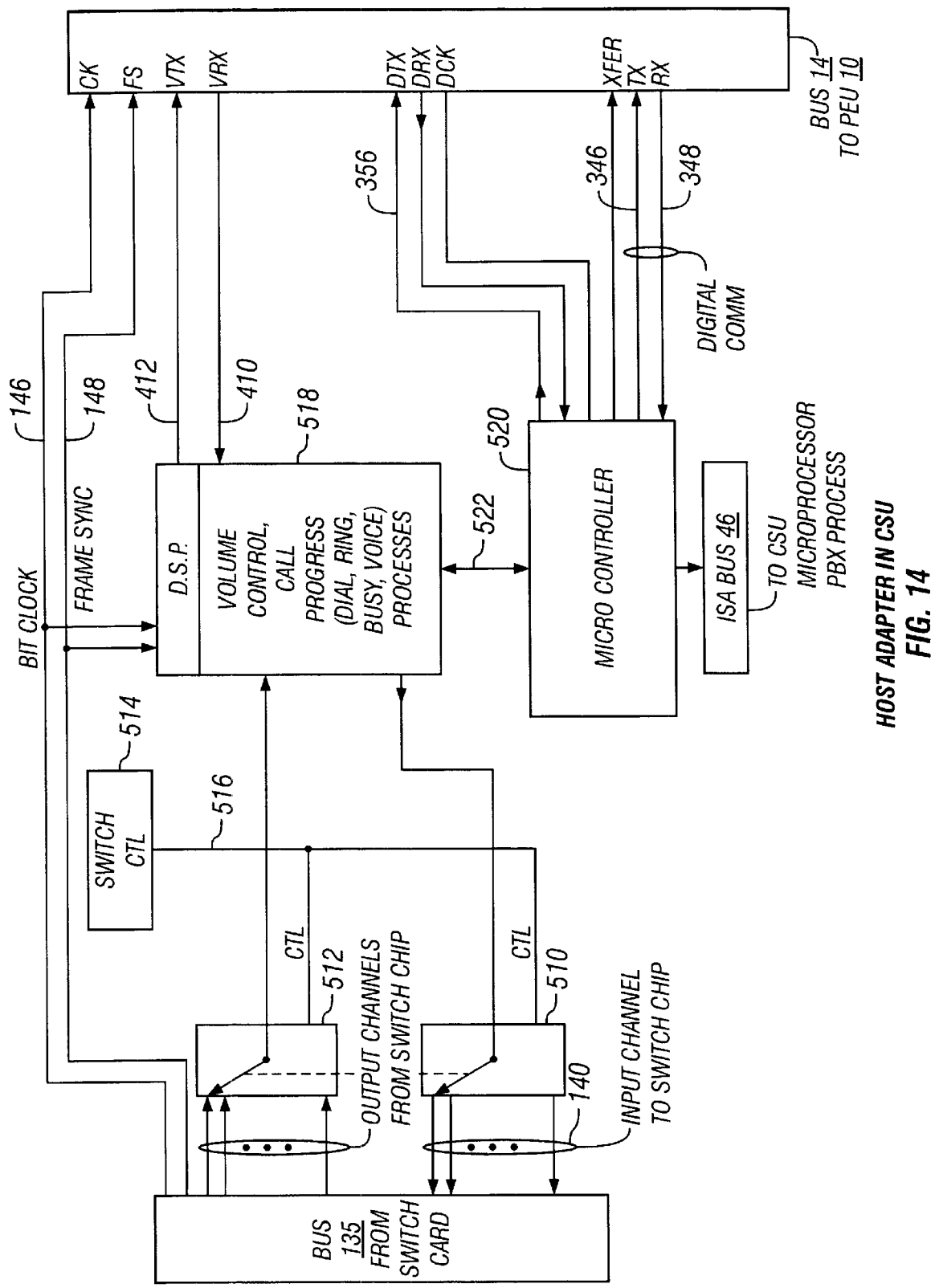
FIG. 14 is a block diagram of the host adapter in the CSU.

Referring to FIG. 14, there is shown a block diagram of the host adapter in the CSU. The host adapter is coupled to bus 135 such that seven of the eight input channels 140 of the switch chip on FIG. 13 are coupled to a switch 510, and seven of the eight output channels of switch chip 470 are coupled to switch 512. Switches 512 and 510 work as a pair under the control of switch control circuit 514 and a control signal on line 516. The function of the switches 512 and 510 is to pick one input channel and one output channel of the switch chip for coupling to a digital signal processor 518. Since each port has one channel comprised of a dedicated input timeslot and a dedicated output timeslot and since these timeslots must be on different input and output channels of the switch chip, the purpose of the switches 512 and 510 is to make sure the correct input and output channels of the switch chip for the particular conversation being processed are coupled to the DSP 518. Timeslot assignments are such that port 1 is on channel 1, timeslot 1 and port 2 is on channel 1, timeslot 2 all the way up to port 32 which is on channel 1, timeslot 32. Port 33 is on channel 2, timeslot 1. Each PEU is 16 ports for a total of 32 timeslots assigned to it. One host adapter can handle two PEUs because the PEUs can be chained together by an extension of bus 14.

The DSP 518 is programmed to perform various functions for each conversation in the 32 input and output timeslots to which it is connected. Those functions include volume control, call progress monitoring etc. The call progress monitors involves determining whether voice data is present, whether there is a dial tone, ring signal, busy signal etc. The processed data is transmitted to and received from the PEU via the voice data lines VTX and VRX, 412 and 410.

The Bit Clock signal CK on line 146 and the Frame Sync signal FS on line 148 generated on the switch card simply pass from bus 135 to bus 14 for transmission to the PEU. These two signals are also coupled to the DSP 518.

A microcontroller 520 loads the program into the DSP 518 at powerup time and sends volume control commands to the DSP via bus 522 and receives call progress updates from the DSP. The volume control commands are static commands and do not currently implement automatic volume control. The microcontroller 520 is also coupled to the status and control lines DTX, DRX, DCLK, XFER, TX and RX and Digital Comm lines 346 and 348 of bus 14. The microcontroller 520 drives the control signals on the control lines of bus 14 in accordance with commands received from the PBX process 211 in FIG. 7 via command packets received over the ISA bus 46. Likewise, status information received over the status monitoring lines of bus 14 is formatted by the microcontroller 520 into ISA bus packets and sent via ISA bus 46 to the PBX process 211. If caller ID information or other digital data for the user interface needs to be sent to the phones themselves, the PBX process sends that data to the microcontroller in ISA bus packets which depacketizes them and sends the data to the phones via the Digital Comm lines 346 and 348.

Figure 15:
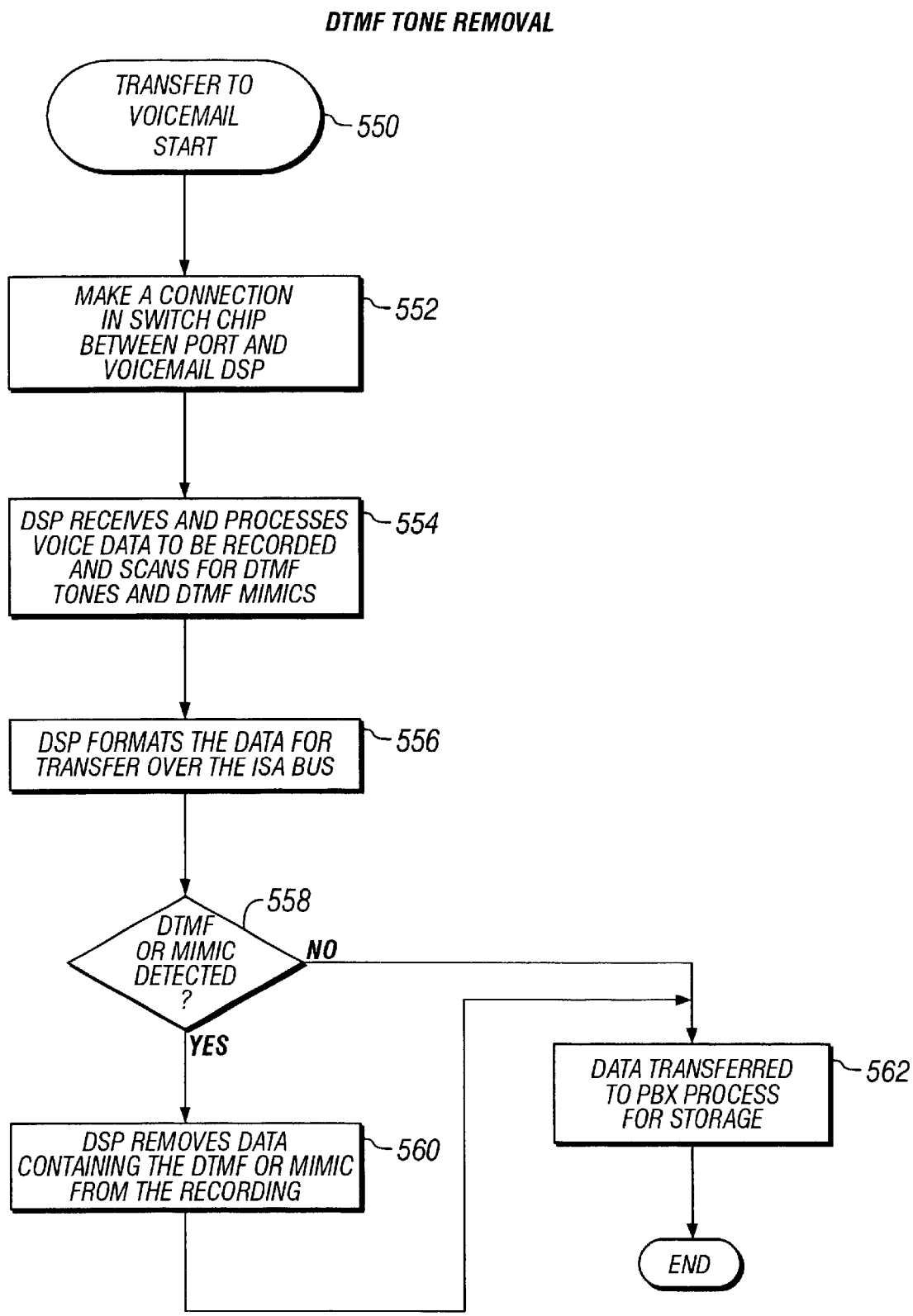
FIG. 15 is a flow diagram of a voice mail recording process wherein DTMF tones or mimics are detected during the recording process and removed from the recording.

Referring to FIG. 15, there is shown a block diagram of the preferred voice mail recording process. The process starts at block 550 which symbolizes the start of the voice mail recording process. The invention of scanning for DTMF tones or mimics in data to be recorded as a voice mail message is intended to be a stand alone invention and can be employed in any telephone or voice mail/answering machine system. As such, it does not depend upon the particular hardware disclosed herein or the other processes disclosed herein regarding how that hardware works to perform various of the other functions described. The telephone system described herein is intended to be only one example of the many systems in which the invention can be usefully employed. Any system which performs the functions of scanning for DTMF tones or mimics in the data to be recorded as a voice mail message or which has already been recorded as a voice mail message and then either removes the data containing the DTMF tone or mimic or alters it so that it will not be recognized as a DTMF tone upon playback will fall within the genus of the invention. The removal or alteration can be performed either in real time as the data is being recorded or by marking the portions of the recording that have to be further processed and returning later and either removing the data or altering it. In the particular phone system described herein, the invention is employed as follows. In block 552, the PBX process sends commands to the switch card via the ISA bus commanding it to make a connection between the time slots dedicated to the port having the incoming call and the DSP 478 on FIG. 13. This connects the digital data to be recorded as a voice mail message to the DSP and data starts to flow over bus 480 to the DSP. In step 554, the DSP receives and processes the voice data to be recorded as a voice mail message and scans each block of data to be recorded for the presence of DTMF tones or DTMF mimics.

The term "DTMF tone" as used in the drawings, herein and the claims is to be understood as a pair of tones having characteristics such that they would be interpreted as a DTMF command. The term "DTMF mimics" as used in the specification and drawings herein and in the claims means signals which are actually voice but which contain sufficient energy at certain Fourier spectral components and with certain DTMF characteristics as to the amount of power in each component and the relative amplitudes between the components to be mistaken in a DTMF tone detector as being a DTMF tone or command.

In an alternative embodiment, the process of block 554 can also be performed on data already recorded as a voice mail message by requesting a read of the data on the hard disk recorded as a voice mail message. In this alternative embodiment, step 556 may not need to be done since the data will arrive from the PBX process 210 already in ISA bus packets. The manner in which the DTMF tones or mimics are detected in step 554 is not critical to the invention, and any prior art method of detecting the presence of a DTMF tone or mimic will suffice to practice step 554. One way of doing the DTMF tone scan is to perform a Fast Fourier Transform in the DSP. This results in an array of outputs, each of which defines the energy content in one frequency bin, all these outputs taken together defining the Fourier spectrum or energy content at each frequency. The spectrum can then be analyzed to determine if there is sufficient energy at the two frequencies of any of the known DTMF commands to be construed as a DTMF command regardless of whether the DTMF command is real or a mimic. DTMF commands are twin tones, one at any of four frequencies in a low band and the other of which is any of four frequencies in a high band. The various combinations of tones from the low band and high band define all the different keys on a standard telephone keyboard.

Step 556 represents the process of formatting the data to be recorded for transfer over the ISA bus to the PBX process. This is a packetization process to break the data into bytes for placement in ISA bus packets and suitably identifying the data with regard to which port from which it came such as by use of header data. Obviously, in systems where there is sufficient memory at the location of the processing where the DTMF screening happens, and the voice mail data is stored there, there is no need for step 556 of formatting for transfer over the ISA bus because there is no transfer.

Step 558 is a test to determine if any DTMF tone or mimic was found in step 554. If there was, then processing proceeds to step 560. If not, processing proceeds to step 562. Step 562 is a step of transferring the data to the PBX process for storage on a hard disk. Obviously, in species within the genus of the invention where it is not necessary to transfer the data elsewhere for storage, step 562 is simply the process of storing the data of the voice mail message in memory.

Step 560 represents the process of removing or altering the DTMF tone data so that, upon playback, no DTMF tones or mimics will be detected by any DTMF detector which is active during the playback. In the preferred embodiment, step 560 is a process of removing the DTMF tone or mimic data in real time from the data stream as it is detected, and this is done by erasing all data in which the DTMF tone or mimic may be found, and then storing the remaining data in memory in step 562. An alternative embodiment is to put easily found markers in the data stream marking the beginning and end of the data section where a DTMF tone or mimic was found, recording the data in step 562 and returning to the recording and processing the data between the markers by either removing it altogether or filtering it to remove one of the DTMF tones and then re-recording the filtered segment over the segment containing the DTMF tone. Step 560 also represents the process of filtering any segment of data containing a DTMF tone or mimic by determining the frequency of one of the pair in the DTMF tone, and then passing the data through a digital filter to remove just that one frequency in just the offending segment to disable the DTMF tone. This does less damage to the voice mail message.

Although the specific example of FIG. 15 shows the invention in operation in a voice mail record process based upon digital data, the genus of processes employing the invention can just as effectively carry out the functional requirements of the invention in analog circuitry.

Figure 16:
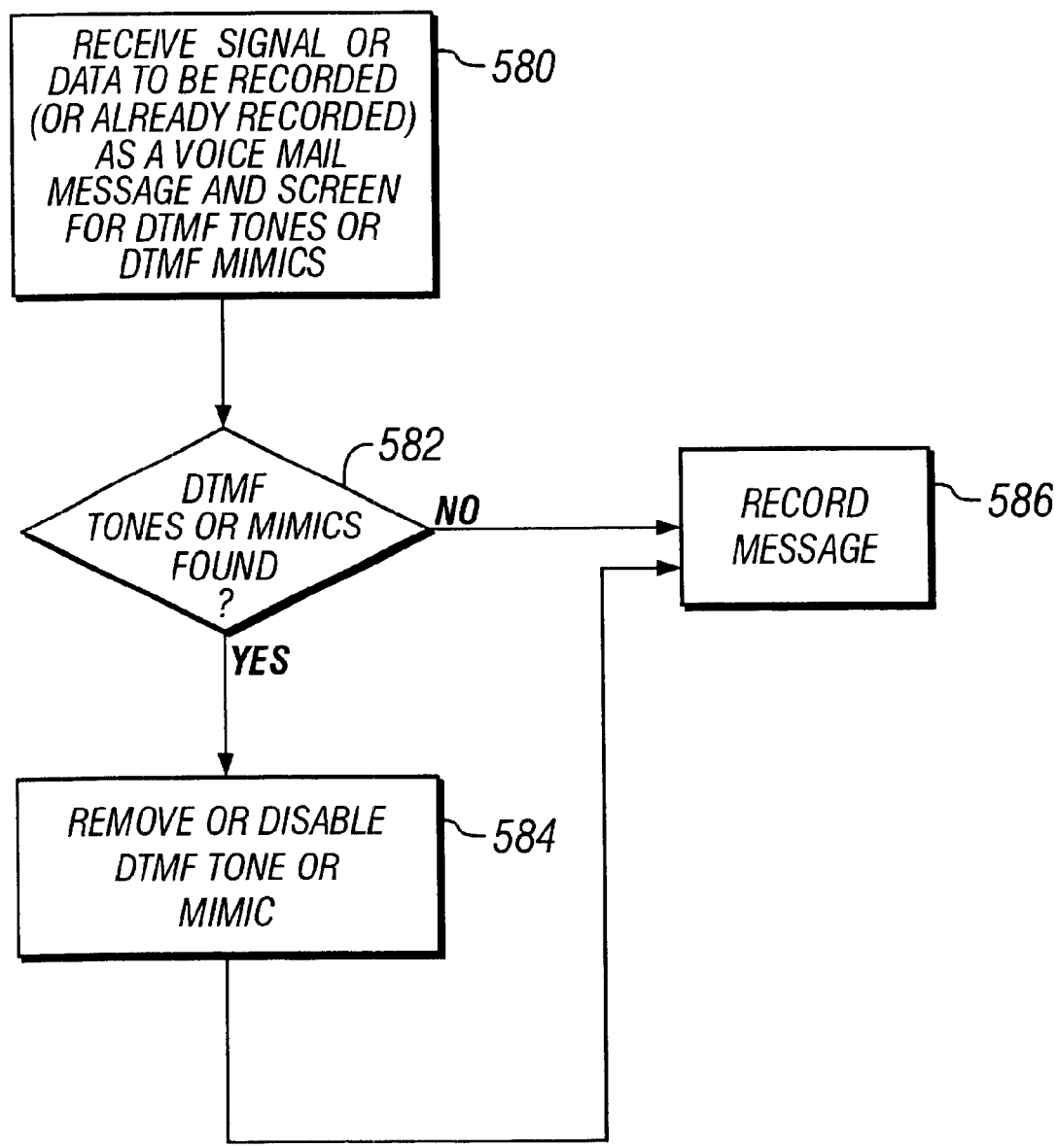
FIG. 16 is a flow diagram representing the shared characteristics of all species that do DTMF tone and DTMF mimic removal.

FIG. 16 represents the DTMF mimic removal process carried out by the broad genus of the invention. In step 580, the signal or data to be recorded as a voice mail message (or a signal or data already recorded as a voice mail message) is received and scanned for DTMF tones or mimics. In step 582, a determination as to whether DTMF tones or mimics were found in step 580. If so, step 584 removes or disables the DTMF tones or mimics either in real time before recording or by marking the recording and going back to remove and disable the DTMF tones or mimics later. The removal or disabling can be by any of the methods described above for FIG. 15. Assuming step 584 is a real time removal or disabling process, then step 586 is performed next to record the message in either analog or digital form. Step 586 is also performed directly from step 582 if no DTMF tones or mimics are found.

Figure 17:
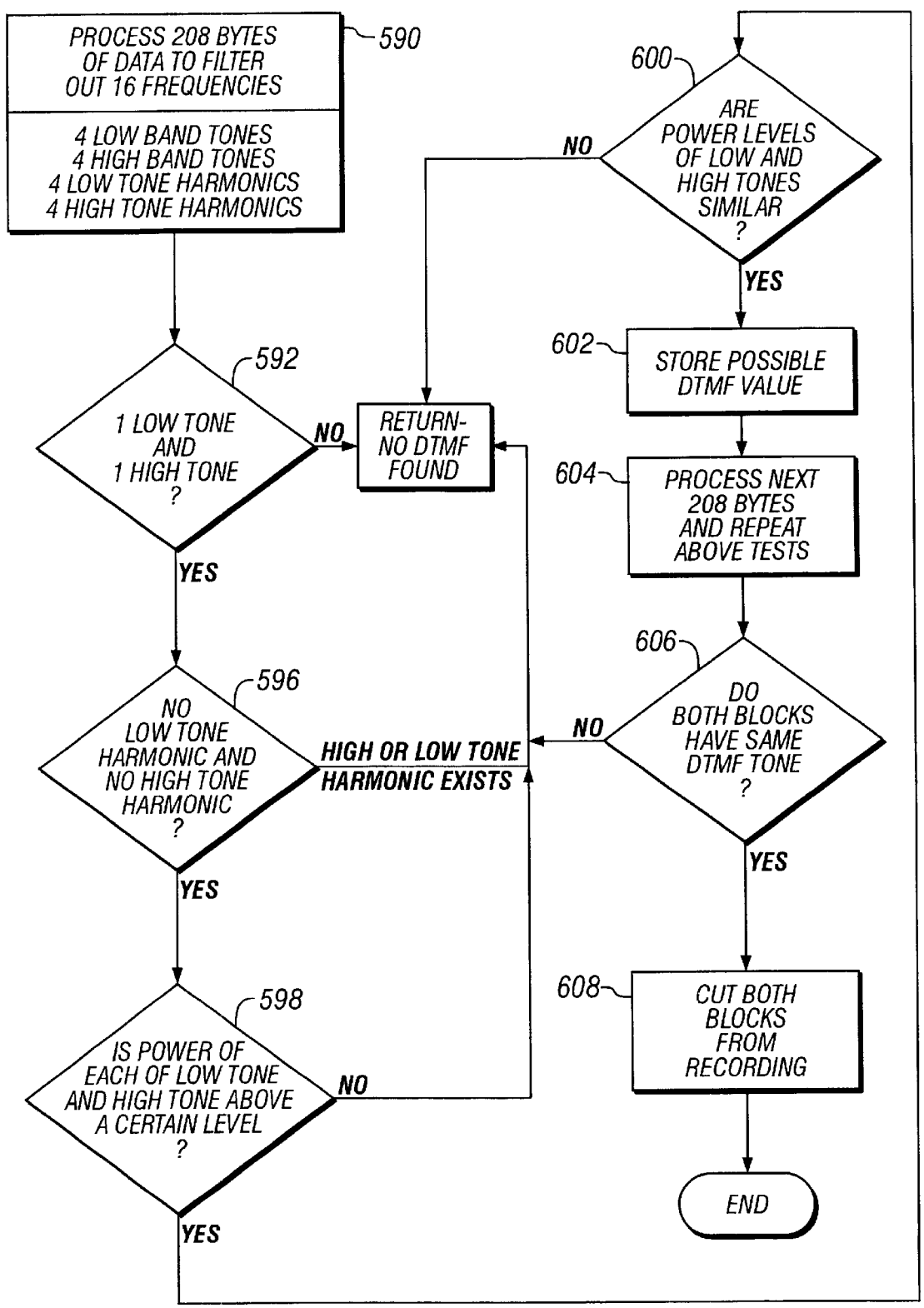
FIG. 17 is a flowchart of the preferred embodiment of screening voice mail messages for DTMF tones and eliminating the data that embodies the DTMF tone or mimic.

Referring to FIG. 17, there is shown a flowchart of the preferred embodiment of screening for DTMF tones and eliminating the data. The process of FIG. 17 represents, in more detail, the processes carried out by blocks 554, 558 and 560 in FIG. 15. Since DTMF tones are only two pure tones, one from a group of four pure tones in a low frequency band and one from a group of four pure tones in a high frequency band, and there are no harmonics present in true DTMF commands, the complexity of a full Fast Fourier Algorithm to analyze energy content at all frequencies is not required. In fact, the preferred method is to adapt a prior art DTMF detection algorithm published by analog devices to the application. This algorithm is a digital filtering algorithm that looks for energy content at each of 16 frequencies. Those 16 frequencies are the four frequencies of the low band, the four frequencies of the high band and the first even harmonic of each one of these eight low and high band frequencies. The reason that the energy content of the harmonics is checked is because when a human voice has energy at a DTMF low band tone or high band tone, there is also usually energy at the first even harmonic thereof. So knowledge of the harmonic energy at each of these eight possible harmonics is useful in distinguishing true DTMF tones and mimics that cannot be ignored (those with no harmonic energy at the 8 harmonic frequencies and sufficient energy at a low band and a high band frequency) from mimics that can be ignored (those with energy at the harmonics of the low and/or high band frequency).

The first step in FIG. 17 is represented by block 590. This block represents the process of running a digital filter algorithm on a block of 208 bytes 16 times at 16 different frequencies. Each pass outputs data indicative of the amount of power at one frequency. The 16 frequencies so analyzed are listed on the bottom half of box 590. They are: each of the four possible frequencies in the low band of DTMF frequencies; each of the four possible frequencies in the high band of DTMF frequencies; each of the four first even harmonics for the four low band tones; and, each of the four first even harmonics for the four high band tones. These processes of running the digital filter algorithms are the screening process of block 554 in FIG. 15.

After the screening, a test symbolized by block 592 is performed to determine if one low tone and one high tone was found. This test determines if there is energy at any level in one of the DTMF frequencies in the low band and one of the DTMF frequencies in the high band. If there is no energy in one of the low band frequencies and one of the high band frequencies, in this block of data, there cannot be a DTMF command therein, so processing vectors to block 594 which represents whatever processing is performed to record the block of data as a voice mail message. In the case of the example of FIG. 15, that processing is represented by block 562.

If there is power in one low tone and one high tone, the first screen is passed, and the second screen is performed, as symbolized by test 596. The second screen is to determine if there is or is not power in the harmonics of these two tones found in test 592. In step 596, a determination is made as to whether there is power in either the first even harmonic of the low band tone or the first even harmonic of the high band tone. If power exists in the harmonic of either the low band tone or the high band tone, then the data does not contain a true DTMF tone since true DTMF tones have no energy in their harmonics and is probably a human voice. When there is power in either harmonic, then processing is vectored to block 594 to return no DTMF command having been found.

If no power was found in either harmonic, another test, symbolized by block 598, is performed to determine if the tones are loud enough to be true DTMF tones. In step 598, the power of each of the low band and high band tones is compared to a minimum threshold criteria for power. If either tone has insufficient power to exceed that threshold, then it is not a DTMF tone, and processing vectors to block 594. Assuming that each tone has sufficient power to exceed the power criteria, the last criteria test is imposed, represented by block 600. This test determines if the power levels of each of the low tones and high tones is roughly similar. If not, then it is not a true DTMF tone, and processing vectors to block 594 to return, no DTMF tone having been found. If the power levels of both tones are roughly similar, then the two tones may be a valid DTMF command, and step 602 saves the possible DTMF value.

A possible DTMF command will not be thrown out unless the same command is found in two consecutive blocks of data to eliminate momentary flashes in energy in a human voice from being mistaken as DTMF commands that need to be erased. Thus, step 604 is performed to process the next 208 bytes of data. The tests of blocks 590, 592, 596, 598 and 600 are repeated on this second block of data. If the tests yield the same possible DTMF tone or command, as determined in test 606, then the algorithm concludes that a legitimate DTMF command has been found, or at least a human voice segment which is indistinguishable from a true DTMF command (a mimic). If a true DTMF command or a mimic has been found, both blocks of data are erased in block 608. If test 606 determines that the same DTMF command was not found in both blocks of data, then a true DTMF command or mimic has not been found, and processing vectors to block 594.

Note that the processing of FIG. 17 could also be performed on the data of an already recorded voice mail message just as easily, and such processing is an alternative embodiment.

Figure 18:
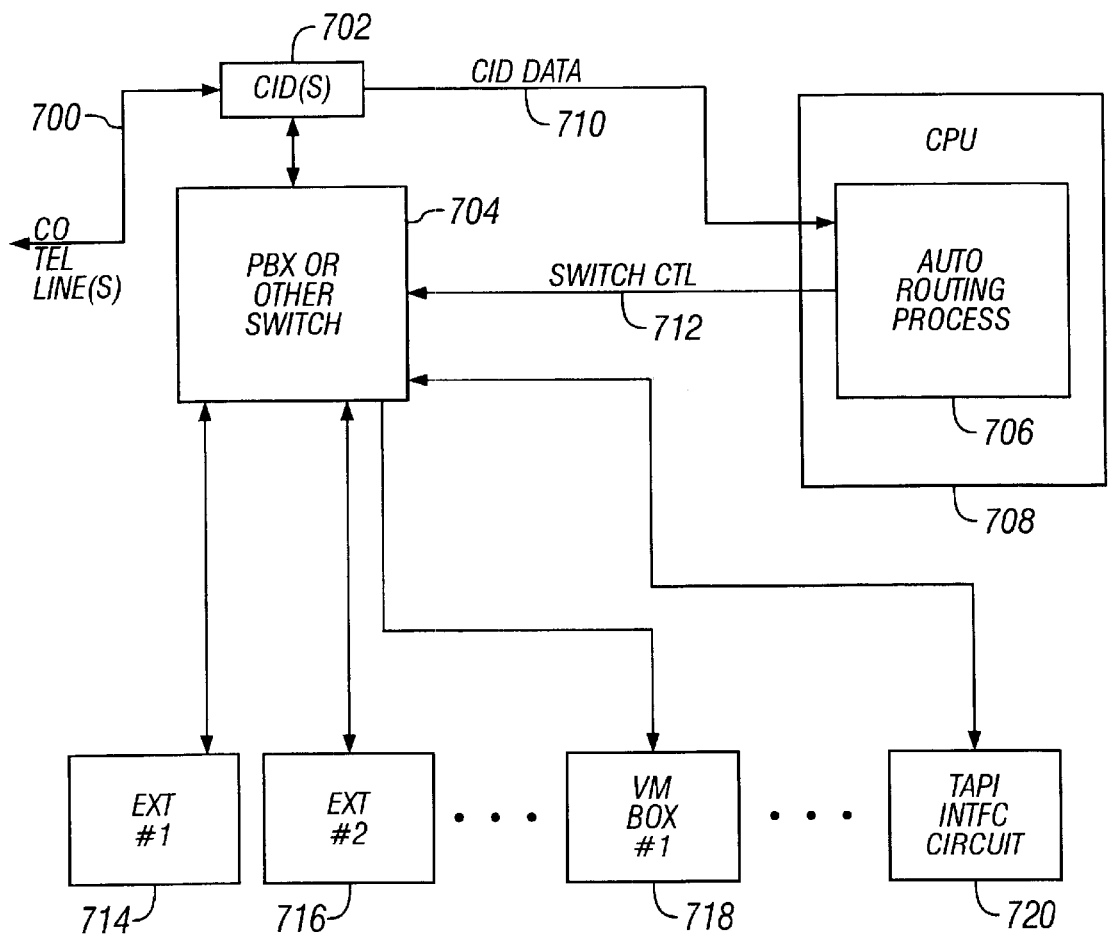
FIG. 18 is a block diagram of a generic multiextension telephone system in which a caller ID based autorouting process can be practiced.

Referring to FIG. 18, there is shown a block diagram of a generic multiextension telephone system in which the autorouting process of the invention can be practiced. One or more incoming telephone lines 700 are coupled to one or more individual stand alone caller ID detectors 702. Alternatively, a caller ID detection chip for each CO line 700 may be included within the circuitry in a PBX or other switch 704. The caller ID circuits detect caller ID data transmitted with incoming calls and transmit that caller ID data to an automatic caller ID routing process 706 in execution in a computer 708 via bus 710. The automatic routing process uses the caller ID data as a search key to search a routing table stored in computer 708 to find the extension or voice mail box or TAPI interface circuit the person or device having the caller ID of the incoming call usually calls. When a match is found, the autorouting process sends back switch control data via bus 712 to the PBX or other conventional switching circuit 704. The PBX or other conventional switching circuit then connects the appropriate telephone line from the CO to the appropriate called device as dictated by the switch control data on bus 712. The called devices are represented by extension telephones 714 and 716 and voice mail recording device 718 and TAPI interface circuit 720.

An alternative embodiment to the automatic routing process based upon caller ID that allows the caller to interrupt the automatic routing process and force transfer to another extension or to an attendant is symbolized by the flowchart of FIGS. 19A and 19B. In the process of FIGS. 19A and 19B semiautomatic routing of an incoming telephone call sometimes by caller ID and sometimes by DTMF commands issued by the user is implemented in a way such that assistance from an attendant of the telephone system called can also be requested if the need arises. The process starts at block 750 and proceeds to block 752 where an incoming ring signal is detected in the manner described elsewhere herein for the preferred embodiment or by any known embodiment.

In step 754, the presence or absence of caller ID data in the ring signal is determined in the manner described in FIG. 6 or in any other known manner. If caller ID data is detected, it is transferred in step 754 to an automatic routing process carried out on a computer controlling the telephone system such as the CSU 40 in FIG. 1 but which could be a digital signal processor programmed to do all the functions described herein for the preferred embodiment necessary to receive and route telephone calls and record voice mail messages. Step 756 represents the process of automatically answering the telephone call. This can be done, for example, by sending an on/off hook control signal such as the signal on line 96 in FIG. 4 to a hybrid such as hybrid 86 coupled to the telephone line from the CO on which the telephone call is arriving to cause the CO switching equipment to see an off-hook state.

Next, step 758 is performed to determine if caller ID data was detected. This determination will control which of two outgoing messages is initially played to the caller. If no caller ID data was detected or if the caller ID data was blocked, the process of block 760 is performed to play a first outgoing message. This message requests the caller to enter the extension number of the party the caller wishes to speak to or to press a combination of one or more keys on the caller's touchtone phone keypad indicating the caller wishes to speak to an attendant such as in cases where the caller does not know who he or she needs to speak to. The outgoing messages described herein can take the form of digitized voice messages that are recalled by the DSP478 in FIG. 13 from the system hard drive and sent though switch circuit 470 to the appropriate digital-to-analog converter coupled to the CO telephone line having the incoming call.

If caller ID data was detected, test 758 vectors processing to the process of block 762. There, a second outgoing message is played to the caller telling the caller that the call will be automatically transferred to the extension the caller usually calls unless the caller presses a predetermined key or combination of keys (or, in some embodiments, any key) within a predetermined time interval the duration of which is made known to the caller.

After the process of block 762, test 764 determines whether the caller pressed the key or keys indicating a desire not to be automatically transferred to the person they usually call. If such a key was pressed, the process of block 766 is performed to play outgoing message #1 requesting the caller to enter the extension number the caller wishes to speak with or the extension assigned to the attendant. Then the process of block 768 is performed to monitor the incoming telephone line for DTMF tones entered by the caller.

When the DTMF tones indicating the desired extension are received, the microprocessor implementing the process of FIGS. 19A and 19B issues commands to cause transfer of the call to the extension indicated. However, if the extension entered is invalid or the key or keys assigned to transfer to the attendant's extension are pressed, commands are issued to transfer the call to the attendant, all as symbolized by block 770. Then processing returns to Start at block 750, as symbolized by transfer block 772.

Returning to the consideration of test 764, if there was no keypress during the timeout interval after outgoing message #2 was played indicating that an automatic transfer is desired based upon caller ID data, the process of block 774 is performed. That process uses the caller ID data as a search key to search the routing table to look up the extension number the caller normally calls, if any.

Next, test 776 determines if there was a match or partial match in the routing table on the caller ID. If there was, the process of block 778 is performed to issue commands to transfer the call to the extension or voice mail box to which the caller ID data is mapped in the routing table. This transfer process can take the form of the process described with reference to FIGS. 8A, 8B and 9 herein or by any other process in other telephone system structures. Optionally, any DTMF tones or mimics are removed from the data of the voice mail message either before recording or after recording. This removal or modification of the data to eliminate inadvertent DTMF commands can take the form of any of the processes disclosed in FIG. 15, 16 or 17. After the transfer, processing on this branch is done and returns to Start at block 750.

Returning to the consideration of block 776, if no match or partial match between the caller ID data and the data in the routing table is found, processing is vectored to block 760 to play the first outgoing message to the caller requesting the caller to enter an extension number or press the key or keys assigned for transfer to the attendant. Processing then proceeds to block 768 to monitor for DTMF tones and then to block 770 to transfer the caller either to the entered extension or to the attendant depending upon which if any keys are pressed by the caller. Processing then returns to Start.

Referring to FIGS. 21A through 21F, there is shown a flow chart of the preferred process carried out to re-route voice mail messages to another voice mail box after multiple attempts to notify a user via radio pager have not resulted in the user picking up the message. The process starts out at blocks 820 or 822 or 824 representing the different ways a call may be placed to a particular extension. Block 820 represents an incoming call on an outside telephone line from the central office which is detected and gets transferred to the attendant of the telephone system who then transfers the call to whatever extension the caller asks for, as symbolized by block 826. The manner in which this process is carried out is not critical to the invention and, the manner in which it is carried out in the telephone system described herein will be apparent to those skilled in the art from the disclosure give earlier. Block 822 represents the process of an outside call coming in from the central office with direct inward dialing data which tells the telephone system which extension is to be connected to the call. The DID data is used by the phone system to transfer the call directly to the extension number indicated by the direct inward dialing data in a manner known in the prior art. Block 824 represents the process of a particular extension being called by the user of another extension.

Regardless of the source of the call, block 830 represents the process of the called extension ringing by virtue of the PBX process sending a command to the Power Ring circuit 302 on Board B of the PEU (FIG. 10) causing a power ring signal to be sent to the extension being called. In alternative embodiments, the caller may request direct transfer into the voice mail box of the user, so steps 830 and 832 are skipped, and processing flows directly from steps 826, 822 or 824 directly to step 836.

Block 832 is a test carried out by the CSU switching process (also referred to as the PBX process) to determine if the extension was answered or a timeout occurred. In alternative embodiments, the extension phone may be busy when the second call is directed to it thereby causing the second call to be immediately connected to the voice mail box associated with this extension. In another alternative embodiment, the called extension may, in addition to the busy-divert to voice mail behavior or as an alternative thereto, display caller ID data of the second call when the second call causes the extension to ring and allow the user to press a button which sends a message to the CSU process causing the second call to be directed to the voice mail box associated with that extension.

When the CSU process orders the power ring signal to be generated, it simultaneously starts a timer. In some embodiments, the timeout interval is fixed and in other embodiments, it is programmable. If the CSU process detects the fact that the extension phone was answered, the process of block 834 is performed to send commands to the switch card to set up a connection between the CO line or the extension phone and the extension being called. Thereafter, the program monitors for termination of the call, and when the call is terminated, the program returns to the main loop or attends to other functions, as symbolized by block 835. The CSU detects the fact that the extension was answered by monitoring the Off Hook Status signal generated on line 322 by the hybrid 314 in FIG. 10 connected to the extension phone which is ringing. If the extension phone is answered, the CSU process sends commands to the switch card to cause the switch circuit 470 in FIG. 13 set up a connection between the incoming and outgoing timeslots of the extension phone and the outgoing and incoming timeslots of the CO line or other extension phone so that the voice conversation may proceed. The commands from the CSU switching process to the switch circuit 470 is via a packet on the ISA bus 46 in FIG. 13.

If a timeout occurs, the process of block 836 is performed where the CSU process sends a command packet via the ISA bus 46 in FIG. 13 to the switch chip 470. This packet causes the switch chip to set up a connection between the incoming and outgoing timeslots of the CO line or calling extension and the outgoing and incoming timeslots of the voice mail channel on line 476 and 480 in FIG. 13 coupled to the DSP 478.

Next, the CSU process opens the file on the local hard disk containing data for the voice mail greeting associated with the extension phone that is being called, as symbolized by block 838. The CSU process then begins retrieving the greeting message data from the file and formatting it for transfer over the ISA bus to the digital signal processor on the switch card, as symbolized by block 840.

Block 842 represents the process of playing the greeting until it is complete or until the caller presses 0 indicating a desire to be transferred back to the attendant and monitoring for a 0 DTMF tone during the playing of the greeting. If the caller does press 0, the process of block 844 is performed wherein the CSU sends out a command to the switch chip to make connections between the source of the call and the extension assigned to the attendant. If the complete greeting is played, the CSU process closes the greeting file, as symbolized by block 846.

Next, the CSU process sends commands to the switch chip to set up a connection for a short interval between the incoming data timeslot for the source of the call and the timeslot on input bus 474 in FIG. 13 containing data generated by the tone generator 472 encoding a beep tone. The beep tone data is then sent to the D/A converter coupled to the CO line or extension phone and converted to an outgoing analog beep signal informing the caller to start recording their voice mail message. After the beep tone interval, the CSU process programs the switch chip to again establish the connections between the timeslots assigned to the source of the call and the voice expansion channel timeslots managed by the digital signal processor 478, as symbolized by block 850. The incoming digital data of the voice mail message generated by the A/D converter 402 on FIG. 11 coupled to the source of the call (there is a pair of A/D and D/A converters for every extension and every CO line) is then routed to the DSP 478 via buses 480 and 476 in FIG. 13. The DSP then optionally removes any DTMF tones or mimics from the data, formats the data for transfer to the PBX process of the CSU over the ISA bus 46 and transmits to the PBX process for storage in the voice mail box associated with the dialed extension, as symbolized by block 852. The PBX process knows the extension which was dialed and timed out and uses this information to look up the file on the hard disk corresponding to that user's voice mail box, and opens that file, as symbolized by block 854. The CSU process then opens up a new voice mail message file on the hard disk and stores a pointer to the new voice mail message file in the file on the hard disk corresponding to the voice mail box of the extension which was called. The pointer optionally indicates the message number and the address on the disk of the start of the file.

The CSU process then starts retrieving the packets of data comprising the voice mail message from the ISA bus, formats them for storage on the hard drive and stores them in the new voice mail message file it just opened, as symbolized by block 856.

The CSU process monitors for key presses, hangups and disconnects and timeouts during the voice mail recording process. Block 857 represents the process of monitoring for any key press of keys 1 through 9 or * on the caller's touchtone keypad using the data on bus 430 in FIG. 11 generated by the DTMF tone decoder. If any of those keys are pressed, recording of the VM message stops until the key is released, as symbolized by block 859. When the key is released, the recording operation is resumed, as represented by block 861.

Block 858 represents the process of monitoring for # key or 0 key presses by the caller during the voice mail recording interval. If the caller pressed either of these two keys, it means the caller would like to be presented with more options of the voice mail record menu to be described below in connection with the discussion of FIG. 23. If either the # key or 0 key are pressed during the record process, voice mail recording is stopped by sending a command to the CSU process that is recording data in the background to stop, as symbolized by block 860. When the recording process stops, the CSU process sends back a message indicating recording has stopped. When this message is received, block 860 transfers processing to the voice mail options menu routine, represented by block 862 the processing of which is symbolized by the flowchart of FIG. 23.

Block 864 represents the process of monitoring the voice mail recording process and transferring processing to the voice mail menu options routines represented by block 862 when the maximum record time interval has expired.

Block 866 represents the process of monitoring the incoming data being recorded to determine when 5 seconds of silence have elapsed, and then transferring control to the voice mail options routines represented by block 862.

Block 868 represents the process of monitoring the state of the telephone line on which the incoming voice data is arriving from the caller to determine if the caller has hung up or been disconnected during the voice mail recording process. When a hangup or disconnect occurs, block 870 sends a message requesting cessation of voice recording process and waits to receive a message indicating the voice mail recording has stopped. Then, block 872 calls the voice mail record file size evaluation subroutine represented by the flowchart of FIG. 22. That routine either saves whatever has been recorded if the file size is greater than 32 kilobytes and closes the file or closes the file and deletes it if it is smaller than 32 kilobytes and returns to the point in the program which called it. Even if the file is saved, it is deemed not worthy of a pager notification although the file size evaluation subroutine does put a pointer to the file in the voice mail box of the called extension. Thus, after return from the file size evaluation subroutine, block 874 transfer control to the idle routine (not shown) to wait for the next call.

Figure 22:
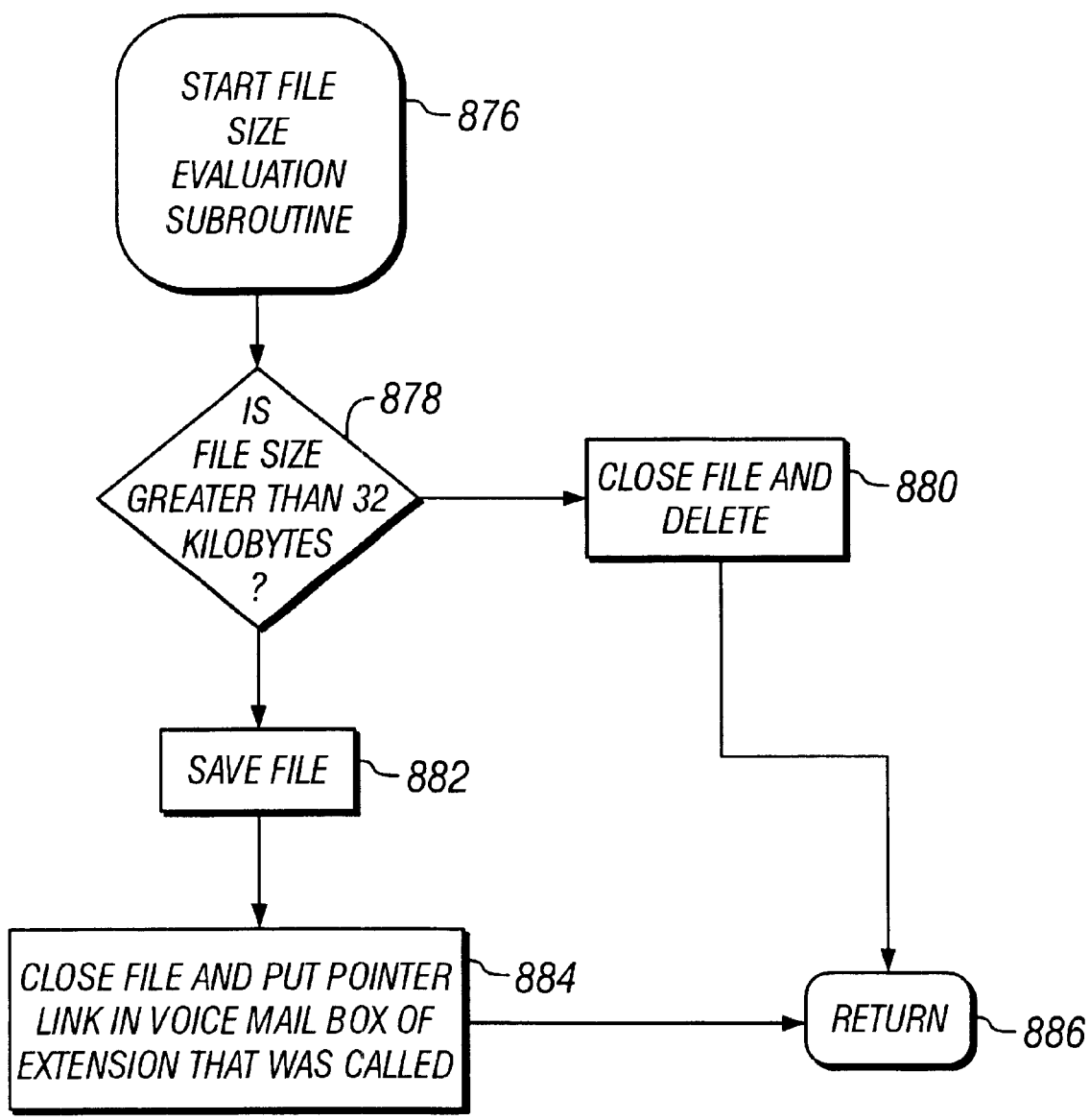
FIG. 22 is a flowchart illustrating the file size evaluation subroutine.

The operation of the file size evaluation subroutine is shown in the flowchart of FIG. 22. The top of the subroutine is represented by block 876. The first step is block 878 where the size of the file on the hard disk containing whatever was recorded is checked against an arbitrary retention size which is 32 kilobytes in the preferred embodiment but which may be some other value or may be programmable in other embodiments. If the file size is not 32 kilobytes or larger, the file is closed and deleted in block 880. If the file is 32 kilobytes or larger, the file is saved in block 882 and closed in block 884 and a pointer link to the file is placed in the voice mail box of the extension that was called so that whatever was recorded will show up as a voice mail message. The subroutine then returns to the calling point in the program that called it, as represented by block 886.

Figure 21A:
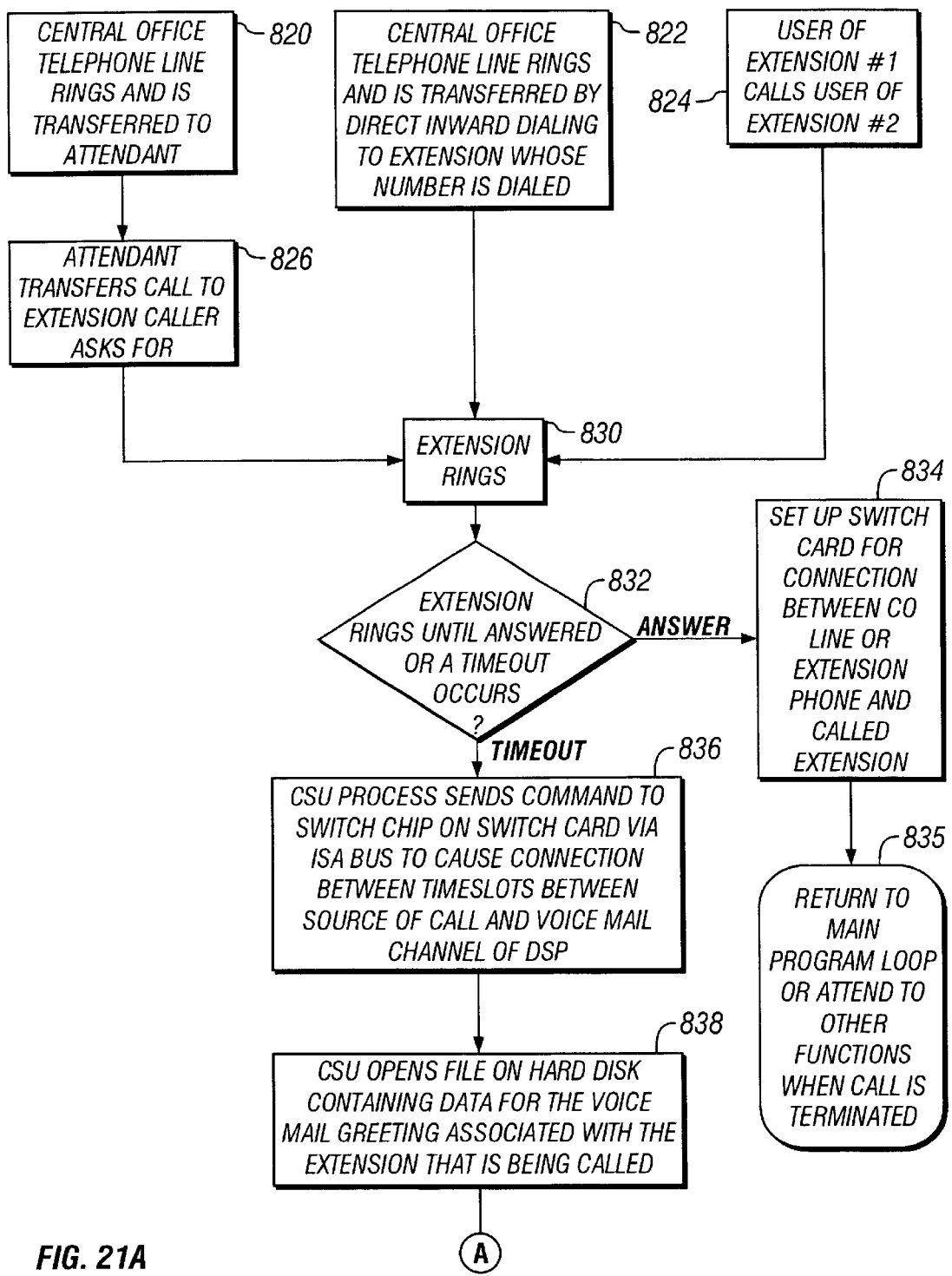
FIGS. 21A–21F is a flowchart describing a process implemented to re-route voice mail messages to another voice mail box after multiple attempts to notify a user via radio pager have not resulted in the user picking up the message.
Figure 21B:
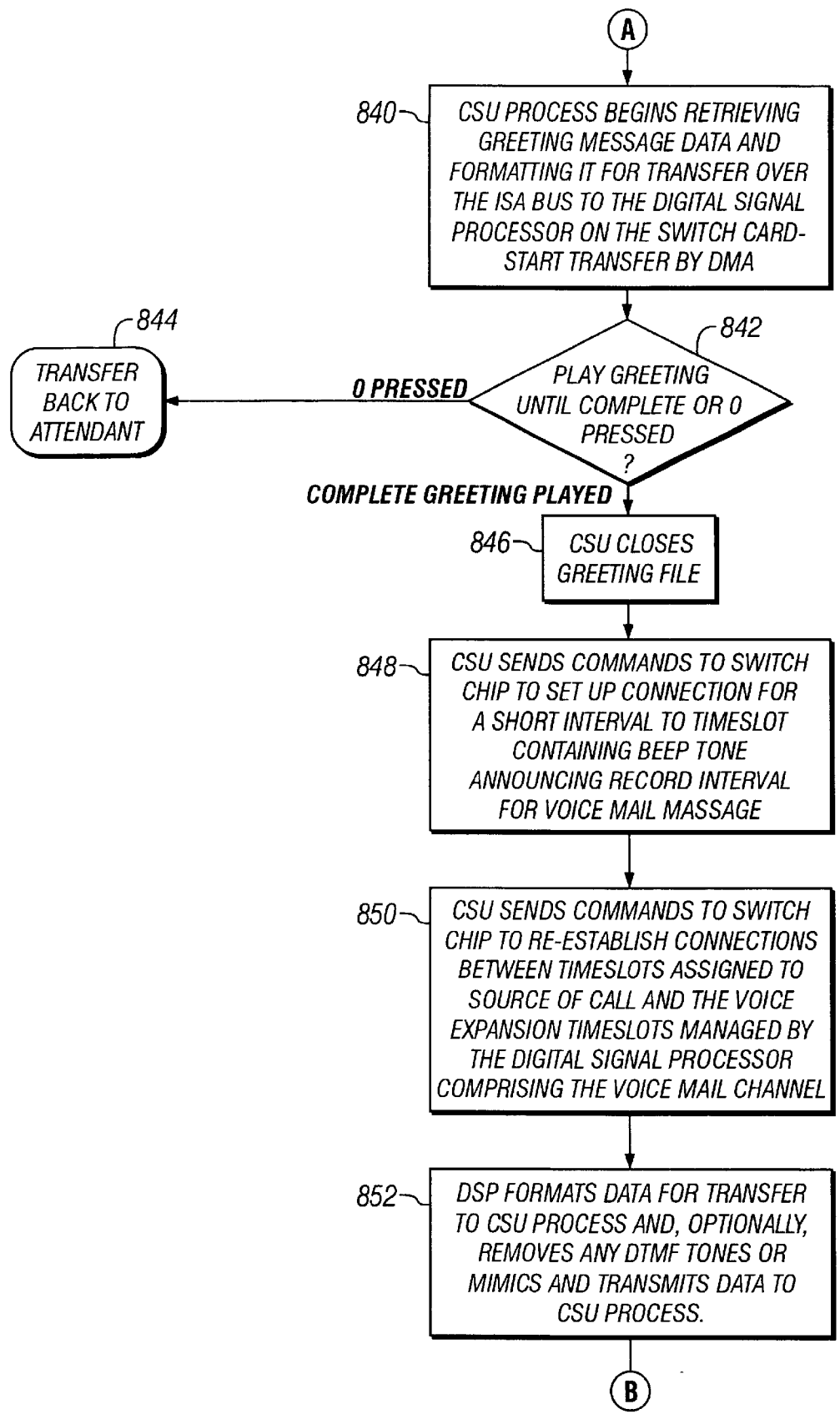
Figure 21C:
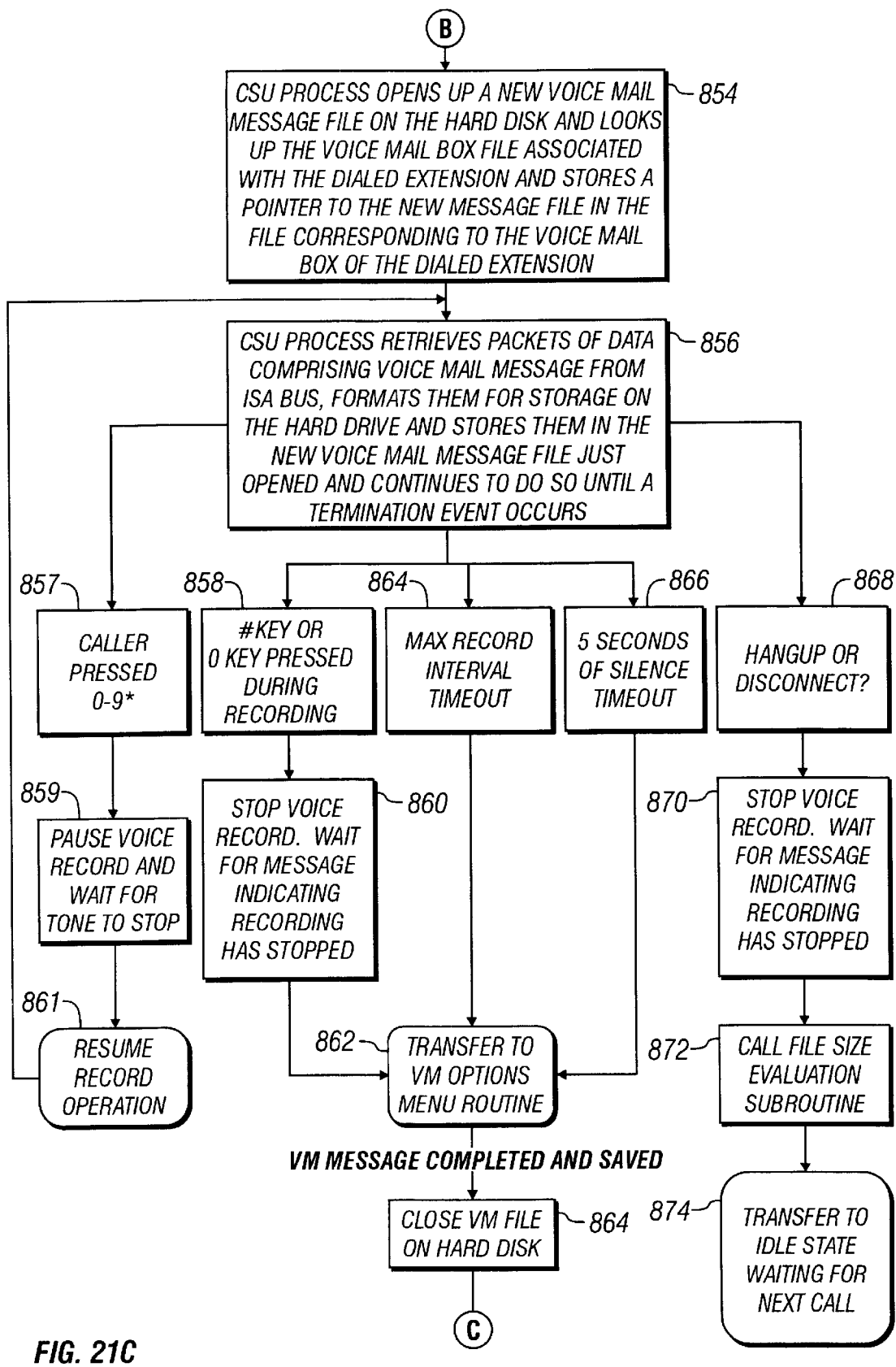
Figure 21D:
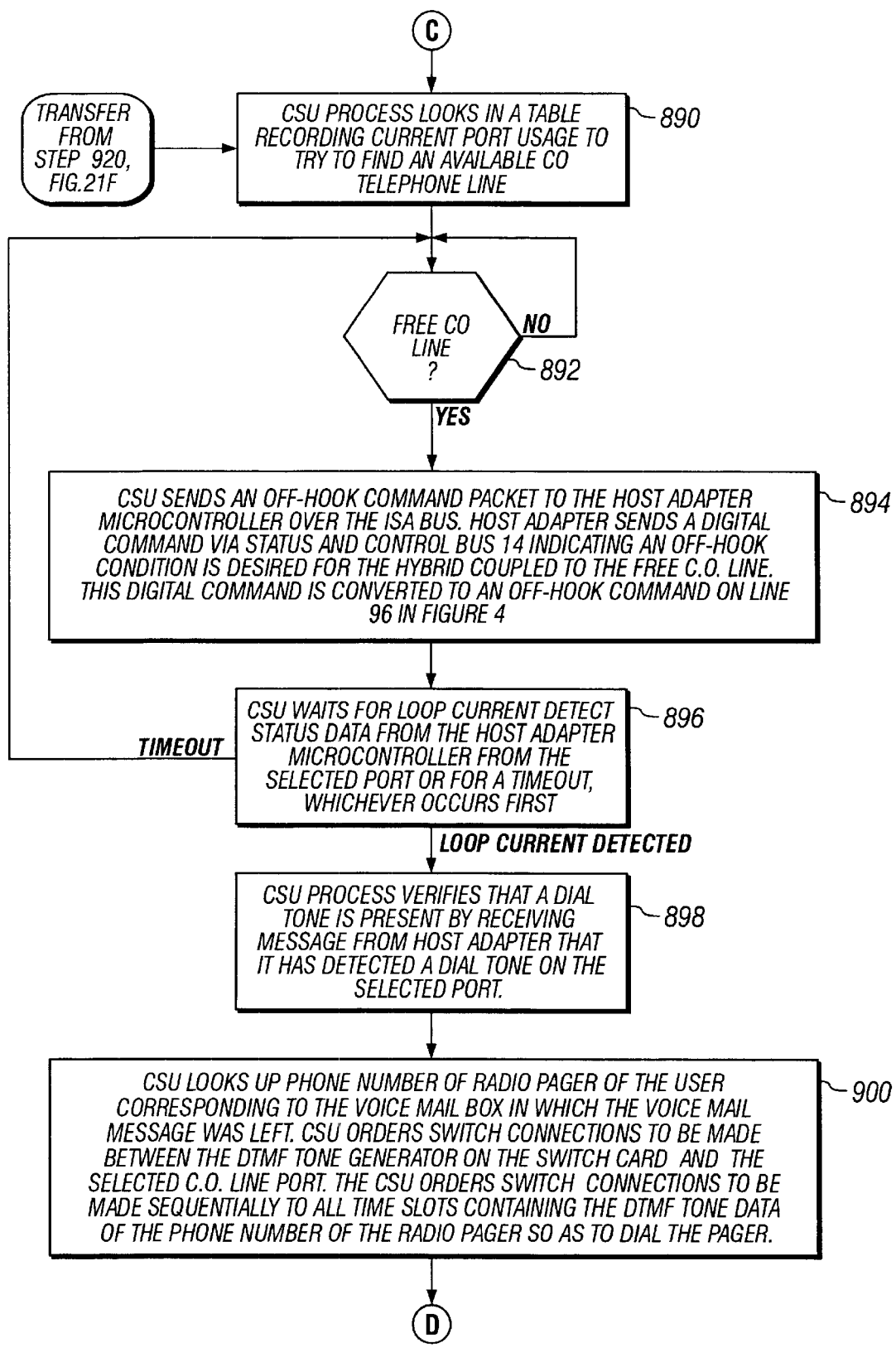
Figure 21E:
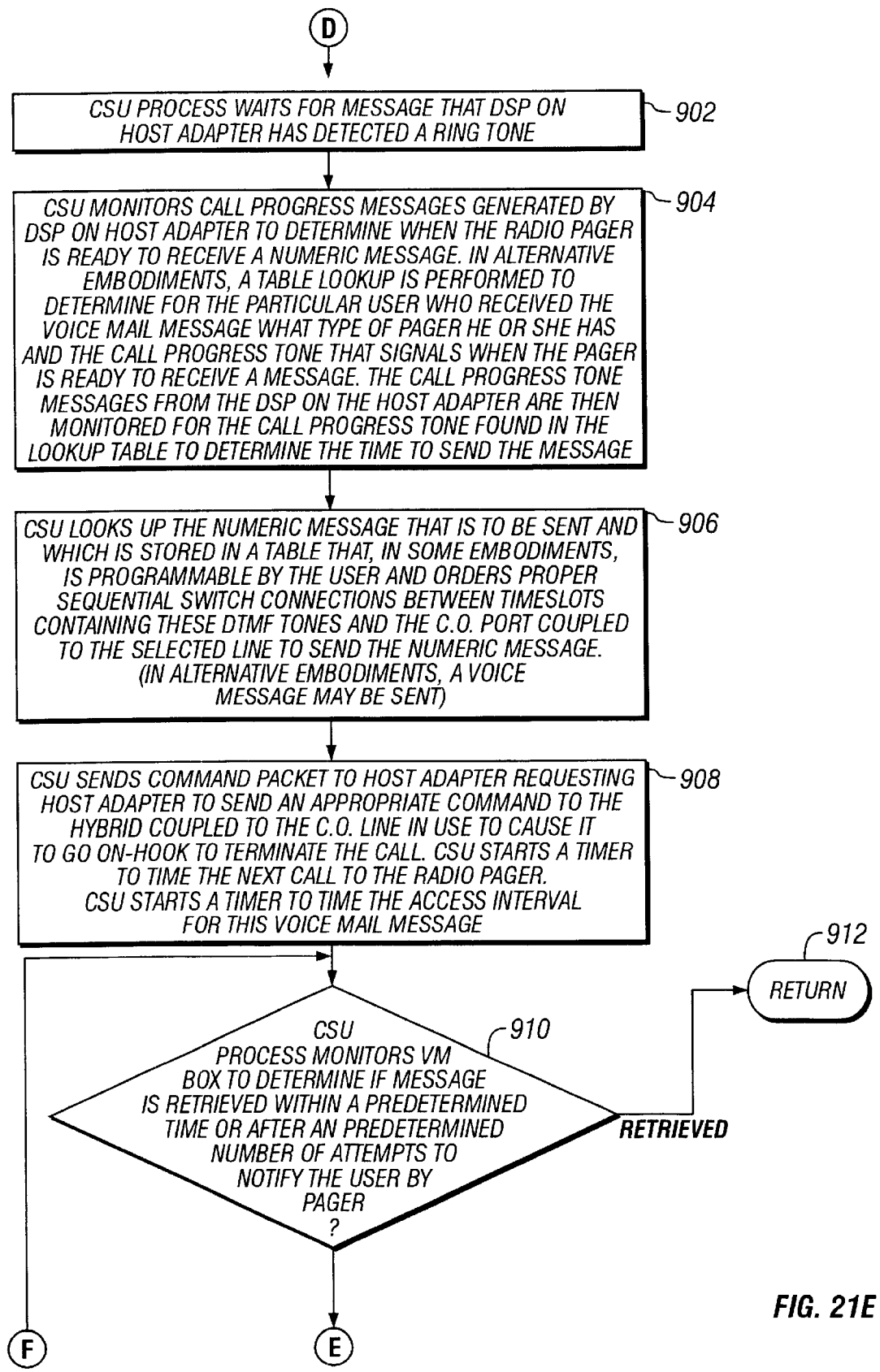
Figure 21F:
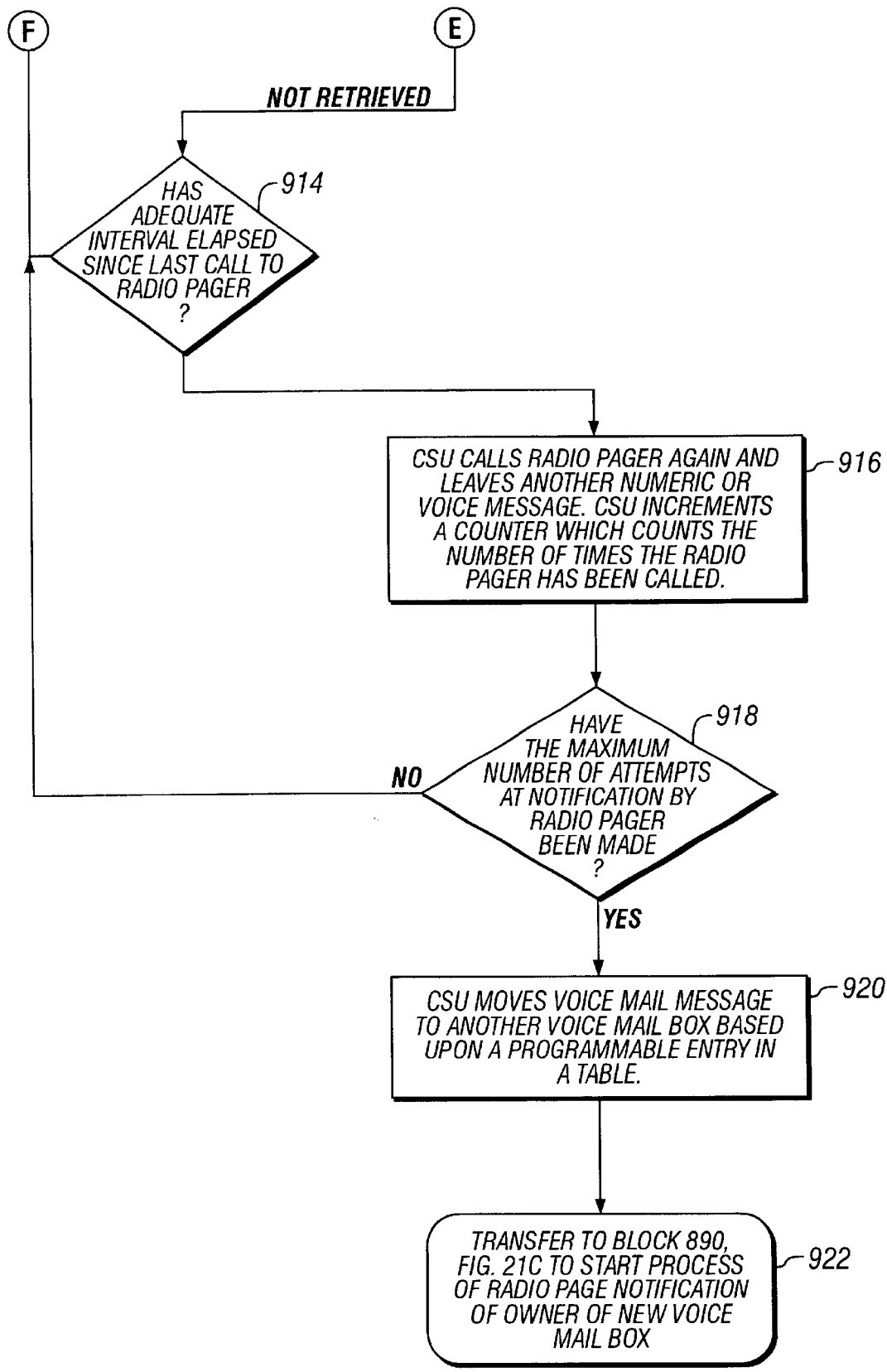
Figure 23:
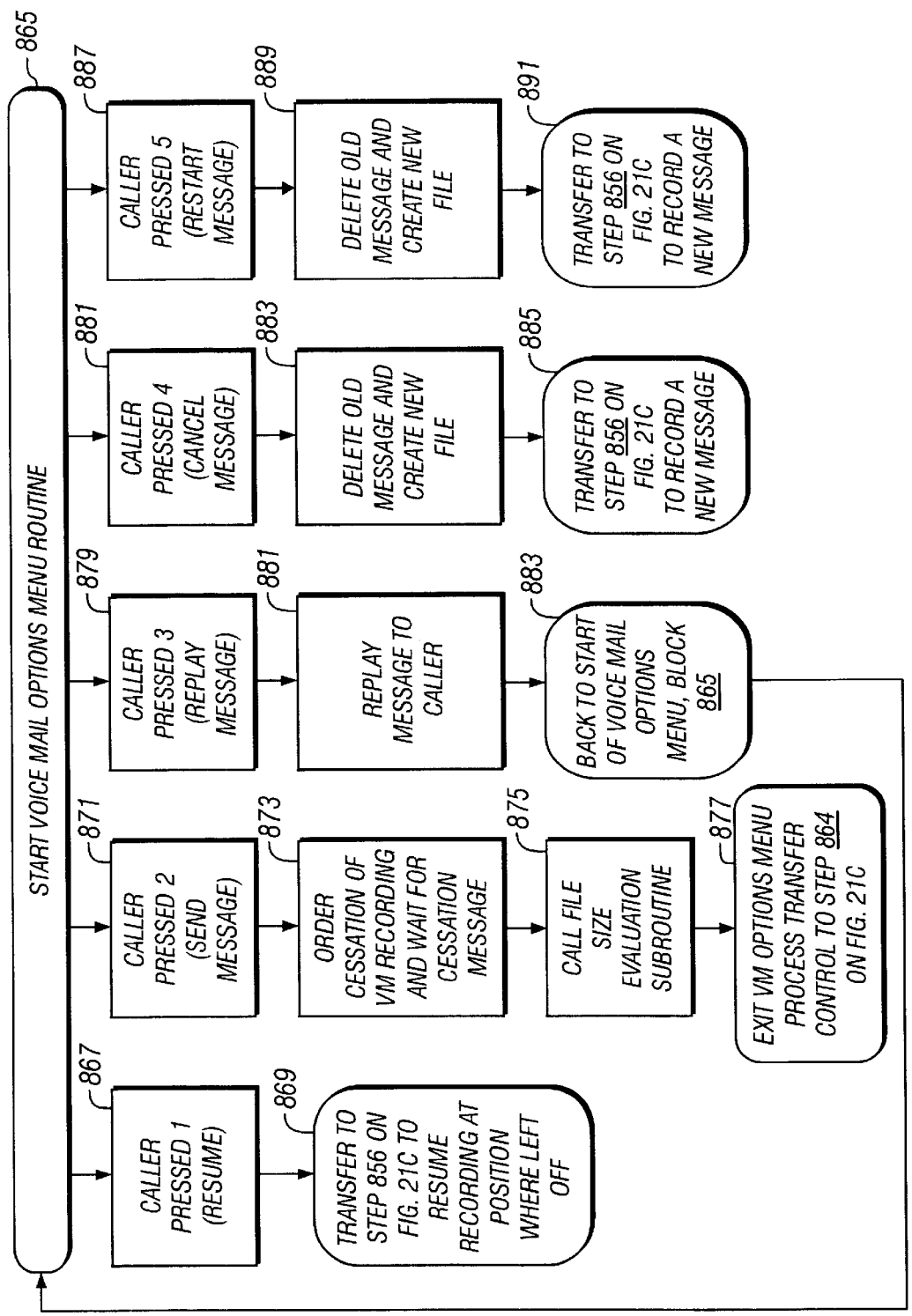
FIG. 23 is a flowchart describing the mail menu options available to a caller after the caller has accessed voice mail.

Referring to FIG. 23, there is shown the processing of the voice mail menu options routine represented by block 862 in FIG. 21C. Block 867 represents the processing that monitors for and determines that the caller has pressed 1 meaning the caller wishes to resume the voice mail recording process. In that event, the processing of block 869 is performed to vector processing back to step 856 on FIG. 21C to resume the voice mail recording where it left off.

Block 871 in FIG. 23 represents the process of monitoring for and determining that the caller has pressed 2 indicating that the caller wishes to have the message sent. This causes step 873 to be performed to order the cessation of voice mail recording and wait for the cessation message to be returned. Then, the file size evaluation routine of FIG. 22 is called, as symbolized by block 875 to determine the size of the recorded block. After completion of file size evaluation, control is transferred to block 864 on FIG. 21C.

Block 879 represents the process of monitoring for keypresses during the voice mail recording interval and determining that the caller has pressed 3 indicating that the caller wishes to replay the message. This causes the process of block 881 to be performed to retrieve the data of the new voice mail file starting at the top of the file and send it to the D/A converter coupled to the telephone line of the incoming call. After replaying the message to the caller, block 883 transfers control back to block 865 representing the start of the voice mail options menu subroutine.

Block 881 represents the process of monitoring for keypresses during the voice mail recording interval and determining that a 4 has been pushed indicating the user wishes to cancel the message. This causes the process of block 883 to be performed to close and delete the voice mail file which was being used to record the message and open a new file to be used to record a new message. Then block 885 transfer control back to block 856 on FIG. 21C to start the process of recording a new voice mail message in the new file just opened.

Block 887 represents the process of monitoring for key presses during the voice mail recording interval and determining that the caller has pressed 5 indicating that the caller wishes to restart the message. This causes the process of block 889 to be performed to delete the file in which the old voice mail message was recorded and create a new file to record a new message. The processing of block 891 is then performed to transfer processing to step 856 on FIG. 21C to record a new message in the new file.

Referring again to FIG. 21C, if a voice mail message was completed and saved as a result of the processing on the voice mail options menu, the process of block 864 closes the voice mail file on the hard disk in preparation to make a pager notification to the recipient of the voice mail message. The latter process is started at block 890 where the CSU process looks in a table it keeps recording current port usage to find an available port coupled to an outside telephone line connecting the system to the central office of the telephone service provider. The process of determining if there was a free C.O. line available to make an outgoing call to the pager is represented by block 892.

Next, as represented by block 894, the CSU sends an off-hook command packet to the host adapter microcontroller 520 in FIG. 14 requesting it to send an off-hook command to the hybrid 86 in FIG. 4 via line 96 which is coupled to the free C.O. line. This causes the C.O. switching equipment to start listening for DTMF tones and it causes loop current to start flowing. When loop current flows, the hybrid 86 in FIG. 4 detects this loop current and generates a status signal on line 97. This status signal is detected by the host adapter microcontroller via the status and control portion of bus 14. The host adapter then informs the CSU that loop current is flowing if the loop current has been detected. Block 896 represents the process carried out in the CSU process of waiting for loop current detect status data to arrive from the host adapter microcontroller or for a timeout to occur. When the CSU sends the command packet requesting the hybrid coupled to the selected C.O. line to go off-hook, it starts a timer. If that timer expires, before loop current is detected, processing flows via the timeout path back to block 892 to look for a free C.O. line.

The CSU process then verifies that a dial tone is present in block 898. This is done by receiving a message from the host adapter that it has detected a dial tone on the selected port. The host adapter has a digital signal processor 518 coupled to bus 14 which is programmed to perform call progress detection. This DSP can detect the presence of ring signals, dial tones, busy signals and voice. When the DSP detects a dial tone, it notifies the microcontroller via bus 522 in FIG. 14 which then notifies the CSU process via the ISA bus 46.

The CSU is now ready to dial the radio pager of the user corresponding to the voice mail box in which the message was left. Block 900 represents the process of looking up the phone number of the radio pager of the user corresponding to the voice mail box in which the voice mail message was left. The CSU then dials this number by ordering a number of sequential switch connections to be made on the switch card. The sequential switch connections connect the timeslots containing data generated by the tone generator 472 corresponding to the various DTMF tones that comprise the radio pager phone number to the timeslot assigned to outgoing data to the C.O. port of the selected telephone line. This causes the DTMF tones of the radio pager phone number of the user to be notified to be generated on the selected C.O. line by the D/A converter of that port.

Next, in block 902, the CSU process waits for a message from the DSP on the host adapter that it has detected a ring tone. The CSU then monitors call progress messages generated by the DSP 518 on the host adapter until it receives a message indicating that the radio pager system has generated a tone or is otherwise ready to receive DTMF tones of a numeric message for the user, as symbolized by block 904. With some pagers, the pager will be ready to receive any DTMF tones as soon as the pager system answers the phone. With other pagers, the system will be ready to receive DTMF tones or a voice message when the voice announcement stops or after a tone is sounded. In the preferred embodiment, block 904 represents monitoring for whatever condition the user programs the system to recognize based upon that user's particular pager system. In some embodiments, there is a lookup table which defines for each user's pager type, the particular call progress tone that will signal the time to send the numeric or voice message. In these embodiments, block 904 represents the process of looking up the particular call progress tone that signals the time to send the numeric or voice message and then monitoring the call process messages generated by the DSP 518 of the host adapter for the particular call progress message found in the lookup table and proceeding to the process of block 906 when that particular call progress tone is found. The CSU, in block 906, then looks up a numeric message to send to the radio pager in a table. In some embodiments, the contents of the table are fixed such as the phone number corresponding to the voice mail box containing the message, and in other embodiments, the contents of the table are programmable by the user. The CSU then orders the proper sequential switch connections to be made between the timeslots containing then desired DTMF tones and the port coupled to the selected C.O. line to send the numeric message. In the preferred embodiment, the notification system only works with numeric pagers. However, in some alternative embodiments, voice mail pagers may be used. In these embodiments, step 906 represents the process of looking up a file that stores a voice message to be sent for notification and sending the data of the file sequentially to the D/A converter coupled to the C.O. port coupled to the selected line. This causes a voice message to be sent to the pager.

Block 908 represents the process of the CSU sending a command packet to the host adapter requesting the host adapter to send an appropriate message to send a command to the hybrid coupled to the C.O. line in use to cause it to go on-hook thereby terminating the call. Block 908 also represents the process of the CSU starting a software timer dedicated to this particular voice mail message to determine if the voice mail message has been retrieved within a predetermined redirection time. If the voice mail message is not retrieved during the interval established by this first software timer, the message will be redirected to another voice mail box. Block 908 also represents the process of starting another software timer for this particular voice mail message which times the interval between calls to the radio pager. In embodiments, where only one call to the radio pager is done, this second timer is unnecessary.

In alternative embodiments, the CSU process starts a timer when the voice mail message is left and begins to monitor the voice mail box when the message is left to determine if the message is picked up within a predetermined arbitrary time selected by the system designer, e.g., 25 minutes. In some embodiments, the interval during which the voice mail must be picked up is programmable. In these alternative embodiments, the CSU process only performs radio paging notification steps 894, 896, 898, 900, 902, 904, 906 and 908 when it is determined that the voice mail message was not picked up within a predetermined time interval from when it is left, and then proceeds to step 910.

Block 910 represents the process carried out by the CSU of monitoring the voice mail box in which the most recent voice mail message was left to determine if the file was accessed and the message retrieved within whatever interval is set by the interval timer started in block 908. Blocks 908 and 910 also represent the ability to monitor multiple voice mail messages by starting multiple software or hardware timers, one for each voice mail message and polling all the voice mail boxes that contain voice mail messages that have not yet been redirected to determine if they have been accessed and when. In some embodiments, the time a voice mail box is accessed is recorded and that time can be compared to start and stop times of a software interval timer expressed in terms of a real time system clock that gives the date and time of day. In other simpler embodiments, the fact that a voice mail box has been accessed is simply recorded by setting a flag. When the polling process represented by block 910 finds that a flag has been set for a particular voice mail box, it checks the corresponding interval timer for that voice mail box and determines if the interval has expired. If the voice mail message has been retrieved within the interval, the process returns to the idle state or to the point in the program which called the voice mail redirection routine, as symbolized by block 912. If the voice mail message has not been retrieved yet, in some embodiments, processing proceeds to block 914 to begin the process of making another call to the radio pager.

In block 914, the CSU checks the software timer timing the interval between calls to the radio pager to determine if it is time to call the radio pager again. If an insufficient time has elapsed since the last call to the radio pager, processing returns to step 910 to check the voice mail box again to determine if the message has been retrieved yet. If a sufficient time has passed, processing proceeds to step 916 where the CSU calls the radio pager again by the process described above and increments a counter which keeps track of the number of times the radio pager has been called. In some embodiments, step 914 is eliminated and processing proceeds directly to step 916 from step 910 on the "not retrieved" path. In other embodiments, the process of block 910 actually polls the voice mail boxes several times separated by a predetermined interval such as 5 minutes, and each time the message is found to not have been retrieved, block 916 is performed again until the maximum number of calls to the radio pager have been made.

Next, in block 918, the CSU process determines from the counter whether the maximum number of notification attempts via the radio pager have been made. In some embodiments, the number of attempts is programmable. If not, processing returns to block 910 to check the voice mail box again to determine if the message has been retrieved. If so, processing proceeds to block 920. This block 920 represents the process of moving the voice mail message to another voice mail box based upon a programmable entry in a table identifying where the voice mail message is to be moved in the event it is not retrieved within the predetermined interval. The process then returns to step 890 of FIG. 21C to start the process of radio pager notification of the message to the owner of the new voice mail box, as represented by block 922.

Figure 24:
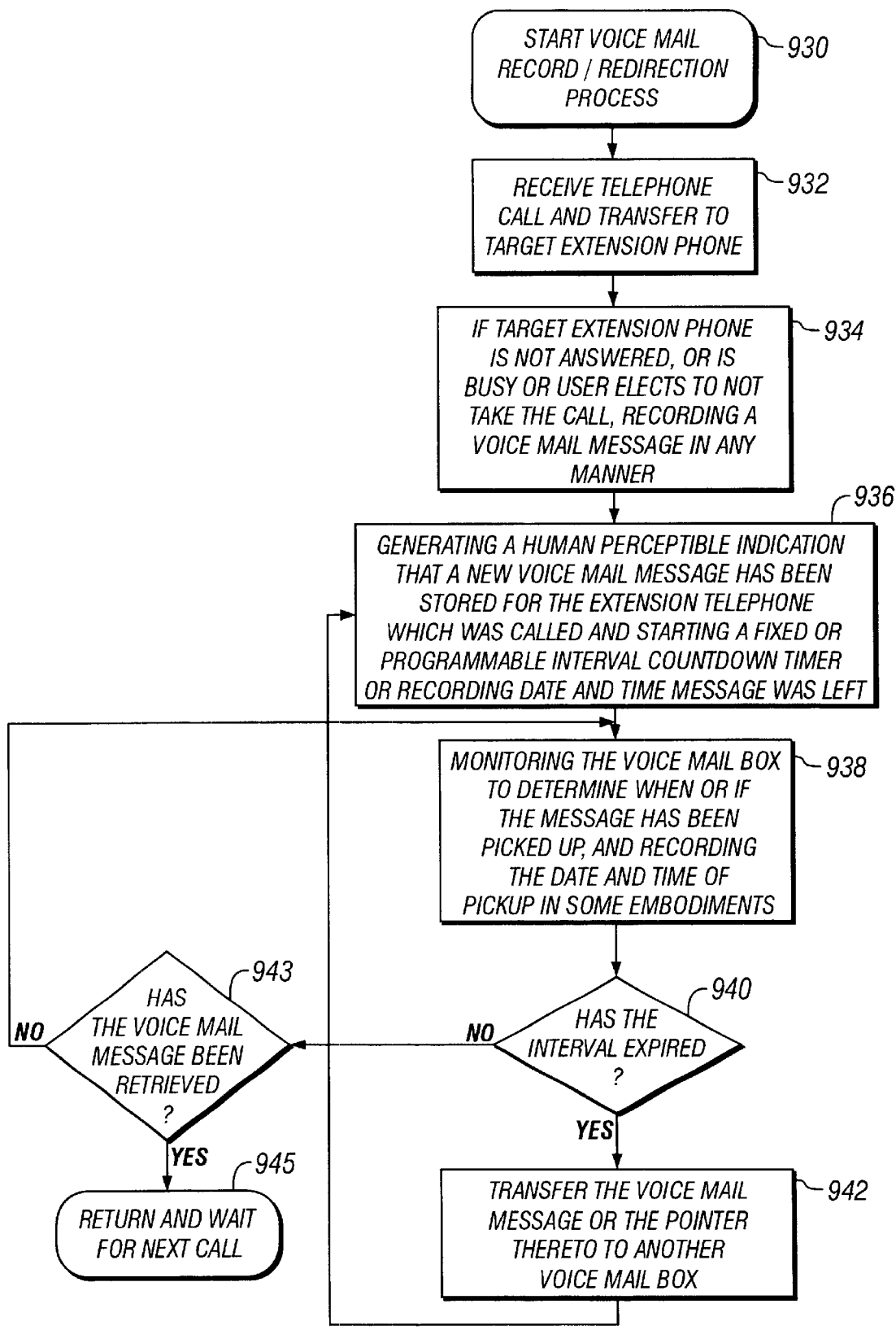
FIG. 24 is a flowchart illustrating the basic steps necessary to achieve the fundamental utility of the invention.

Referring to FIG. 24, there is shown a flow diagram of a simpler alternative embodiment of the invention. The fundamental utility of the invention is in redirecting voice mail messages that are not retrieved after a reasonable time to another voice mail box so that the caller has a higher probability of at least somebody returning his or her call or reacting to the voice mail message. The particular manner in which the telephone call is received, the way the call is routed to the target extension phone, the manner in which the voice mail message is recorded and the voice mail options given to the user and the type of notification given to the user or the amount of time the user is given to retrieve the message and the way the message is redirected to another voice mail box are not important to the fundamental utility. Any way known in the prior art or described herein of accomplishing each of these functions will suffice to practice the invention. FIG. 24 is intended to reflect this definition of the genus of the invention by detailing only the most basic steps that need to be accomplished to achieve the fundamental utility of the invention.

The process of FIG. 24 starts at block 930 representing the top of the subroutine or other program or program segment that does the voice mail record/redirection function. In step 932, the telephone system receives a telephone call and transfers it to the target extension either dialed by the caller or by an operator who answers the call. Any conventional PBX system or other telephone system that has the capability to receive a call and transfer it to one of a plurality of extension phones will suffice as the hardware platform to accomplish the function of step 932. Step 934 represents the process of recording a voice mail message in any digital or analog manner if the target extension phone is not answered, is busy or the user is on another call and elects to have the new call transferred into voice mail. The voice mail message may be digitized and stored as digital data on a hard disk as is done in the phone system described herein or it may be recorded in analog fashion on audio tape or some other analog recording media. In the latter case, a pointer to the index mark on the tape or other media where the message starts is stored in the voice mail box associated with the called extension. This pointer is used to retrieve the message later.

Block 936 represents the process of generating a human perceptible indication that a voice mail message has been stored in the voice mail box of the extension telephone that was called and starting an interval countdown timer dedicated to this voice mail message. In alternative embodiments, the generation of the human perceptible indication is not performed based upon the assumption that all users check their voice mail frequently unless they are unable to for some reason. The interval countdown (or count up) timer functions to determine an interval during which the message must be picked up or it will be transferred to another voice mail box. In some embodiments, this interval is programmable. In alternative embodiments, the interval timer can be dispensed with and a simple date and time notation from the system clock is made in a register or memory location dedicated to this voice mail message as to when the message was left. The exact manner in which the interval is timed out is not critical to the invention. Determination of when the interval is expired is then done by a simple calculation of adding a fixed or programmable number of hours to the date and time the message was left to determine a transfer time to use in determining whether the message was retrieved in time.

The exact nature of the human perceptible indication generated in block 936 is also not critical to the invention. It can be as simple as lighting a light on the phone, periodically sounding a tone or beep from the speaker if it is a speaker phone until the message is picked up, making a distinctive dial tone that is different than the normal dial tone when a message is waiting and the phone is picked up, or calling a radio pager and leaving a programmable or fixed, numeric or voice message on the pager as in the preferred embodiment.

Block 938 represents the process of monitoring the voice mail box to determine when or if the message has been picked up. The manner in which this is done is not critical to the invention, and any method for determining when a voice mail digital data file has been opened and read or when a particular segment of audio tape or CDR, DAT or other audio media has been played will suffice. For example, there may be a routine that monitors the voice mail box files to determine when one of them is opened and generates a software interrupt to another routine that makes some notation that the voice mail message has been accessed such as by setting a flag or writing the date and time of the access to a register or memory location dedicated to storing data as to the status of that voice mail box. Or, a routine may monitor file open operations done by the operating system and look up the file each time an open and a read operation is done to determine if the file read is a voice mail file, and, if so, which voice mail file. When a voice mail file is opened and read, or the message,is played from an analog recording device, the process makes a notation of the date and time in a status record dedicated to this voice mail message or sets a flag dedicated solely to that voice mail message.

Block 940 represents the process of determining if the voice mail message has been accessed before the predetermined (and programmable in some embodiments) interval has expired. The way in which this is done is not critical to the invention, and any process that accomplishes this function will suffice. For example, a software routine may continuously poll the interval timers for each voice mail message in the system to determine if the time has expired. If not, the routine examines the flag for that message to see if it has been read, as symbolized by block 943. If the message has been read, transfer back to block 938 is accomplished to continue monitoring to determine if the message has been read. If time has expired, the process of block 940 transfers operation to step 942 to transfer the pointer to the voice mail message to another voice mail box (or by transferring the entire message in some embodiments). Another example of a process for accomplishing the functions of blocks 938, 940 and 943 is where the software reads each "time message was left" notation in each voice mail message status buffer and calculates the latest time the message can be retrieved before transfer to another voice mail box occurs in accordance with a predetermined, programmable or fixed interval. The routine then reads the status bytes of each voice mail message to determine what time it was picked up if it was picked up and compares that time to the time the message was left by subtraction or compares the pick up time to the latest possible pickup time calculated earlier. A decision is then made as to whether the voice mail message has been picked up in time, resulting in transfer to block 945, or not picked up in time, as represented by transfer to block 942 or not picked up yet but time has not yet expired, resulting in a transfer to block 938.

If the fixed or programmable interval for a particular message has expired, as determined in block 940 (programmable or fixed intervals may be different for every extension in some embodiments) and the voice mail message has not been accessed, the process of block 942 functions to transfer the voice mail message to another voice mail box. The particular voice mail box to which the message is transferred may be programmable in some embodiments and fixed in others. The preferred way of transferring the voice mail message is to transfer a pointer to the message to the other mailbox and leave the data or analog recording of the message wherever it is in the memory or media on which the message is stored. However, in some embodiments, the entire message may be moved to a new location in or mapped to the new voice mail box. After making the transfer, control is transferred back to block 936 to generate a new human perceptible indication that a voice mail message has arrived in the new voice mail box.

Figure 25:
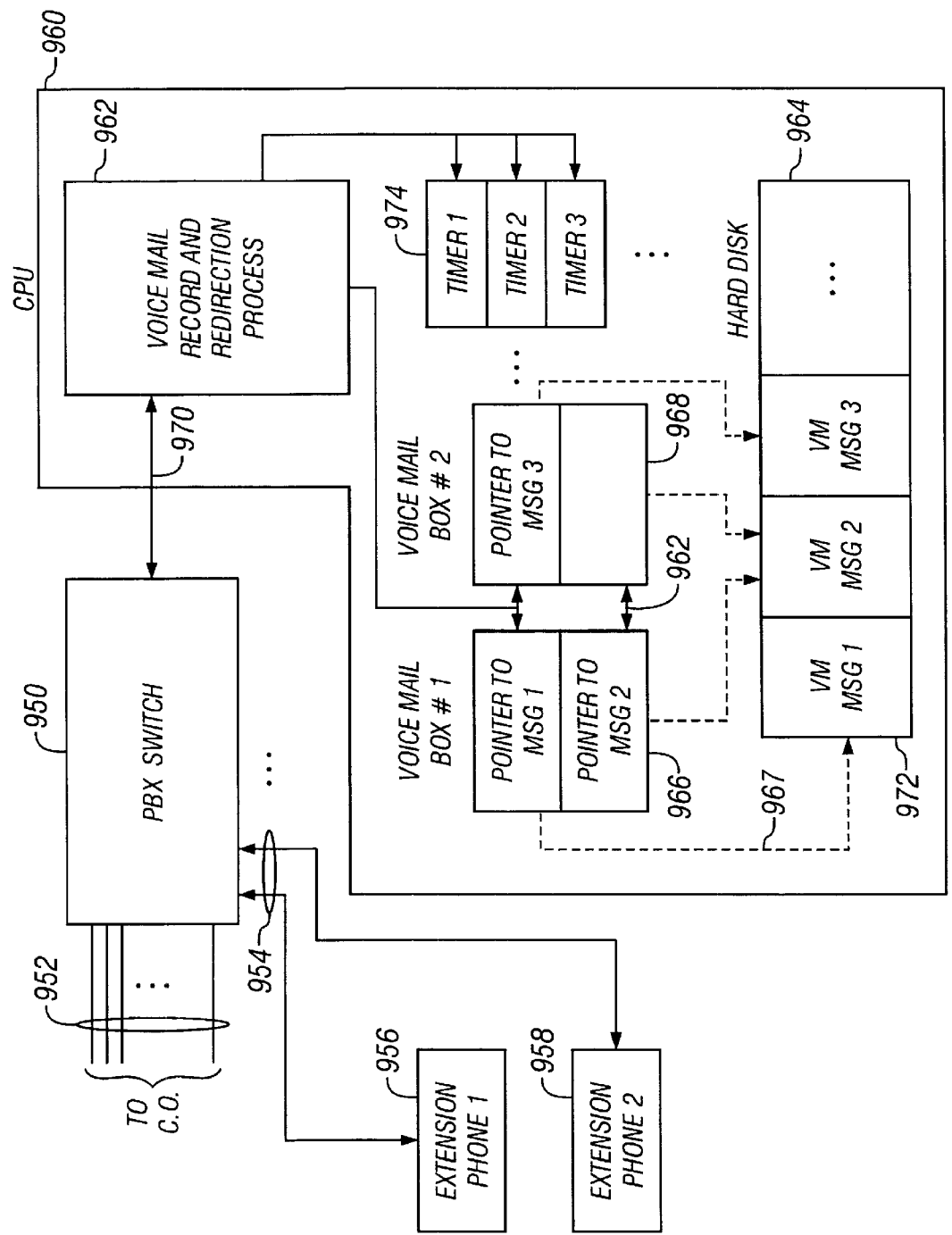
FIG. 25 illustrates a typical platform upon which the processes of the invention may be implemented.

Referring to FIG. 25, there is shown a typical platform upon which the process of FIG. 24 may be carried out. A PBX switch 950 receives incoming calls on one or more telephone lines from a C.O. switch or on one or more drop lines 954 coupling the PBX switch to one or more extension telephones, of which phones 956 and 958 are typical. The PBX switch is coupled to a computer 960 which has in execution thereon a voice mail record and redirection process 962 which functions to digitize and record voice mail messages in separate files on hard disk 964 and record pointers in voice mail boxes 966 and 968 stored in RAM (not separately shown) or on hard disk 964 and to do other things apparent from the following discussion. The pointer to VM message #1 is represented by dashed line 967.

The system of FIG. 25 operates as follows. An incoming call is from either a C.O. line or extension phone is transferred in the PBX switch to a target extension phone 956. If the extension phone is not answered or is busy or the user indicates the message is to be transferred to voice mail or if the PBX attendant is requested to transfer the caller directly into voice mail, a message is sent to CPU 960 that a VM message needs to be stored for extension 956. Then, the PBX connects the call to an A/D converter or DSP programmed to digitize the incoming voice signals (not shown) either of which is coupled to the voice mail record and redirection process via data and analog signal path 970. In some embodiments, digitization of incoming calls and re-conversion of digital data of VM message back to analog signals is done in the PBX so bus 970 is strictly digital. The resulting digital data of the VM message is stored by the process 962 in a VM message file such as file 972 on hard disk 964. The process 962 then stores a pointer to the VM message in VM box 966 associated with extension 956 and starts a hardware or software countdown timer 974 dedicated to this VM message. In some embodiments, there is a table stored in memory or on hard disk 964 which maps which hardware or software timers are associated with each voice mail message so they can be shared and in other embodiments, there is one timer dedicated to each message on a fixed basis so that the system stops taking messages when it runs out of timers or simply stops redirecting them when it runs out of timers. The process 962 can also program the interval counted out by each of the timers in some embodiments by looking up the desired interval for each extension in a table.

The PBX causes a human perceptible indication to be made for the extension for which a VM message was just recorded by lighting a light on the phone or giving it a distinctive dial tone when the phone is picked up. In other embodiments, the process 962 can do the notification by finding a free C.O. line and dialing the pager number associated with the extension stored in a table and giving the pager a predetermined or programmable numeric or voice message, as is done in the process of FIGS. 21A through 21F. The voice mail record and redirection process 962 then monitors the voice mail boxes or VM files that have active VM messages in them to determine if the VM message was accessed within the predetermined time being counted out by the timer. Use of date and time stamps may be substituted for timers to time out the interval during which the VM message must be accessed. The process 962 can perform this monitoring function by any known method including the polled and interrupt based methods described above in connection with the discussion of boxes 938, 940 and 943 in FIG. 24. If the message is retrieved before the interval expires, process 962 does not redirect the message and returns to a state of waiting for the next call. If the message is not retrieved before the interval expires, the process 962 moves the pointer to the message from the original VM box to another VM box and either generates a new human perceptible indication of the existence of a message for the new extension or causes the PBX to generate a new human perceptible indication on the new extension. Transfer of a VM message pointer from VM box 966 to VM box 968 is represented by vector 969.

Although the invention has been described in terms of the preferred and alternative embodiments, those skilled in the art will appreciate other embodiments or modifications which do not depart from the genus of the invention defined herein. All such departures are intended to be included within the scope of the claims appended hereto.

What is claimed is:

1. A process for managing voice mail messages in a telephone system having a plurality of extension phones, comprising:

receiving a phone call ring signal on a telephone line and answering a call placed by a caller;

causing an extension phone to ring either by sensing DTMF tones entered by the caller or by other means of determining an extension to which the caller desires to be connected;

timing an amount of time the extension phone rings, and if the phone is answered within a predetermined time, coupling signals from the caller to that extension phone;

if the extension phone is not answered within a predetermined time or if the extension phone is busy with another call, or if a signal is generated at the extension phone by a user indicating the call is to be sent directly to voice mail, connecting the call to a voice mail channel;

opening a greeting file in a memory, the greeting file containing data of a voice mail greeting for the extension phone which was called;

playing a voice mail greeting to the caller by reading the greeting data, sending said data out over said voice mail channel and converting it to analog signals for coupling to a telephone line in use by said caller;

sending data over said voice mail channel and converting said data to a tone which is transmitted via said telephone line, the transmitted tone indicating to the caller that a voice mail message recording interval is starting;

receiving audio signals of a voice mail message from said telephone line and converting said signals to digital data and transmitting said digital data over said voice mail channel;

receiving said data of said message and formatting it, if necessary, for transfer to a voice mail recording and redirection process in execution on a computer;

receiving said data and formatting it, if necessary, for recording in a voice mail file in a memory and recording said data in said voice mail file;

storing a pointer to a location in said memory of said voice mail message file just recorded, said pointer being stored in a voice mail box in memory associated with the extension phone;

locating an available telephone line to make a call to a radio pager;

looking up, in a table storing phone numbers of pagers for at least some users of said plurality of extension phones, a phone number of a radio pager used by a user of the extension phone associated with the voice mail message just recorded, and dialing said phone number;

monitoring call progress tones of a radio pager system to determine when it is time to send a message to said pager;

sending a voice or alpha-numeric, numeric or two-way message to said pager indicating that a voice mail message has been left in a voice mail box of the user;

monitoring the voice mail box or voice mail file to determine if the voice mail message just recorded has been retrieved by the user within a predetermined interval after the time the voice mail message was recorded or after the message sending to the pager; and if the message was not retrieved, moving the pointer to the voice mail message file to the voice mail box of another user.

2. The process of claim 1, wherein the moving the pointer comprises looking up, in a table of desired transfers, a voice mail box to which voice mail messages left for the user of the extension are to be transferred and transferring the pointer to the voice mail message file to the voice mail box found from the looking up.

3. The process of claim 1, wherein the sending a message to a pager and the monitoring to determine if the voice mail message was retrieved further comprise determining if the voice mail message was or was not accessed within a predetermined time after a first pager message was sent, and, if not, repeating the sending a message to the pager and monitoring for retrieval of the message within a predetermined time after pager notification for a predetermined number of pager notifications, and if the message is not retrieved within a predetermined time after a last pager notification, moving the pointer.

4. The process of claim 1, further comprising looking up a pager telephone number of the pager of the user and repeating the sending a message to the pager, monitoring for retrieval within a predetermined interval and moving the pointer to a new voice mail box if the message is not retrieved within a predetermined interval.

5. The process of claim 1, further comprising automatically screening each voice mail message for DTMF tones or mimics that occur during the recording interval of the voice mail message and removing or crippling said DTMF tones or mimics in such a way that they will not be recognized as DTMF tones by a DTMF tone decoder which is exposed to signals of the voice mail message.

6. The process of claim 1, further comprising monitoring for DTMF tones, during an interval in which voice mail messages are being recorded, the tones indicating the caller desires some action to occur and carrying out appropriate actions assigned to predetermined DTMF tones.

7. The process of claim 1, further comprising monitoring for DTMF tones, during an interval in which voice mail messages are being recorded, the tones indicating the caller desires some action to occur and, if a first DTMF tone is detected, pausing the recording process until the first DTMF tone ceases, and if one of the DTMF tones of a group of DTMF tones assigned to stopping a voice mail recording process is detected, stopping the voice mail recording process and playing a menu of options to the caller which allows any one of a plurality of actions to be carried out if the caller initiates a DTMF tone associated with the desired action, where the actions which can be invoked include: resuming voice mail recording process; or, stopping the recording process and evaluating a size of a file containing the voice mail message, and, if the file is larger than a predetermined size, storing a pointer to the voice mail file in the voice mail box associated with the extension phone and proceeding to notifying the user of the existence of the new e-mail message, and, if the file is smaller than the predetermined size, closing the file and deleting it; or, replaying the voice mail message to the caller and then returning to the receiving audio signals of a voice mail message and proceeding to record a voice mail message; or, deleting the voice mail file, creating a new voice mail file and returning to the receiving audio signals of a voice mail message and proceeding to record a new voice mail message.

8. The process of claim 1, further comprising monitoring recording time of said voice mail message, and, when a maximum recording time is reached, playing a menu of options to the caller which allows any one of a plurality of actions to be carried out if the caller initiates a DTMF tone associated with a desired action.

9. The process of claim 1, further comprising monitoring recording time of said voice mail message, and, when a maximum recording time is reached, playing a menu of options to the caller which allows any one of a plurality of actions to be carried out if the caller initiates a DTMF tone associated with a desired action, where the actions which can be invoked include: resuming a voice mail recording process; or, stopping the recording process and evaluating a size of a file containing the voice mail message, and if the file is larger than a predetermined size, storing a pointer to the voice mail file in a voice mail box associated with the extension phone and proceeding to notifying the user of the existence of a new voice mail message, and, if the file is smaller than the predetermined size, closing the file and deleting it; or, replaying the voice mail message to the caller and then returning to receiving audio signals of a voice mail message and proceeding to record a new voice mail message; or, deleting the voice file, creating a new voice mail file and returning to receiving audio signals of a voice mail message and proceeding to record a new voice mail message.

10. The process of claim 1, further comprising monitoring recording of said voice mail message, and, when a maximum interval of some predetermined number of seconds of silence is reached, playing a menu of options to the caller which allows any one of a plurality of actions to be carried out if the caller initiates a DTMF tone associated with a desired action.

11. The process of claim 1, further comprising monitoring recording of said voice mail message, and, when a maximum interval of some predetermined number of seconds of silence is reached, playing a menu of options to the caller which allows any one of a plurality of actions to be carried out if the caller initiates a DTMF tone associated with a desired action, where the actions which can be invoked include: resuming a voice mail recording process; or, stopping the recording process and evaluating a size of a file containing the voice mail message, and, if the file is larger than a predetermined size, storing a pointer to the voice mail file in a voice mail box associated with the extension phone and proceeding to notifying the user of the existence of a new voice mail message, and, if the file is smaller than the predetermined size, closing the file and deleting it; or, replaying the voice mail message to the caller and then returning to receiving audio signals of a voice mail message and proceeding to record a new voice mail message; or, deleting the voice mail file, creating a new voice mail file and returning to receiving audio signals of a voice mail message and proceeding to record a new voice mail message.

12. The process of claim 1, further comprising monitoring, during the recording a voice mail message, for a hang-up or disconnect event, and, if either event occurs, stopping a voice mail recording process and evaluating a size of a resulting file for whatever was recorded before the hang-up or disconnect, and, if the file is big enough relative to a fixed predetermined size, storing a pointer to the voice mail message in a voice mail box of the extension phone and skipping the calling the pager of the user of that extension phone and subsequent carrying out transfer of the pointer, and returning to an idle state to wait for another call, and, if the file is not big enough relative to a fixed predetermined size, deleting the file and returning to an idle state to wait for another call.

13. An apparatus comprising:
- a computer programmed to execute a voice mail recording and redirection process, said computer having a first bus;
- a host adapter circuit coupled to said first bus;
- a switch card circuit coupled to said first bus and coupled to said host adapter circuit by a second bus and including a switching circuit to transfer data between inbound and outbound timeslots, said inbound and outbound timeslots being temporarily or permanently assigned to particular extension telephones, a voice mail recording channel implemented by a digital signal processor on said switch card circuit and one or more incoming telephone lines from a telephone service provider;
- a port expansion circuit configured to couple to one or more telephone lines from a telephone service provider and to couple to a plurality of telephone lines coupled to extension telephones or TAPI interface circuits, and coupled to said host adapter circuit by a third bus,
- said port expansion circuit including an analog-to-digital converter and a digital-to-analog converter coupled to each of said one or more telephone lines and a hybrid circuit coupled to each of said one or more telephone lines and a ring detector circuit coupled to each of said one or more telephone lines from said telephone service provider and a power ring circuit coupled to each telephone line coupled to an extension telephone or TAPI device,
- said port expansion circuit functioning to generate digital data using said analog-to-digital converter by sampling analog signals on said telephone lines and sending said digital data to said switch card via said third and second buses and functioning to receive digital data from said switch card via said second and third buses and convert it to analog signals using said digital-to-analog converter and couple said analog signals to a telephone line coupled to an extension telephone or said telephone service provider;
- and wherein said ring detector circuit of said port expansion circuit functions to detect incoming ring signals of incoming telephone calls from said telephone service provider and generate a control signal indicating an incoming ring;
- and wherein said power ring circuit functions to, upon receiving a command signal, generate a power ring signal which causes an extension telephone coupled to said power ring circuit to ring, and wherein said host adapter circuit includes a micro controller programmed to detect said control signal indicating an incoming ring of a telephone call from said telephone service provider and send a message to said voice mail recording and redirection process that the ring signal of an incoming call has been detected;
- and wherein said voice mail recording and redirection process controls said computer to determine to which extension telephone the incoming call is directed and send a control signal to said power ring circuit to cause the appropriate extension telephone to ring, and, if the call is not answered after a predetermined time, to send a command to said switch card to connect digital data from said incoming call to said voice mail channel implemented by said digital signal processor of said switch card, and wherein said digital signal processor is programmed to format said data of said incoming call for transfer to said computer, said computer functioning under control of said voice mail recording and redirection process to record said data as a voice mail message on a hard disk memory, place a pointer to the voice mail message in a voice mail box associated with the extension to which the call was directed, generate a human perceptible indication to a user of the extension phone to which the call was directed that a new voice mail message has arrived, monitor the voice mail message to make sure that it has been picked up within a predetermined interval, and, if not, transfer the pointer to the voice mail message to another voice mail box and generate a human perceptible indication to the user of the extension telephone associated with the new voice mail box that a new voice mail message has arrived.

14. The apparatus of claim 13, wherein said digital signal processor is programmed to process the data of a voice mail message to remove data containing a DTMF tone command or DTMF mimic.

15. The apparatus of claim 13, wherein said human perceptible indication is generated by sending a command from said computer to said extension phone to light a voice mail message present light on said extension phone associated with the voice mail box having the pointer to the new message stored therein.

16. The apparatus of claim 13, wherein said human perceptible indication is generated by said voice mail recording and redirection process controlling said computer to scan status data generated by said hybrid circuit connected to said telephone lines from said telephone service provider to find an available telephone line, looking up a pager number of a pager for the user of the extension phone having the newly recorded voice mail message, dialing said pager, and sending a numeric message to said pager at the appropriate time.

17. In a telephone system having multiple extension phones, a method for directly redirecting a voice mail message to a different voice mail box if the message is not retrieved within a predetermined time, comprising:
- receiving a telephone call from a caller and recording a voice mail message when an extension telephone to which the call is directed is not answered or is busy or a user of the extension phone elects to have the call directed to his or her receiving voice mail box;
- generating a human perceptible indication that a new voice mail message has been stored for the extension telephone which was called and starting an interval timer or recording date and time when the message was left;
- determining if the voice mail message was retrieved by a first recipient within a predetermined fixed or programmable interval; and if the message was not retrieved, directly transferring either the voice mail message itself or a pointer to the voice mail message to another voice mail box or memory or other media associated with or mapped to the receiving voice mailbox,
  wherein the determining and transferring are not triggered by a caller urgency input made by the caller during the call, the urgency input specifying an urgent delivery option for the message,
  wherein the transferring does not involve placing a voice call, and
  wherein a second recipient can access the directly transferred message only after the transferring is complete.

18. The method of claim 17, further comprising generating a new human perceptible indication that a new voice mail message has arrived in the voice mail box to which the voice mail message or a pointer thereto has been transferred after the transferring is complete.

19. An apparatus comprising:
  a plurality of C.O. (central office) telephone lines;
  a plurality of extension telephones;
  a PBX switch coupled to said plurality of C.O. telephone lines and coupled to said plurality of extension telephones by drop lines, said PBX switch configured to receive a telephone call from a caller and direct it to one of a plurality of extensions or to a voice mail box associated with the extension; and
  a computer coupled to said PBX switch and programmed to receive, digitize and record a voice mail message in a file on a hard disk and store a pointer to said voice mail message in a voice mail box associated with the one extension and to cause a human perceptible indication of the existence of a voice mail message from the caller to be generated either by itself or by said PBX switch and to monitor said voice mail box or said voice mail file to determine if the voice mail message has been retrieved by a first recipient within a predetermined time, and, if not, to move the pointer to the voice mail message to another voice mail box,
    wherein the determining and moving are not triggered by a caller urgency input made by the caller during the call, the urgency input specifying an urgent delivery option for the message,
    wherein the moving does not involve placing a voice call, and
    wherein a second recipient can access the voice mail message only after the moving is complete.

20. In a telephone system having multiple extension phones, a method for directly redirecting a voice mail message to a different voice mail box if the message is not retrieved within a predetermined time, comprising:
  receiving a telephone call from a caller and recording a voice mail message when an extension telephone to which the call is directed is not answered or is busy or a user of the extension phone elects to have the call directed to his or her receiving voice mail box;
  determining if the voice mail message was retrieved by a first recipient within a predetermined fixed or programmable interval; and
  if the message was not retrieved, directly transferring either the voice mail message itself or a pointer to the voice mail message to another voice mail box or memory or other media associated with or mapped to the receiving voice mailbox,
    wherein the determining and transferring are not triggered by a caller urgency input made by the caller during the call, the urgency input specifying an urgent delivery option for the message,
    wherein the transferring does not involve placing a voice call, and
    wherein a second recipient can access the directly transferred message only after the transferring is complete.

21. An article comprising:
  a storage medium having stored thereon instructions that when executed by a machine result in the following:
    receiving a telephone call from a caller and recording a voice mail message when an extension telephone to which the call is directed is not answered or is busy or a user of the extension phone elects to have the call directed to his or her receiving voice mail box;
    generating a human perceptible indication that a new voice mail message has been stored for the extension telephone which was called and starting an interval timer or recording date and time when the message was left;
    determining if the voice mail message was retrieved by a first recipient within a predetermined fixed or programmable interval; and
    if the message was not retrieved, directly transferring either the voice mail message itself or a pointer to the voice mail message to another voice mail box or memory or other media associated with or mapped to the receiving voice mailbox,
      wherein the determining and transferring are not triggered by a caller urgency input made by the caller during the call, the urgency input specifying an urgent delivery option for the message,
      wherein the transferring does not involve placing a voice call, and
      wherein a second recipient can access the directly transferred message only after the transferring is complete.

* * * * *